US010684464B2

(12) United States Patent
Aschwanden et al.

(10) Patent No.: US 10,684,464 B2
(45) Date of Patent: Jun. 16, 2020

(54) DEVICE FOR TILTING AN OPTICAL ELEMENT, PARTICULARLY A MIRROR

(71) Applicant: Optotune AG, Dietikon (CH)

(72) Inventors: Manuel Aschwanden, Allenwinden (CH); David Niederer, Kuttigen (CH); Stephan Smolka, Zurich (CH); Chauncey Gratzel, Palo Alto, CA (US); Roman Patscheider, Winterthur (CH); Markus Geissner, Bergdietikon (CH)

(73) Assignee: OPTOTUNE AG, Dietikon (CH)

(*) Notice: Subject to any disclaimer, the term of this patent is extended or adjusted under 35 U.S.C. 154(b) by 164 days.

(21) Appl. No.: 15/517,522

(22) PCT Filed: Sep. 18, 2015

(86) PCT No.: PCT/EP2015/071521
§ 371 (c)(1),
(2) Date: Apr. 7, 2017

(87) PCT Pub. No.: WO2016/055253
PCT Pub. Date: Apr. 14, 2016

(65) Prior Publication Data
US 2018/0267294 A1    Sep. 20, 2018

Related U.S. Application Data

(63) Continuation-in-part of application No. PCT/EP2014/071541, filed on Oct. 8, 2014, and a
(Continued)

(30) Foreign Application Priority Data

Nov. 12, 2014 (EP) .................................... 14192928

(51) Int. Cl.
*G02B 13/10* (2006.01)
*G02B 26/08* (2006.01)
(Continued)

(52) U.S. Cl.
CPC ....... *G02B 26/0816* (2013.01); *G02B 7/1821* (2013.01); *G02B 26/085* (2013.01);
(Continued)

(58) Field of Classification Search
CPC   G02B 26/0816; G02B 26/0833; G02B 6/359; G02B 6/3518; G02B 6/3556;
(Continued)

(56) References Cited

U.S. PATENT DOCUMENTS 5,430,571 A   7/1995 Witteveen
5,754,327 A   5/1998 Masotti et al.
(Continued)

FOREIGN PATENT DOCUMENTS

EP   0916983   5/1999
EP   2784566   10/2014
(Continued)

*Primary Examiner* — Mustak Choudhury
(74) *Attorney, Agent, or Firm* — JMB Davis Ben-David

(57) ABSTRACT

The invention relates to a device (1, 2) for pivoting an optical element (10), comprising: an optical element (10), wherein the optical element is movably mounted so that the optical element can be tilted at least about a first axis (A), a magnet (20) extending in an extension direction (Z), wherein the magnet (20) comprises a magnetization (M) aligned with said extension direction (Z), and wherein the magnet (20) comprises a front side (20a), and wherein optical element (10) is rigidly coupled to the magnet (20) or to a first conductor section (30) that faces the front side (20a) of the magnet (20) in the extension direction (Z), wherein the first conductor section (30) extends along the first axis (A), and a current source means (50) electrically connected
(Continued)

to the first conductor section (30), which current source means (50) is designed to apply an electrical current (I) to said first conductor section (30), so that a Lorentz force is generated that tilts the optical element (10) about said first axis (A) along a first tilting direction (x).

24 Claims, 39 Drawing Sheets

Related U.S. Application Data continuation-in-part of application No. PCT/EP2014/071538, filed on Oct. 8, 2014.

(51) Int. Cl.
*G02B 7/182* (2006.01)
*G02B 26/10* (2006.01)
*H04N 1/113* (2006.01)
*H02K 33/00* (2006.01)

(52) U.S. Cl.
CPC ........... *G02B 26/101* (2013.01); *H02K 33/00* (2013.01); *H04N 1/113* (2013.01)

(58) Field of Classification Search
CPC .. G02B 6/3572; G02B 6/3584; G02B 7/1815; G02B 7/1821; G02B 7/1828; G02B 26/085; G02B 26/101; G02B 26/105; G02B 26/127; G03F 7/702; G03F 7/704; G03F 7/7015; G03F 7/70758; G03F 7/70941; H04N 1/053; H04N 1/12; H04N 1/113; H04N 1/1135; H02K 33/00; H02K 41/031
USPC .......................................................... 359/433
See application file for complete search history.

(56) References Cited

U.S. PATENT DOCUMENTS

| | | | |
|---|---|---|---|
| 5,959,758 A | 9/1999 | Seo et al. | |
| 6,666,561 B1 | 12/2003 | Blakley | |
| 6,879,747 B2 | 4/2005 | Ikegame et al. | |
| 7,136,547 B2 | 11/2006 | Brown et al. | |
| 7,388,700 B1 | 6/2008 | Odhner et al. | |
| 8,203,702 B1 | 6/2012 | Kane et al. | |
| 8,752,969 B1 | 6/2014 | Kane et al. | |
| 2002/0181839 A1* | 12/2002 | Brown | G02B 6/3572 385/16 |
| 2010/0142018 A1 | 6/2010 | Shin | |
| 2014/0211187 A1* | 7/2014 | Hauf | G02B 7/1815 355/67 |

FOREIGN PATENT DOCUMENTS

| | | |
|---|---|---|
| JP | 2004144926 | 5/2004 |
| JP | 2004170499 | 6/2004 |
| JP | 2004524575 | 8/2004 |
| JP | 2012506135 | 3/2012 |
| JP | 2013041281 | 2/2013 |
| JP | 2014098850 | 5/2014 |
| WO | 2009/041055 | 4/2009 |
| WO | 2012171581 | 12/2012 |
| WO | WO2014/060170 | 4/2014 |

* cited by examiner

DEVICE FOR TILTING AN OPTICAL ELEMENT, PARTICULARLY A MIRROR

CROSS-REFERENCE TO RELATED APPLICATIONS

This is the U.S. National Stage of International Application No. PCT/EP2015/071521 filed on Sep. 18, 2015, which was published in English under PCT Article 21(2), which is the Continuation in Part of International Application Nos. PCT/EP2014/071538 and PCT/EP2014/071541, both filed on Oct. 8, 2014, and which claims the benefit of European Patent Application No. 14192928.1 filed on Nov. 12, 2014.

The present invention relates to a device for holding and tilting (or pivoting) an optical element, particularly a mirror.

U.S. Pat. No. 7,388,700B1 discloses a pivoting ball joint on which a mirror assembly is attached. The mirror assembly is operatively coupled to an actuator assembly (e.g., electromagnets or piezoelectric based actuators).

Further, WO2012171581 discloses an apparatus for positioning at least one optical element, wherein the apparatus comprises at least one movable carrier for holding the optical element.

Further, EP0916983A1 describes a light deflection device comprising a segmental sphere body having a deflection face portion for deflecting and transmitting an incident light beam, and a segmental sphere face portion opposing to the deflecting face portion, a base plate for supporting the segmental sphere body in a turnable manner, and a driving means for turning the segmental sphere body.

Furthermore U.S. Pat. No. 7,136,547A1 shows a method and an apparatus for directing a radiation beam in a desired direction. There is provided a movable member supported for movement by a fixed member and the movable member has an optical element, e.g. a flat mirror fixedly attached thereto. Here, the magnetization of the magnet runs perpendicular to the winding axis of the coil(s) so that also unwanted force components are created.

Further, U.S. Pat. No. 5,430,571A discloses a rotary mirror system for angularly deflecting a light beam including an air bearing arrangement rotatably supporting a mirror body on which one or more mirror facets are provided, the mirror body being the rotor of an electric motor.

Further U.S. Pat. No. 6,666,561B1 describes a micromirror device includes a substrate, a reflective element spaced from the surface of the substrate, a pair of electrodes disposed adjacent to the surface of the substrate, spaced apart from each other, and disposed adjacent to opposite ends of the reflective element, and including a dielectric liquid disposed at least between the reflective element and the pair of electrodes.

Further, U.S. Pat. No. 5,959,758A teaches an optical deflecting device that has a supporting member and a deflecting member. The supporting member is provided with an opening. The arced inner surface of the opening corresponds to the spherical annulus.

Furthermore, U.S. Pat. No. 6,879,747A1 discloses a galvanometer mirror and optical switching device using the same.

Further, U.S. Pat. No. 5,754,327 describes a device for deflecting a laser beam which comprises a mirror and means for orientating the mirror according to a predetermined equation for the controlled deflection of the laser beam. The mirror is supported so that it can oscillate about two axes and the means for orientating the mirror comprise a plurality of electromagnets supplied with currents which are controlled and variable in time to exert magnetic forces on said mirror.

Furthermore, U.S. Pat. No. 8,752,969B1 discloses a method of operating fast scanning mirror. wherein the mirror has a base, inner stage, reflector, controller, and mechanical subsystems pivotally supporting stage and reflector.

Finally, U.S. Pat. No. 8,203,702 discloses an optical System including a radiation source, an optical detector, an entrance aperture, and an afocal element. The afocal element is associated with the aperture, enlarging the field of regard of the external article and the volume as seen by the source and detector. Also in the system, disposed along an optical path between selectively, the source or detector and the entrance aperture, is at least one mirror, rotatable about plural axes and causing the source and detector to address varying portions of the volume outside the optical system.

Based on the above, the problem underlying the present invention is to provide an improved and particularly cost efficient device for tilting an optical element, particularly in two dimensions (2D). Particularly, it is an objective of the present invention to make a fast and highly controllable 2D scanning mirror.

This problem is solved by a device having the features of claim 1. Preferred embodiments of the present invention are stated in the sub claims and are described below.

According thereto, the device for tilting an optical element comprises:
- an optical element, wherein the optical element is movably mounted so that the optical element can be tilted at least about a first axis,
- a (e.g. permanent) magnet extending in an extension direction, wherein the magnet comprises a magnetization aligned with said extension direction (i.e. the magnetization runs parallel to the extension direction), and wherein the magnet comprises a front side,
- a first conductor section facing the front side of the magnet in the extension direction, wherein the first conductor section extends along a first direction, wherein the optical element is rigidly coupled to the magnet or to the first conductor section, and a current source means electrically connected to the first conductor section, which current source means is designed to apply an electrical current to said first conductor section, so that a Lorentz Force is generated between the magnet and the first conductor section that tilts the optical element about said first axis in or counter to a first tilting direction (depending on the direction of the current).

Particularly, the first tilting direction may be orthogonal to the first axis. However, particularly in case two independent axes (e.g. a first and a second axis, see below) are present about which the tilting occurs, the first tilting direction does not need to be orthogonal to the first axis (likewise, the second tilting direction does not need to be orthogonal to the second axis).

Particularly, the optical element is a mirror, but may also be one of the following elements: a prism, a lens, a microlens, a diffractive optical element or any other optical element (this also holds for the second aspect of the present invention described below).

The magnet (as well as the further magnets described below) does not necessarily need to be cylindrical, nor end with a planar face (e.g. front side). However, generally, the magnet(s) can be cylindrical in all embodiments and may also comprise a planar front side. However, the front side may also comprise a convex curvature, e.g. spherical one, (e.g. in all embodiments) so that the respective magnet can be placed closer to the conductors while keeping the magnetic field lines as parallel as possible to the optimal angle.

Furthermore, generally, the magnet(s) can also have other shapes. For instance the magnet(s) can have a spherical surface (e.g. may form a sphere). Particularly, in all embodiments, the extension direction of the magnet can coincide with its magnetization axis (principle magnetic field axis). Particularly, the extension direction can corresponds to a symmetry axis of the magnet (e.g. a cylinder axis) or some axial direction such as a longitudinal axial direction.

According to an embodiment of the present invention, the device comprises a second conductor section facing the front side of the magnet in the extension direction, wherein the second conductor section extends along a second direction being different from the first direction, and wherein the optical element is movably mounted so that the optical element can be tilted—besides the first axis—also about a second axis being different from the first axis. Particularly, the second axis extends orthogonal to the first axis, but may also enclose an angle with the first axis that differs from 90°. Further, particularly, the current source means is electrically connected to the second conductor section, too, wherein the current source means is designed to apply an electrical current to said second conductor section, so that a Lorentz force is generated between the second conductor section and the magnet that tilts the optical element about the second axis in or counter to a second tilting direction (depending on the direction of the current in the second conductor section). Particularly, the second tilting direction differs from the first tilting direction, wherein the second tilting direction particularly extends orthogonal to the first direction (however, both tilting directions may also enclose an angle being different from 90°). Thus, the optical element can be tilted or pivoted in 2D.

Particularly, when the optical element is rigidly coupled to the first conductor section it is also rigidly coupled to the second conductor section. Particularly, in embodiments where the optical element is coupled to the conductor section(s), the optical element can be rigidly coupled e.g. to the respective coil means or coil carrier (see below), e.g. either directly or indirectly via other components.

Preferably, the optical element is (e.g. substantially) arranged concentrically with respect to an axis that runs through an intersection of the first and the second axis, and further extends orthogonal to said first and second axis. Particularly, the optical element faces the magnet along said axis.

Particularly, the current source means is designed to apply the current to the first conductor section(s) and to the second conductor section(s) independently from each other, so that each of said currents can be separately controlled and adjusted (e.g. by the current source means). Particularly, the current source means may comprise a first current source for the first conductor section (and eventually the further first conductor section, see below), wherein the first current source is electrically connected to the first conductor section and designed to apply said current to said first conductor section. Further, particularly, the current source means may comprise a second current source for the second conductor section (and eventually for the further second conductor section, see below), wherein the second current source is electrically connected to the second conductor section and designed to apply said current to said second conductor section.

Particularly, the first and the second conductor section cross each other. Particularly, the first and second conductor section extend orthogonal with respect to each other. However, an angle enclosed by the first and second conductor section may also lie within the range from 135° to 45°, particularly 130° to 60°, particularly 105° to 75°, particularly 100° to 80°, particularly 95° to 85°.

Particularly, these crossed currents facing the front side of the magnet (e.g. in the extension direction or in the direction of the magnetization of the magnet) allow for tilting (pivoting) the optical element in two different, particularly orthogonal, tilting directions so that the optical element can be pivoted in two dimensions (2D).

Particularly, a crossing point or region is aligned with the extension direction or lies within a projection of the front side of the magnet in the extension direction (e.g. a projection on the coil carrier, see below).

Further, particularly, the first and the second conductor section (or the first and the second direction) extend along a (fictitious) extension plane along which also said front side of the magnet extends, wherein the front side may be tilted with respect to said extension plane depending on the tilt of the optical element (or magnet). Further, particularly, the first and the second direction extends along or in said extension plane as well, (e.g. span said extension plane). Further, the magnet (or optical element) may comprise a certain position in which the extension direction of the magnet or its magnetization extends perpendicular to said extension plane and/or in which said front side of the magnet extends parallel to said extension plane. Particularly, herein, such a certain position is a position of the magnet or optical element in which the tiltable magnet or optical element can reside and that can be reached from another position by letting the device tilt the magnet or optical element accordingly. For instance the certain position may be a position (e.g. an initial position) in which the magnet or optical element is not tilted (e.g. a rest position) or some other position.

Further, particularly, the first and/or the second conductor section extend along the front side of the magnet. In a certain (e.g. non-tilted) position of the magnet, the first and/or second conductor section (or the first direction and/or the second direction) extends perpendicular to the extension direction or magnetization of the magnet. Further, particularly, in said certain position of the magnet, the first and/or second conductor section (or the first direction and/or the second direction) extend parallel to the front side of the magnet. Particularly, the angle between the first conductor section or the second conductor section and the extension direction (or magnetization) of the magnet does not need to be exactly 90°, but may comprise a deviation from this value of up to 40°, particularly of up to 30°, particularly of up to 20°, particularly of up to 10°, particularly of up to 5°. In other words, said angle may lie within the range from 130° to 50°, particularly 120° to 60°, particularly 110° to 70°, particularly 100° to 80°, particularly 95° to 85°.

According to a further embodiment of the present invention, the device comprises a first coil means (particularly extending along said extension plane), wherein the first conductor section forms part of a conductor of the first coil means, which conductor of the first coil means is at least wound about a first winding axis (which runs perpendicular or at least substantially perpendicular to said extension plane in particular), wherein particularly in a certain position of the magnet, the first winding axis runs parallel (or at least substantially parallel) to the extension direction or magnetization of the magnet.

Particularly, with respect to said certain position the first winding axis runs parallel to the extension direction or magnetization within +−25°, particularly +−20°, particularly +−15°, particularly +−10°, particularly +−5°. In other words, an angle enclosed by the first winding axis and the extension plane may lie within the range from 115° to 65°, particularly 110° to 70°, particularly 105° to 75°, particularly 100° to 80°, particularly 95° to 85°. Furthermore, particularly, in all embodiments, the device can in principle be designed such that all angles between +/−25° can be set.

Further, according to an embodiment of the device according to the invention, the device comprises a second coil means (particularly extending along said extension plane), wherein the second conductor section forms part of a conductor of the second coil means, which conductor of the second coil means is at least wound about a second winding axis (which runs perpendicular or at least substantially perpendicular to said extension plane in particular), wherein particularly in said certain position of the magnet, the second winding axis runs parallel (or at least substantially parallel) to the extension direction or magnetization of the magnet. Particularly, the angles between the second winding axis and the extension direction or between the second winding axis and the extension plane can lie within the ranges stated above for the first winding axis.

Further, according to an embodiment of the present invention, the first coil means comprises a first and a second loop, wherein at least a part of the first conductor section (or the complete first conductor section) forms part of the first loop, and wherein the device comprises a further first conductor section, wherein at least a part of the further first conductor section (or the complete further first conductor section) forms part of the second loop, wherein the first conductor section and the further first conductor section extend along each other, particularly along the first direction (particularly parallel to each other), and wherein particularly the first conductor section and the further first conductor section form a central region of the first coil means that faces the front side of the magnet (in the extension direction of the magnet). Further, particularly, the current source means is designed to apply a current to the first loop and to the second loop of the first coil means such that the current in said two first conductor sections flows in the same (first) direction. As already mentioned, the first direction can be aligned with the first axis.

Particularly, the conductor of the first coil means is wound about the first winding axis in the first loop and wound about a further first winding axis in the second loop so that the two loops have opposite winding directions in particular. Particularly, the first winding axis and the further first winding axis run parallel or at least substantially parallel with respect to each other. Further, particularly, in a certain position of the magnet, the first winding axis and the further first winding axis run parallel or at least substantially parallel to the extension direction or magnetization of the magnet. The angles stated above for the first winding axis with regards to the extension direction (magnetization) or extension plane are also valid for the further first winding axis and/or the further second winding axis (see below).

Further, according to an embodiment of the present invention, the second coil means comprises a first and a second loop, wherein at least a part of the second conductor section (or the complete second conductor section) forms part of the first loop, and wherein the device comprises a further second conductor section, wherein at least a part of the further second conductor section (or the complete further second conductor section) forms part of the second loop, wherein the second conductor section and the further second conductor section extend along each other, particularly in the second direction (particularly parallel with respect to each other), and wherein particularly the second and the further second conductor section form a central region of the second coil means that faces the front side of the magnet (in the extension direction of the magnet). Further, particularly, the current source means is designed to apply a current to the first and the second loop of the second coil means such that the current in said two second conductor sections flows in the same (second) direction. As already mentioned, the second direction can be aligned with the second axis.

Particularly, the conductor of the second coil means is wound about the second winding axis in the first loop of the second coil means and wound about a further second winding axis in the second loop of the second coil means so that the two loops have opposite winding directions in particular. Particularly, the second winding axis and the further second winding axis run parallel with respect to each other. Further, particularly, in a certain position of the magnet, the second winding axis and the further second winding axis run parallel to the extension direction or magnetization of the magnet.

According to a preferred embodiment, the first conductor section (which runs along or parallel to the further first conductor section) and the further first conductor section extend across the second conductor section (which runs along or parallel to the further second conductor section) and the further second conductor section. Particularly, the first conductor sections extend orthogonal to the second conductor sections, wherein particularly the crossing point or crossing region of the first and second conductor sections faces the front side of the magnet (in the extension direction) and particularly lies below it in a plump-vertical fashion in said certain position of the magnet. The angle enclosed by the first conductor sections and (crossing) second conductor sections can lie in the ranges stated above with respect to the first and second conductor section. Further, according to an embodiment of the present invention, the two loops of the first and/or second coil means may form separate coils, respectively. Here, particularly, a conductor of the first loop (of the first coil means) is wound about the first winding axis, and a conductor of the second loop (of the first coil means) is wound about the further first winding axis, namely particularly in the opposite winding direction as the conductor of the first loop, so that the current in the (central) adjacent first conductor sections flows along (in or counter to the direction of) the same (first or second) axis. Again, the angles between the winding axes and the extension direction/plane can be those stated above.

Further, according to an alternative embodiment, the two loops of the first and/or of the second coil means may form a single coil, respectively, e.g. such as a figure-8 coil.

In a figure-8 coil, a conductor is wound about two winding axes (e.g. the first and the further first winding axis or the second and the further second winding axis), wherein the two winding axes run parallel with respect to each other, so that a coil is formed comprising two (electrically connected) loops forming a figure-8 shape. Particularly, the conductor is wound about the two winding axes in opposite directions (opposite winding directions). Here, again, a central region of the respective figure-8 coil is present, in which the two respective (first or second) conductor sections run along each other and in which the current flows in the same direction (e.g. along the first or second) direction (see also above). Again, the angles between the winding axes and the extension direction/plane can be those stated above.

Further, particularly, each of said conductor sections may comprise one or several electrical conductors, e.g. wires.

According to a further embodiment of the present invention, the first and/or second coil each comprise at least one layer or several layers, wherein particularly the at least one layer of the first coil is arranged on top of the at least one layer of the second coil normal to said extension plane (or in said extension direction), or wherein particularly the layers of the first and second coil are arranged on top of each other in an alternating fashion normal to said extension plane or in said extension direction. Here, the conductor sections described above comprise one or several layers accordingly.

Generally, the coil means, coils or loops do not need to have a circular shape or contour. The shape or contour of the coils/loops can be circular, but can also deviate from a circular configuration (e.g. rectangular, elliptical, rectangular with rounded edges etc.).

According to a further embodiment of the device according to the invention, the device comprises a further first conductor section, wherein the first conductor section and the further first conductor section extend along the first direction, and wherein the device comprises a further second conductor section, wherein the second conductor section and the further second conductor section extend along each other in the second direction, and wherein each conductor section is formed by a separate coil (i.e. four separate coils are present), and wherein particularly the current source means is designed to apply a current to said separate coils such that the current in said two first conductor sections flows in the same direction, particularly in or counter to the first direction, and such that the current in said two second conductor sections flows in the same direction, particularly in or counter to the second direction.

Providing four coils in this manner (i.e. two coils per direction) for e.g. moving the magnet in 2D allows to generate a homogenous current flow in the center of the coil carrier/PCB (see also below) where the magnetic field is maximal.

Preferably, said coils are designed to be implemented in a layered PCB structure. Preferably, both orthogonal directions are alternating in the layer design yielding a bidirectional force. Here, particularly, the coil carrier/PCB can be designed to have different shapes (e.g. a round contour/periphery). Particularly, advantageously, the return current flow through the coils at the outer side of the coil carrier/PCB only creates a minor back action force due to a provided guiding structure that is optimized to minimize the magnetic flux outside of the center of the coil carrier (e.g. PCB). Further, particularly, a magnetic return structure may also help to shield the coils from external magnetic fields, which could otherwise disrupt the actuation. The return structure and the magnetic shield do not have to be the same structure. An electromagnetic shield is also called a Faraday cage and may consist in a conductive sheet that surrounds the coils.

Further, according to an embodiment of the device according to the invention the first and the second conductor section are each formed by a separate coil, which separate coils are each wound around a magnetic flux guiding plate (e.g. in the form of an iron plate or a steel plate. Further also other materials that are described herein in the context of such magnetic flux guiding structures may be used.

Preferably, the first and the second conductor section each comprise a plurality of parallel wire sections, wherein the wire sections of the first conductor section run across the wire sections of the second conductor section so that a lattice structure of wire sections is formed on the surface of said magnetic flux guiding plate facing e.g. said magnet.

Here, a (e.g. merely very thin) PCB with required electrical and optical components may be positioned on top of such a plate, e.g. on top of said wire sections, which are designed to create an ideal homogenous current flow per direction (particularly no current flow in opposite direction potentially causing a back action force).

Preferably, said magnetic flux guiding plate may be embedded into a magnetic flux guiding structure e.g. a magnetic field (or flux) return structure of the device or may form part of a bottom or the complete bottom of an outer magnetic flux guiding structure as described in the various embodiments herein. Preferably the coil wires are closed underneath said plate that is e.g. embedded in the return structure. Due to the plate, further magnetic flux guiding (e.g. return) structures below said plate may be omitted since the plate may perform the function of such a structure.

Thus, preferably, the thickness of the magnetic flux guiding plate is such that it becomes part of the flux guiding structure and the back flowing current through the coil windings underneath the iron plate does not modify the magnetic field inside an (e.g. outer) magnetic flux guiding structure as described herein.

Such a coil structure allows to generate a uniform unidirectional force, comprises a high coil package density as well as a good thermal connection of coil (namely to the iron plate/return structure). According to a further (second) aspect of the present invention, a device for pivoting an optical element is disclosed, comprising:

an optical element, wherein the optical element is movably mounted so that the optical element can be tilted at least about a first axis, a (e.g. permanent) first magnet (also the other magnets described below may be permanent magnets) extending in an extension direction, wherein the first magnet comprises a magnetization aligned with said extension direction (i.e. the magnetization runs parallel to the extension direction) or running perpendicular to the extension direction, and wherein the first magnet comprises a front side, a first coil means facing the front side of the first magnet in the extension direction or perpendicular to the extension direction, wherein the first coil means comprises a conductor that is wound about a first winding axis, wherein particularly said first winding axis runs parallel to the extension direction of the first magnet, when the first magnet is arranged in a certain (e.g. non-tilted) position, and wherein the optical element is rigidly coupled to the first magnet or to said first coil means, and a current source means electrically connected to the first coil means, which current source means is designed to apply an electrical current to said first coil means, so that an electromagnetic force is generated between the first magnet and the first coil means so that the optical element is tilted about said first axis in or counter to a first tilting direction (depending on the direction of the current in the first coil means).

According to an embodiment of the present invention, the device comprises a second magnet extending in an extension direction, wherein the second magnet comprises a magnetization aligned with said extension direction of the second magnet or running perpendicular to the extension direction of the second magnet, (particularly the extension directions of the first and second magnet run parallel with respect to each other), and wherein the optical element is movably mounted so that the optical element can be tilted also about a second axis being different from the first axis. Further, particularly, the device comprises a second coil means facing a front side of the second magnet, particularly in the extension direction of the second magnet (or perpendicular to the extension direction of the second magnet), wherein the second coil means comprises a conductor that is wound about a second winding axis, wherein particularly said second winding axis runs parallel to the extension direction, when the second magnet is arranged in a certain position, and wherein the optical element is rigidly coupled to the second magnet or to the second coil means (and particularly first coil means). Further, particularly, the current source means is also electrically connected to the second coil means and designed to apply an electrical current to said second coil means, so that an electromagnetic force is generated between the second magnet and the second coil means, so that the optical element is tilted about a second axis in or counter to a second tilting direction (depending on the direction of the current in the second coil means).

Particularly, when the optical element is rigidly coupled to the first coil means it is also rigidly coupled to the second coil means (and eventually to further coil means). Particularly, in embodiments where the optical element is coupled to said coil means, the optical element can be rigidly coupled e.g. to the coil carrier (see below), e.g. either directly or indirectly via other components.

Particularly, the second tilting direction differs from the first tilting direction, wherein the second tilting direction particularly extends orthogonal to the first tilting direction. Further, particularly, the first axis extends orthogonal to the second axis. However, in case a first axis and a second axis are present, the two axes do not need to run orthogonal with respect to other. Correspondingly, the same holds for the first and second tilting direction. Further, in case two tilting axes, namely the first and the second axis, are present, the first direction of the first conductor sections(s) does not have to be aligned with the first axis. Further the second direction of the second conductor section(s) does not have to be aligned with the second axis.

Thus, again, the optical element according to the second aspect of the present invention can be pivoted in 2D.

Also here, the optical element can be one of the elements described above. Particularly, as before, the current source means is designed to apply the current to the first coil means and to the second coil means independently from each other, so that each of said currents can be separately controlled and adjusted (e.g. by the current source means). Particularly, the current source means may comprise a first current source for the first coil means (and eventually for a further coil means, see below), wherein the first current source is electrically connected to the first coil means and designed to apply said current to said first coil means. Further, particularly, the current source means may comprise a second current source for the second coil means (and eventually for a further coil means, see below), wherein the second current source is electrically connected to the second coil means and designed to apply said current to said second coil means.

Further, particularly, the first and the second coil means extend along a (fictitious) extension plane along which also said front side may extend (alternatively, the front side may extend perpendicular to the extension plane), wherein the front side may be tilted with respect to said extension plane depending on the tilt of the optical element (or of the magnets). Further, particularly, the first and second tilting direction extends along or in said extension plane as well, (e.g. span said extension plane). Further, the two magnets (or the optical element) may comprise a certain position in which the extension direction of the respective (first or second) magnet or its magnetization extends perpendicular to said extension plane and/or in which said front side of the magnet extends parallel (or perpendicular) to said extension plane.

Particularly, the first and/or the second coil means are coaxially arranged with respect to the associated magnet (e.g. with the respective extension direction), wherein particularly the outer diameter of the first and/or second coil means is larger than the outer diameter of the respective magnet.

Particularly, the first and second coil means are each formed as a separate coil forming a loop, respectively. Furthermore, particularly, the first and the second coil means each extend along said plane, wherein they do not overlap, but extend side-by-side in or along said extension plane.

Particularly, the device according to the second aspect of the present invention comprises four magnets, namely the first, the second as well as a third and a fourth magnet. Particularly, also the third and the fourth magnet extend in an extension direction and comprise a magnetization aligned with the respective extension direction (or running perpendicular thereto). Furthermore, particularly, also the third and the fourth magnet are rigidly coupled to the optical element (however, instead, it is also possible that the optical element is coupled to the coil means or coil carrier). Particularly, the device comprises a corresponding plurality of coil means (e.g. formed as separate coils forming a loop respectively), namely the first and the second coil means, as well as a third and a fourth coil means. Furthermore, particularly, the third coil means is associated to the third magnet and faces the front side of the third magnet in the extension direction of the third magnet, and the fourth coil means is associated to the fourth magnet and faces the front side of the fourth magnet in the extension direction of the fourth magnet.

Also, particularly, the third and the fourth coil means comprises a conductor that is wound about a third winding axis (third coil means) and a fourth winding axis (fourth coil means), wherein the respective winding axis is oriented parallel to the magnetization of the associated (third or fourth) magnet, when the respective magnet is arranged in said certain position (see above) where the respective magnet is e.g. not pivoted. Particularly, the third and the fourth coil means (and the conductor of the respective coil means) extend along said extension plane running perpendicular to the respective winding axis of the third and fourth coil means.

Particularly, also the third and fourth coil means are each formed as a separate coil forming a loop, respectively. Further, particularly, the third and the second coil means each extend along said extension plane, wherein particularly the four coil means do not overlap but are arranged side-by-side in or along said extension plane.

Particularly, the first and the third coil means face each other in the first direction while the second and the fourth coil means face each other in the second direction running particularly perpendicular to the first direction.

Particularly, the current source means is electrically connected to the coil means, which current source means is designed to (independently) apply an electrical current to the first, second, third and/or fourth coil means so that an electromagnetic force is generated that tilts the optical element in or counter to the first direction and/or in or counter to the second direction (about the respective axis) depending on the direction of the current in the respective coil means Particularly, the third and/or the fourth coil means are also coaxially arranged with respect to the associated magnet, wherein particularly the outer diameter of the third and/or fourth coil means is also larger than the outer diameter of the respective (third or fourth) magnet.

It is also possible to provide a magnetic flux return structure for the first and the second magnet (and particularly also for the third and fourth magnet). Each magnetic flux return structure particularly comprises a limb extending parallel to the extension direction of the associated magnet, which limb extends through the associated coil, wherein the respective coil faces the associated magnet in a direction perpendicular to the respective extension direction or along said extension plane.

Generally, instead of using a plurality of magnets, such as e.g. four magnets, merely one magnet may be provided in the second aspect of the invention, wherein then a magnetic flux return structure is used that guides the magnetic flux to the individual coil means (e.g. to four different coils). Thus, effectively, four magnet means or magnetic fluxes are provided in this way which can interact with an associated coil means as described above.

The following features and embodiments can be applied to both aspects of the present invention described above.

Further, in all embodiments, the device can comprise a coil carrier for carrying the first and/or second coil means (and eventually further coil means) or for carrying said separate four coils (see above). Particularly, the coil carrier may be a board, e.g. a printed circuit board, wherein the first and/or second coil means (and eventually also further coil means such as the third and/or fourth coil means) is arranged on the coil carrier or integrated into the coil carrier. As already mentioned above, instead of rigidly coupling the optical element to the magnet, one may also couple the optical element to the coil carrier which then moves relative to the then fixed magnet(s), Particularly said carrier is a plate-like carrier, wherein the dimensions of the carrier perpendicular to the first and/or second winding axis are significantly larger than the thickness of the carrier along the first and/or second winding axis.

Further, according to an embodiment of the present invention, the first and/or second coil means (and eventually further coil means) is formed as a planar coil for example as a single- or multi-layered printed circuit board coil. Also the third and/or fourth coil means can be planar coils. In other words, the respective coil or coil means may be integrated or embedded into the coil carrier being formed as a printed circuit board.

Particularly, a planar coil in the sense of the present invention is a coil, where the outer diameter perpendicular to the winding axis or axes is at least as large as the thickness in the direction of the winding axis (or axes). Preferably, said diameter is significantly larger than said thickness, particularly 10 times larger, particularly 100 times larger, particularly 1000 times larger, For instance, a planar coil (means) can have a thickness in the direction of the winding axis of e.g. 30 μm and a diameter (perpendicular to the winding axis) of e.g. 30 mm.

Generally, according to a further embodiment of the present invention, the device according to the invention comprises a sensor means, particularly comprising at least one magnetic field sensor (such as a Hall sensor), for measuring the position of the first magnet or said plurality of magnets.

Particularly, the sensor means is arranged on the coil carrier, particularly on a side of the coil carrier facing the magnet or the plurality of magnets, or on a side of the coil carrier facing away from the magnet or the plurality of magnets. Particularly, the sensor means faces the magnet in the extension direction, and is particularly coaxially arranged with the first magnet (at least in said certain position of the magnet)

Particularly, when the sensor means is arranged on the side facing the magnet or the plurality of magnets, the sensor means comprises a number of magnetic field sensors (e.g. Hall sensors) corresponding to the number of magnets, wherein each magnetic field sensor is arranged adjacent to an associated magnet. Particularly, when the sensor means is arranged on said other side facing away from the first magnet, the sensor means comprises particularly a single magnetic field sensor, e.g. a (2D) Hall sensor, being designed to detect the position of the magnet.

Further, according to an embodiment of the device according to the invention, the sensor means may comprise four Hall sensors, i.e, two Hall sensors per rotation axis which are arranged on orthogonal sides of the mirror along the rotation axes, preferably such that a signal generated by said sensor means comprising said four Hall sensors depends on the position of the magnet.

Further, particularly, the device comprises a controller for controlling the current source means (e.g. the individual current sources) such that a current position of the first magnet or said plurality of magnets and therefore of the optical element connected thereto approaches a reference value.

Particularly, the current source means and/or the controller may be integrated into the sensor means (e.g. Hall sensor).

According to an alternative embodiment, the device comprises a light source, particularly an LED, and a light intensity sensor, such as a photo diode, wherein the light source is configured to emit light, so that said light emitted by the light source is reflected towards the intensity sensor (e.g. photo diode) by the magnet or a reflection means (e.g. mirror) connected to the magnet such that a (feedback) signal (e.g. current) generated by the intensity sensor (photo diode) due to said reflected light impinging on the intensity sensor (e.g. photo diode) depends on the position of the magnet.

According to a further embodiment, the photo diode is a quadrature photo diode (e.g. a photodiode comprising four quadrants, wherein each quadrant provides a signal depending on the light impinging on the respective quadrant) or four single photo diodes e.g. arranged such that they resemble a quadrature photo diode, wherein said light source (e.g. LED or laser) is arranged in the center of the quadrature photo diode, particularly in a recess of the photo diode.

Further, according to an embodiment of the device according to the invention, the magnet or said reflection means comprises a shading, such that said signal is indicative of a rotation angle of the magnet about the extension direction of the magnet as well as of a tilt of the magnet in the first and/or second tilting direction.

Further, according to an embodiment of the device according to the invention, the device comprises a capacitive sensor means that is configured to generate a signal that depends on the position of the magnet.

Particularly, said sensor means may comprise an electrically conducting first plate member mounted to the moving mirror. Further, particularly, the sensor means may comprise a second and a third (separate) plate member coupled e.g. to the coil carrier, which second and third plate member do not move with the mirror and are spaced apart from the first plate member but face the latter, so that two capacitors arranged in series are formed by said plate members.

The capacitive sensor means is preferably configured to measure the capacity of the two capacitors in series which changes when the mirror moves. This capacity corresponds to a signal that can be used by the controller as described above for controlling movement of the mirror.

Particularly, the device comprises a controller for controlling the current source means (e.g. the individual current sources) such that the signal approaches a reference signal associated to a desired reference position of the first magnet and therefore of the optical element. Particularly, the controller is configured to control the current source such that a rotation of the magnet or optical element outside of its nominal tilt range is prevented (e.g. a rotation about the extension direction of the magnet).

Further, according to an embodiment of the present invention, for supporting the optical element, the device comprises a bearing ball that is arranged in a recess of the device, particularly in a recess of a cage member of the device, which cage member is particularly connected to the coil carrier.

Particularly the bearing ball is connected to the optical element.

Particularly the optical element is connected to the bearing ball via a holding element which holds the optical element.

Particularly, the bearing ball comprises a spherically curved convex surface that slides along a bearing surface of the recess of the cage member, so that the bearing ball can rotate in said recess in order to pivot the magnet and optical element.

Further, particularly the bearing ball comprises a first side (e.g. lower) side of the bearing ball, which first side faces the coil carrier or the present coil means, while a second side of the bearing ball faces away from the first side.

Particularly the magnet and/or its front side is arranged on the first side of the bearing ball, while the optical element and/or holding element is arranged on the second side of the bearing ball.

Particularly, the magnet is connected to the first side of the bearing ball, while the second side of the bearing ball is connected to the optical element, particularly via a holding element being connected to the bearing ball.

Particularly, the magnet is arranged in a recess of the bearing ball on the first side of the bearing ball, wherein particularly the recess is a through-opening of the bearing ball, and wherein a back side of the magnet is designed to be connected to the optical element, which back side of the magnet faces away from said front side of the magnet. Particularly, said back side of the magnet is flush with the surface of the bearing ball or may protrude out of the recess. Further, particularly, an end portion of the magnet comprising said front side of the magnet protrudes out of the recess of the bearing ball on the first side of the bearing ball, e.g. towards the coil carrier or coil means.

Further, alternatively, the magnet is arranged in a through-opening of the bearing ball on the first side of the bearing ball, wherein the holding member is inserted with a portion into the through-opening on the second side facing away from the first side of the bearing ball. Particularly, the holding member is designed to hold the optical element, i.e., the optical element is connected to the holding member. Particularly, an end portion of the first magnet comprising said front side of the first magnet protrudes out of the through-opening of the bearing ball.

Alternatively, particularly, the holding element comprises a portion that is arranged in said recess (e.g. through-opening) of the bearing ball and protrudes out of it with an end portion on the first side of the bearing ball, wherein the magnet is fastened to said end portion of the holding element.

In case several magnets (e.g. said four magnets) are present, the magnets are particularly connected to a first side of the holding member or optical element which faces said coil means or coil carrier. This first side of the holding member faces away from a second side of the holding member to which the optical element is attached.

Further, particularly, the magnet can form said bearing ball.

Particularly, the magnet and/or the holding element can be glued to the bearing ball.

Particularly, the bearing ball and the cage member form an insert molded ball bearing. Particularly, the bearing ball comprises a rotational symmetry to allow a rotational degree of freedom without influencing the optical property of the optical element.

Further, according to an embodiment of the present invention, the device comprises a ball bearing comprising a plurality of bearing balls, for supporting the magnet, so that the magnet can be tilted about an arbitrary axis, which ball bearing is arranged in a circumferential gap formed between a first support member supporting the mirror and a second support member which surrounds the first support member and/or magnet, wherein the second support member is preferably connected to the coil carrier.

Further, according to an embodiment of the device according to the invention, for preventing a snap-in of the magnet e.g. to a magnetic flux guiding structure or return structure, which may be arranged e.g. below the coil carrier (e.g. PCB) as described herein, and/or for preventing a rotation of the magnet (e.g. about its extension direction) the device comprises an inner magnetic flux guiding structure connected to the mirror and an (e.g. annular) outer magnet flux guiding structure connected to the coil carrier, which outer magnetic flux guiding structure surrounds said inner magnetic flux guiding structure.

Furthermore, according to an embodiment, the (e.g. outer) magnetic flux guiding structure is also configured to avoid that the optical element and the magnet fall out of the device. Furthermore, the (e.g. outer) magnetic flux guiding structure or return structure (or alternatively a specific shield) is also configured to shield the device from outer magnetic fields.

Further, according to an embodiment of the present invention, the inner magnetic flux guiding structure comprises a plurality of first protrusions, wherein each first protrusion protrudes radially outwards towards the outer magnetic flux guiding structure, and wherein the outer magnetic flux guiding structure comprises a corresponding number of second protrusions, wherein each second protrusion protrudes radially inwards towards the inner magnetic flux guiding structure, so that each first protrusion is aligned with an associated second protrusion with which it forms a gap.

According to a further embodiment of the present invention, the optical element or said holding member is supported, particularly on the coil carrier, by an elastically deformable spring means particularly providing a restoring force.

Particularly, the spring means can be a body, such as a cylindrical body, out of an elastic material such as a polymer.

Further, according to an embodiment of the present invention, the spring means comprises a central part connected to the plurality of magnets (e.g. the first, second, third and/or fourth magnet), wherein the central part is integrally connected to a circumferential first part surrounding the central part such that the central part can be tilted about a first axis with respect to the first part, and wherein the first part is integrally connected to a circumferential second part surrounding the first part so that the first part together with the central part can be tilted with respect to the second part about a second axis running perpendicular to the first axis, and wherein the second part is particularly connected to the coil carrier.

Further, according to an embodiment of the present invention, the spring means comprises at least one arm that extends from a first fixation point via which it is fastened to the optical element, particularly to the first magnet or one of the plurality of magnets, to a second fixation point via which it is fastened to the coil carrier Particularly the two fixation points are as close to a central axis of the optical element, which central axis runs perpendicular to the optical element and/or coil carrier.

Further, according to an embodiment of the present invention, the spring means particularly forms a Cardan joint.

Particularly, the spring means comprises a cross-shaped spring member having four arms (i.e. a first, a second, a third and a fourth arm) extending outwards from a center of the spring member. Particularly, the first arm is aligned with the second arm, wherein the first and the second arm extend for example at a 45° angle with respect to the first axis (of the tilting movement), and wherein the third arm is aligned with the fourth arm, wherein the third and the fourth arm are perpendicular to the first and second arm. Particularly, each arm comprises an outer end region. Furthermore, the device comprises a first carrier member (forming the holding member) to which the optical element is connected, and to which the magnet or the first and/or the second magnet (and eventually also the third and the fourth magnet) is connected (instead of the magnet(s) the coil means can be connected to the first carrier member), and a second carrier member to which the first and/or second coil means (and eventually also the third and fourth coil means) is connected (instead of the coil means the magnet(s) can be connected to the second carrier member), wherein particularly the cross-shaped member is arranged between the two carrier members, and wherein the end regions of the first and the second arm are particularly fastened to the first carrier member, while the end regions of the third and the fourth arm are particularly fastened to the second carrier member, so that the first carrier member can be tilted (together with the optical element) about the first and or second axis with respect to the second carrier member. It is to be noted concerning the spring means that the optical element can be tilted together with the magnet(s) with respect to the coil means, wherein the coil means are fixed. Alternatively, the optical element can be tilted together with the coil means with respect to the magnet(s), wherein the magnet(s) is/are fixed. Particularly, this applies to all support concepts used within the framework of the present invention.

Instead of a spring means also a gyro joint (also denoted as two-axis gyro) may be used. This arrangement comprises a first member, a second member, and a third member forming said holding member for holding the optical element 10 and particularly the magnet(s) or the used conductor section(s) or coil means. In order to achieve a 2D pivotable support for the optical element, the second member is rotatably supported on the first member so that the second member can be tilted about a first axis with respect to the first member, and wherein the third member is rotatably supported on the second member so that the third member can be tilted about a second axis (with respect to the second member) that is e.g. orthogonal to the first axis. As a result, the third member can be tilted about the two independent axes with respect to the first member in two dimensions (2D). The first member may be connected to the coil carrier or the used conductor section(s) or coil means, or, alternatively, to the magnet(s).

Further, according to an embodiment of the present invention, the device comprises a restoring force means being designed to provide a restoring force for returning the optical element to an initial position, wherein particularly the restoring force means particularly comprises one of the following:

a magnetic field (or flux) return structure, which in particular can be placed below the coil means or conductor section(s) to improve the magnetic flux (e.g. through the coils) generated by the magnet(s) (i.e. said magnet or the first, second, third, and fourth magnet) and to generate a restoring force. Particularly, the magnetic field return structure may comprise the form of a plate that is particularly connected to the coil carrier, particularly on a side facing away from the magnet(s). Particularly, said return structure can consist of a magnetically soft material and/or a ferromagnetic material (e.g. iron or a steel). Particularly, the magnetic field return structure extends along the extension plane/coil carrier perpendicular to the magnetization or extension direction of the magnet(s). Particularly, the return structure is designed to prolong the distance along which the magnetic field runs parallel to the extension direction of the respective magnet, thus yielding e.g. larger Lorentz forces on the conductor sections. Further, there is an attractive force between the magnetic field return structure and the magnet(s) that returns the magnet(s) into an initial position.

Alternatively, said restoring force means can comprise a magnet, or a spring means (e.g. as described above).

According to an aspect of the present invention, a field of view expansion imaging system is provided, which comprises at least one device according to an invention. Particularly, a field of view expansion imaging system is an imaging system (i.e. a system that generates an image) that is designed to expand a field of view, particularly to expand a field of view of a pre-defined first angle (e.g. 20°) to a field of view of a pre-defined larger second angle (e.g. 60°) by redirecting light from different directions onto an image sensor located behind a lens stack.

According to a further aspect of the present invention, a device according to the invention is used for dynamic light steering (in the illumination path or imaging path of a system), e.g. in illumination applications. According to an aspect of the present invention, a corresponding system for dynamic light steering is provided that comprises at least one device according to the present invention. The device can be used in a single unit configuration or in an array of multiple devices. E.g. according to a further aspect of the present invention, a system is provided that comprises a plurality of devices according to the invention, which devices are arranged in an array configuration. Generally, the device according to the present invention can be used for tilting the optical element merely in one dimension (1D) or in two dimensions (2D)

In all embodiments described above, the rotation axis or axes (i.e. the first and second axis) do not have to align with the force direction axis (e.g. the direction along which e.g. said Lorentz force acts on the conductor section(s) or magnet.

Generally, the optical element can be a prism, a mirror, a lens, a diffractive optical element and other optical elements.

The preferably non-magnetic bearing ball can consist out of one of the following materials: glass (e.g. fused silica), ceramics (e.g. Zirconia Oxide and Aluminium Oxide), Ruby, Sapphire, steel (e.g. chrome steel), AISI 316 (austenitic stainless steel).

The cage member can consist out of one of the following materials: Polyamide-imide (e.g. Torlon 4301), acetal resin (e.g. Derlin 500AL), PTFE (particularly reinforced PTFE, e.g. Rulon J), PVX (e.g. TecaPEEK), SLX (Nylon, e.g. Nycast NylOil).

The optical element, particularly in form of a mirror, can consist out of one of the following materials: Beryllium, Silicon, Fused Silica/Quartz, SiC, BK7, Sapphire (Al2O3), MgF2.

The magnet or the magnets described herein may be formed out of one of the following materials: Samarium Cobalt SmCo33EN S300, Neodymium-Iron-Boron (NdFeB) N50M.

For steel plates, AISI 1010 carbon steel may be used.

The printed circuit board (e.g. coil carrier) can for instance be formed out of FPC or can be a multilayer PCB such as HDI Anylayer.

The conductors for the coils may be made out of copper which can have a thickness in the range from 10 μm to 200 μm, particularly 20 μm to 60 μm.

As Hall sensors, the following sensors may be used: AS5013 (2D Hall sensor), AS5510, LC898214XC. Of course, other Hall sensors may also be used.

The materials stated above are to be understood as examples. Other materials may be used as well.

Particularly, a typical outer diameter of a device according to the invention lies within the range from 2 mm to 75 mm (along the extension plane).

Particularly, the device according to the invention can be used in the following fields or may be formed as a component of one of the following devices: lighting, machine vision, laser processing, light show, printers including 3D printers, metrology, medical equipment, time of flight cameras, field of view expander, Lidar, motion tracking, microscopes, endoscopes, research, surveillance camera, automotive, projectors, range finder, mobile phones, vision systems, ophthalmic lenses, ophthalmology equipment such as phoropter, refractometer, fundus cameras, ppt. biometrie, perimeter, refractometer, tonometer, anomaloskop, kontrastometer, endothelmicroscope, anomaloscope, binoptometer, OCT, rodatest, ophthalmoscope, RTA; as well as lighting devices, (e.g. head-worn) glasses, robot cams telescopes, binoculars, ophthalmic lenses, bar code readers, and web cams, fiber coupling, biometric devices, electronic magnifiers, military, digital still cameras, web cams, industrial applications, vision systems and head-up displays.

Particularly, the device according to the invention can be used in a vehicle for deflecting light generated by the headlights of the vehicle so as to generate a dynamic head light that travels along an adjustable direction and can thus be adjusted to the curvature of a road etc.

A further aspect of the present invention relates to an apparatus for 3D augmented reality, the apparatus comprising:
  a movable 2D mirror, preferably in the form of a device according to the invention as claimed in one of the claims 1 to 28 or as described herein, wherein said optical element of this device is a mirror,
  a light source, preferably a laser for generating a collimated light beam,
  a focus control device,
  an image projector, preferably a scanning mirror device,
  a projection screen, and
  an eye tracking device configured to detect the position of a pupil of an eye of a user of the apparatus with respect to the projection screen,
wherein the light source is configured to generate a light beam that is guided through the focus control device, which focus control device is configured to focus and defocus said light beam, and wherein the image projector is configured to generate an image using said light beam, wherein the moveable 2D mirror is configured to reflect said image onto the projection screen depending at least on the detected position of the pupil.

According to a preferred embodiment, the focus control device is a focus adjustable lens, most preferably in the form of a liquid lens (e.g. as described in U.S. Pat. No. 8,000,022 B2 or U.S. Pat. No. 8,755,124 B2 which are incorporated herein in their entirety by reference). However, the focus control device can also be a translational lens system.

Preferably, the image projector is a scanning mirror device that is configured to deflect said light beam so as to generate said image.

According to an embodiment of the apparatus, the apparatus is a head mounted display. Preferably, the projection screen is a curved semi-transparent or reflective screen (e.g. glass plate).

Preferably, according to an embodiment, the glass plate is partially or fully reflective for the wavelengths (colors) of the image projector.

Furthermore, according to an embodiment, the area of projection onto the projection screen (e.g. glass plate) is restricted at maximum to the current visual field of the eye and changes upon movement of the pupil using the movable 2D mirror (e.g. the device according to the present invention).

Preferably, the position of the pupil can be found with any suitable eye tracking device. The size of the projected image depends on the tilt angle of the surface of the optical element (mirror) of the moveable 2D mirror (e.g. device according to the present invention).

Therefore, the resolution of the projected image can be increased when illuminating only the visual field as compared to illuminating the entire projection screen/glass plate.

Particularly, the area that needs to be illuminated on the glass plate is given by the size of the projected virtual object. If the object is composed out of several subframes such that the total image that the human visual system processes is the superposition of the subframes, the illumination area can be further decreased increasing the pixel resolution per unit area. The subframes can be achieved by slightly moving the mirror (optical element) of the moveable 2D mirror (e.g. device according to the invention), e.g. within the visual field where symbols can be recognized and a high resolution virtual image is required. Preferably, in an embodiment, low resolution images can be projected into the binocular vision field that is restricted by the visual limit of the left and right eye and outside of the visual field where symbols can be recognized.

Further, particularly, the energy consumption is decreased when illuminating only a part of the projection screen (e.g. glass plate) as the totality of the emitted light can be directed into the pupil.

Furthermore, particularly, positioning of said focus control device or focus adjustable (e.g. liquid) lens between the collimated light source (e.g. laser) and the mirror (optical element) of the moveable 2D mirror (e.g. device according to the invention) enables a focusing and defocusing of the light rays such that the distance of the virtual image presented to the viewer can be changed dynamically.

Preferably, in an embodiment, the focal control device or (e.g. liquid) lens is configured to change the focal plane of the virtual image by modifying the collimation of the light rays of the individual pixels. Preferably, in the optical path, the focus control device (e.g. said lens) can be placed before or after the image projector (e.g. scanning mirror device). The position may depend on the image device and applied control algorithm.

According to a preferred embodiment of the present invention, a separated head mounted display is provided for each eye of the user so as to enable a stereoscopic vision such that the human visual system can reconstruct the distance of the object.

In other words, the apparatus according to the invention comprises the afore-stated components for each eye, respectively. The projection screen (e.g. glass plate) however may be used for both eyes.

Projecting images at different distances at a frame rate faster than the human visual system can process the images results in an overlay these images and the brain creates a 3D image with a depth of field depending on the different focal planes. This can be realized by an image projector and a focus control device (e.g. tunable lens) that can be adjusted sufficiently fast. As an example, the human vision system notices flicker below 16 Hz. Thus, preferably, to create a fluid 3D experience, the tunable (e.g. liquid) may be oscillating around e.g. 50 Hz or higher.

According to a further embodiment, besides the eye (motion) tracking device, a gesture tracking device may be provided that is configured to react on a movement of the eyelids, but also on gestures of hands of the user, so as to project images by means of the apparatus according to the recorded control commands from the eyelids and/or gestures.

Further features and advantages of the present inventions as well as embodiments of the present invention shall be described in the following with reference to the Figures, wherein FIGS. 1-3 show different embodiments of the device according to a first aspect of the invention, FIGS. 5-6 show different possibilities for supporting the magnet and the optical element of the devices shown in FIGS. 1-3 in a tiltable manner, FIG. 7 shows a cross-sectional view of an embodiment of the present invention of the kind shown in FIGS. 1-3, FIG. 8 shows an exploded view of the embodiment of the device according to the invention shown in FIG. 7, FIGS. 9-10 show different optical elements that can be tilted by the device according to the invention, FIG. 11 shows a perspective view of the principle underlying the first aspect of the present invention, FIG. 12 shows a modification of the embodiment shown in FIG. 2, FIG. 13 shows a perspective view of a further device for tilting an optical element using piezo actuators, FIG. 14 shows a further embodiment according to a second aspect of the present invention, FIGS. 15-16 show different schematical views of the embodiment shown in FIG. 14, FIG. 17 shows a further embodiment of the device according to the second aspect of the present invention, FIG. 18 shows a modification of the embodiment shown in FIG. 17, FIGS. 19-21 show a further embodiment according to the second aspect of the present invention, FIG. 22 shows a modification of the embodiment shown in FIG. 1, FIGS. 23-24 show a further embodiment according to the second aspect of the present invention, FIGS. 25-26 show a further embodiment according to the second aspect of the present invention, FIG. 27 shows an embodiment of a spring means for supporting the optical element in a tiltable manner;

in FIG. 37;

in FIG. 37;

Figure 1:
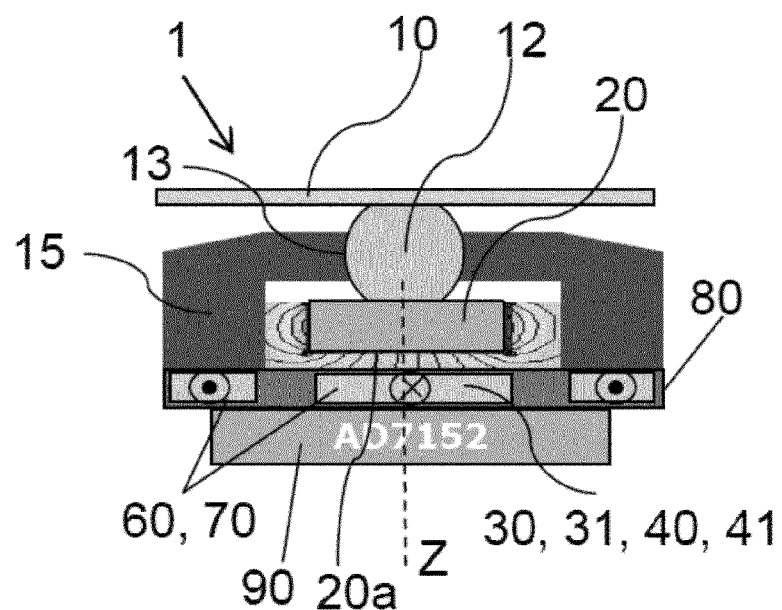
Figure 37:
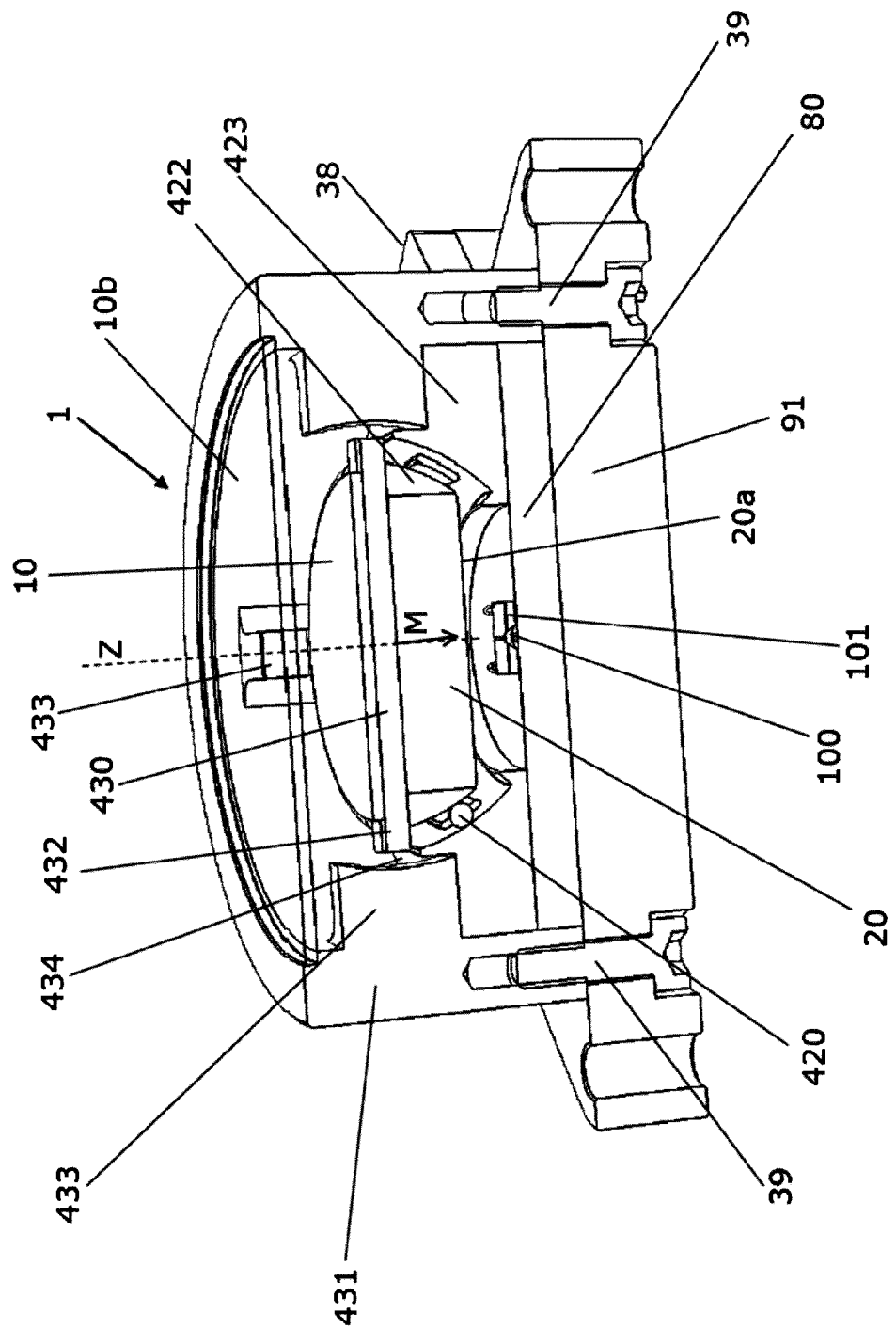
FIG. 37 shows a perspective view of a further embodiment of the device according to the invention.
Figure 42:
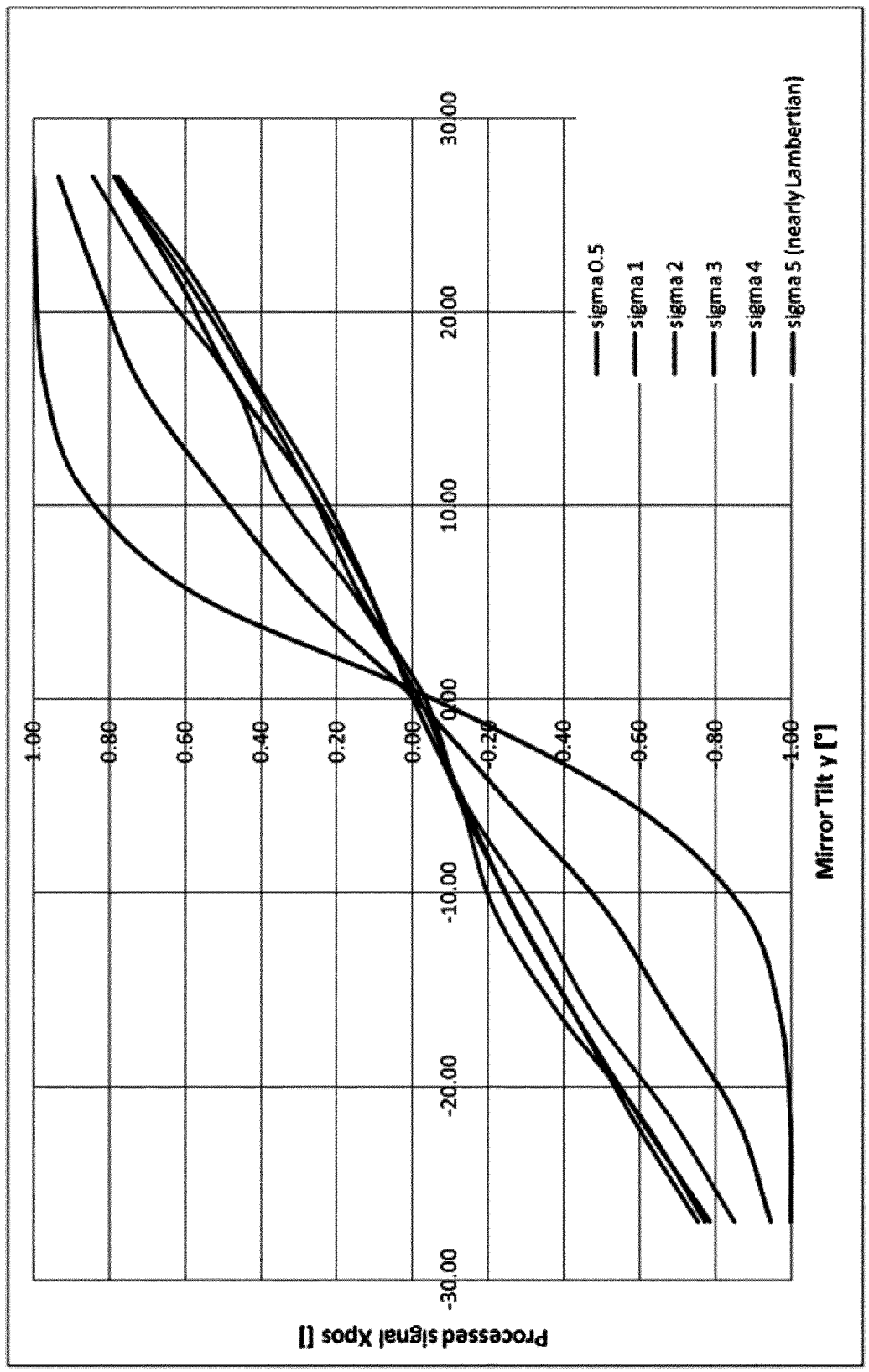
Figure 43:
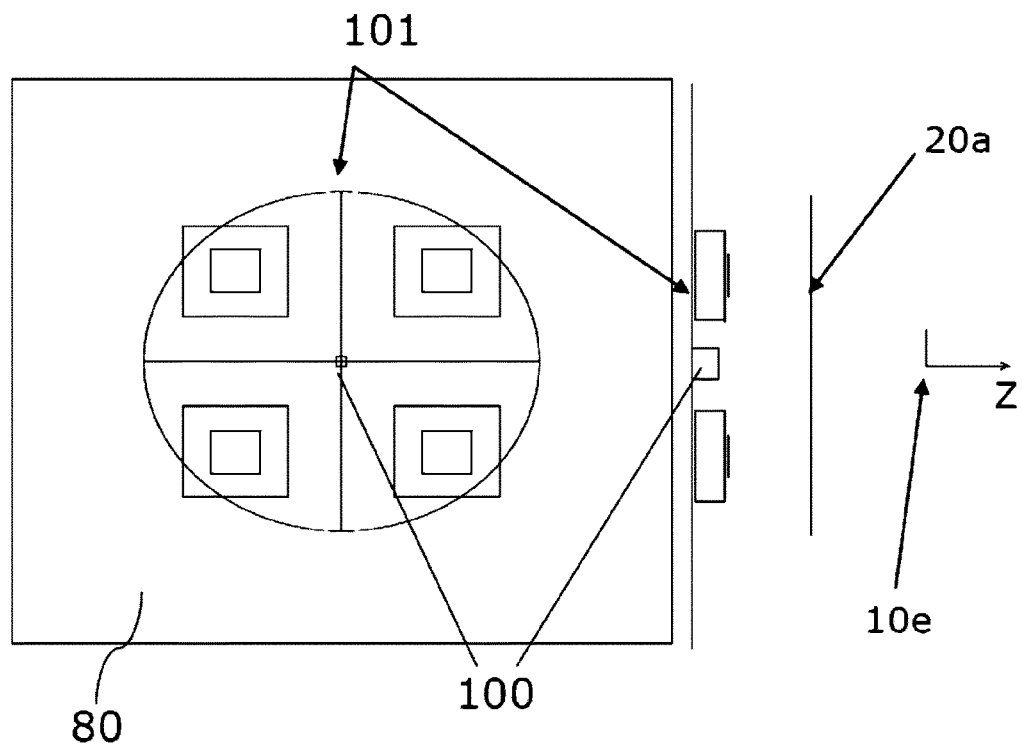
Figure 44:
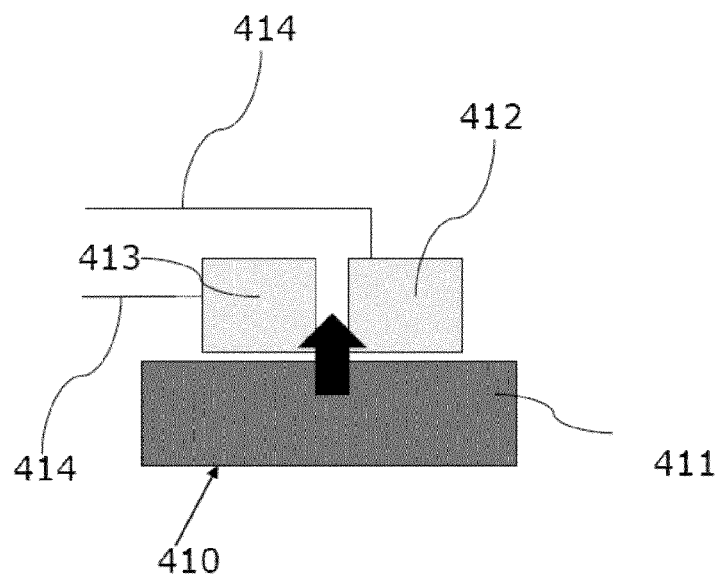
Figure 45:
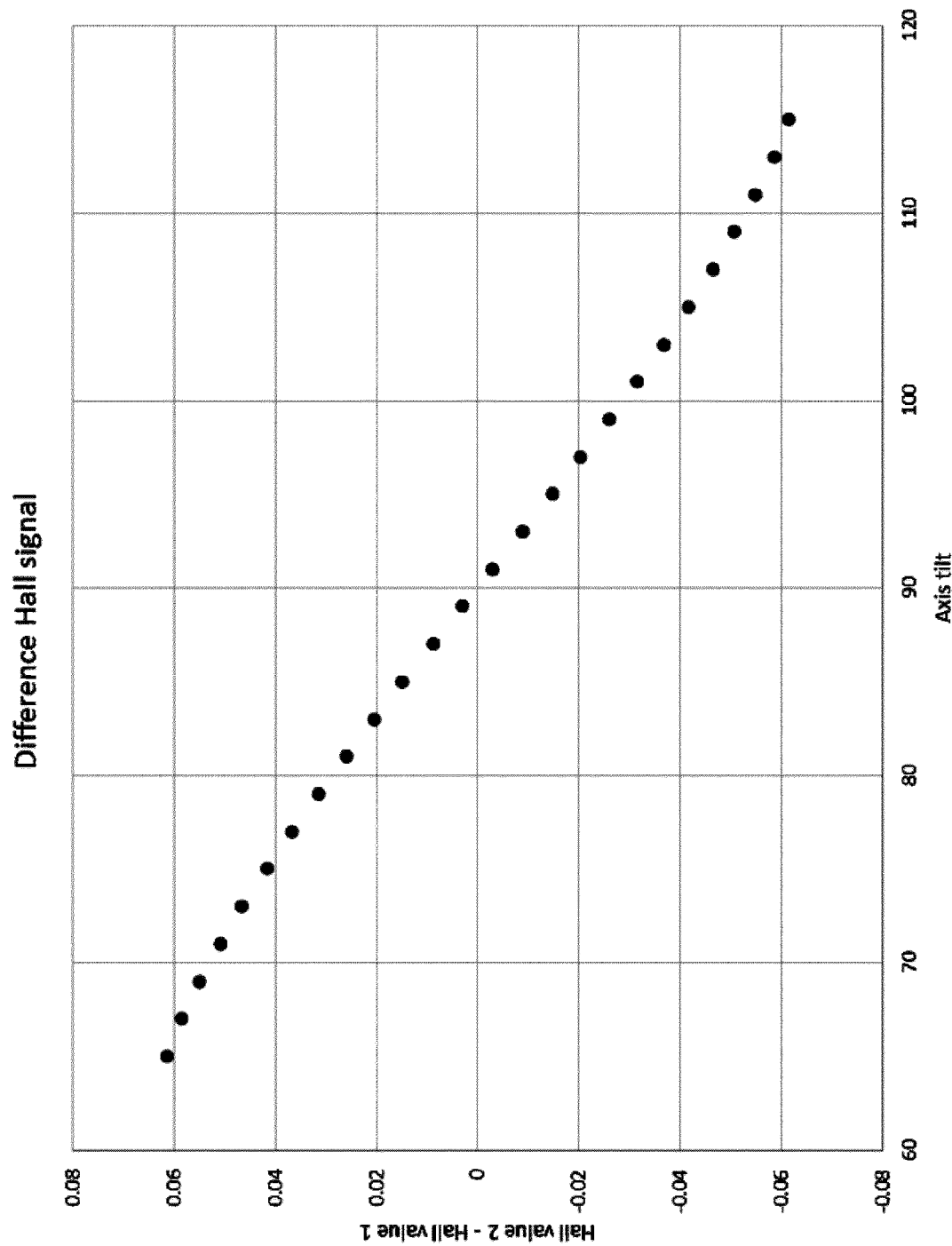
Figure 46:
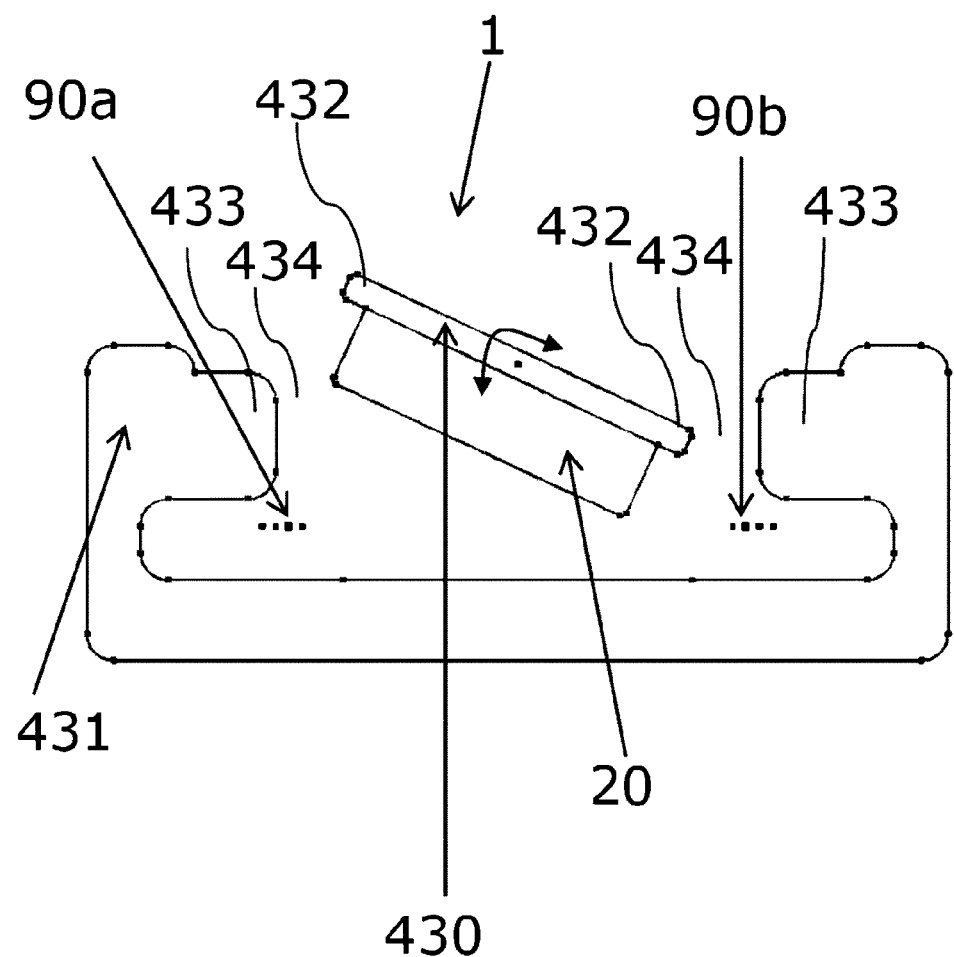
Figure 47:
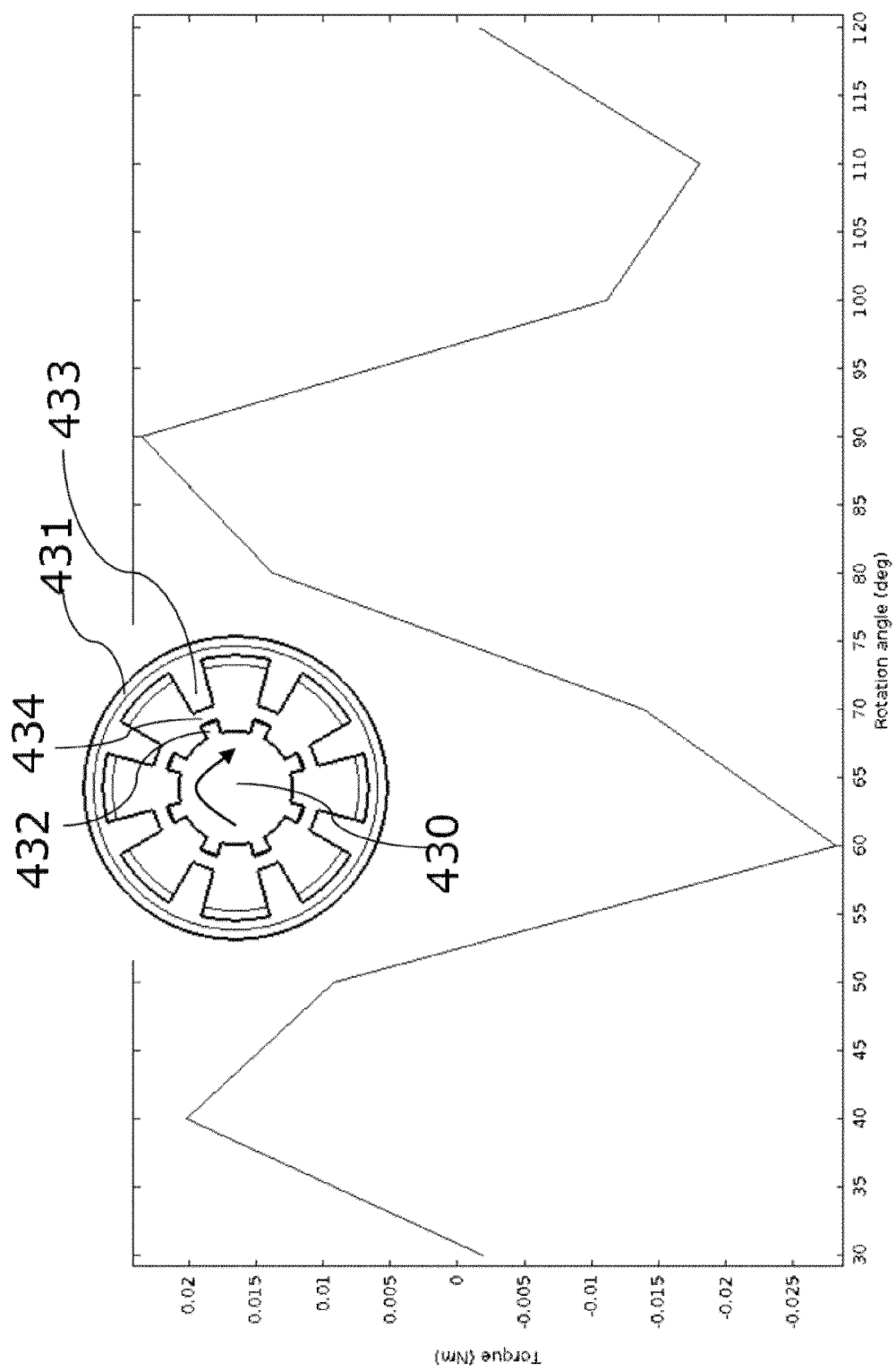
Figure 48:
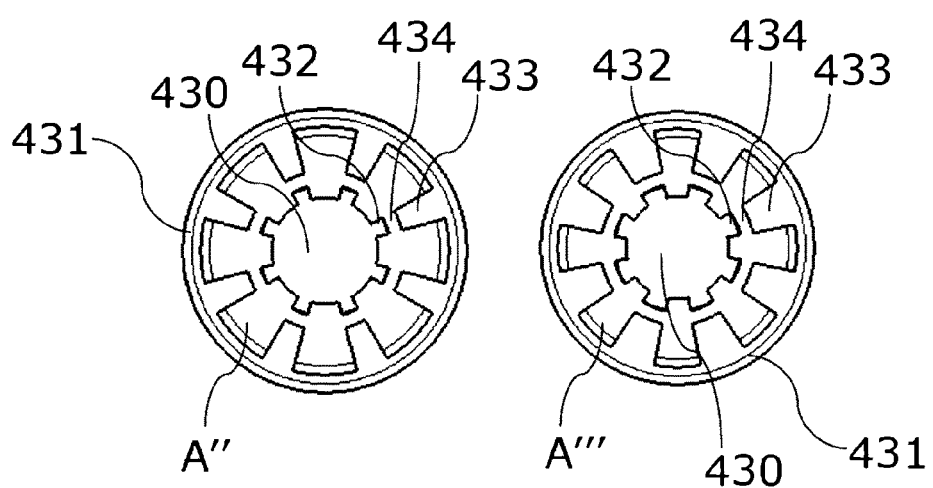
Figure 49:
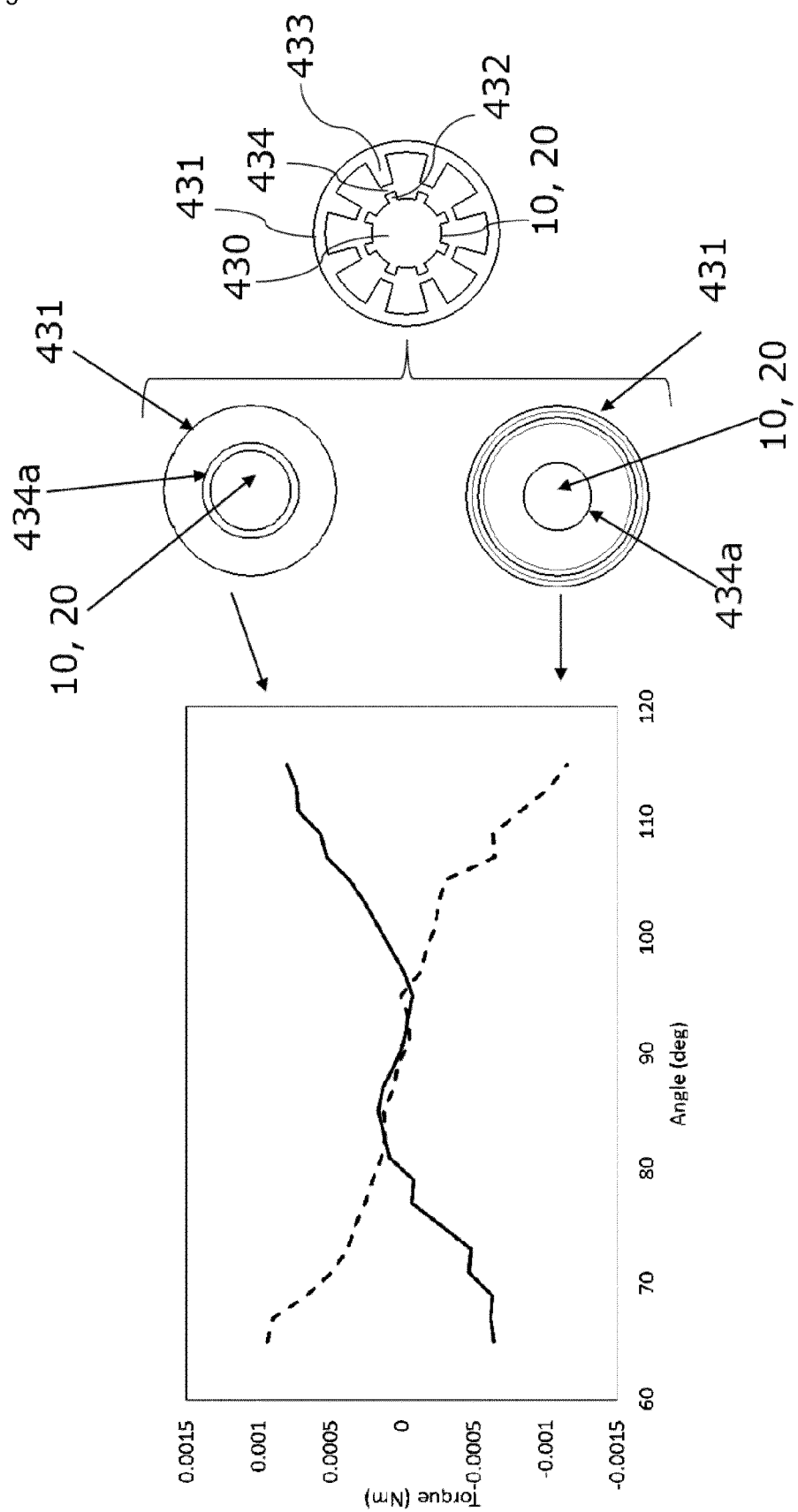
Figure 50:
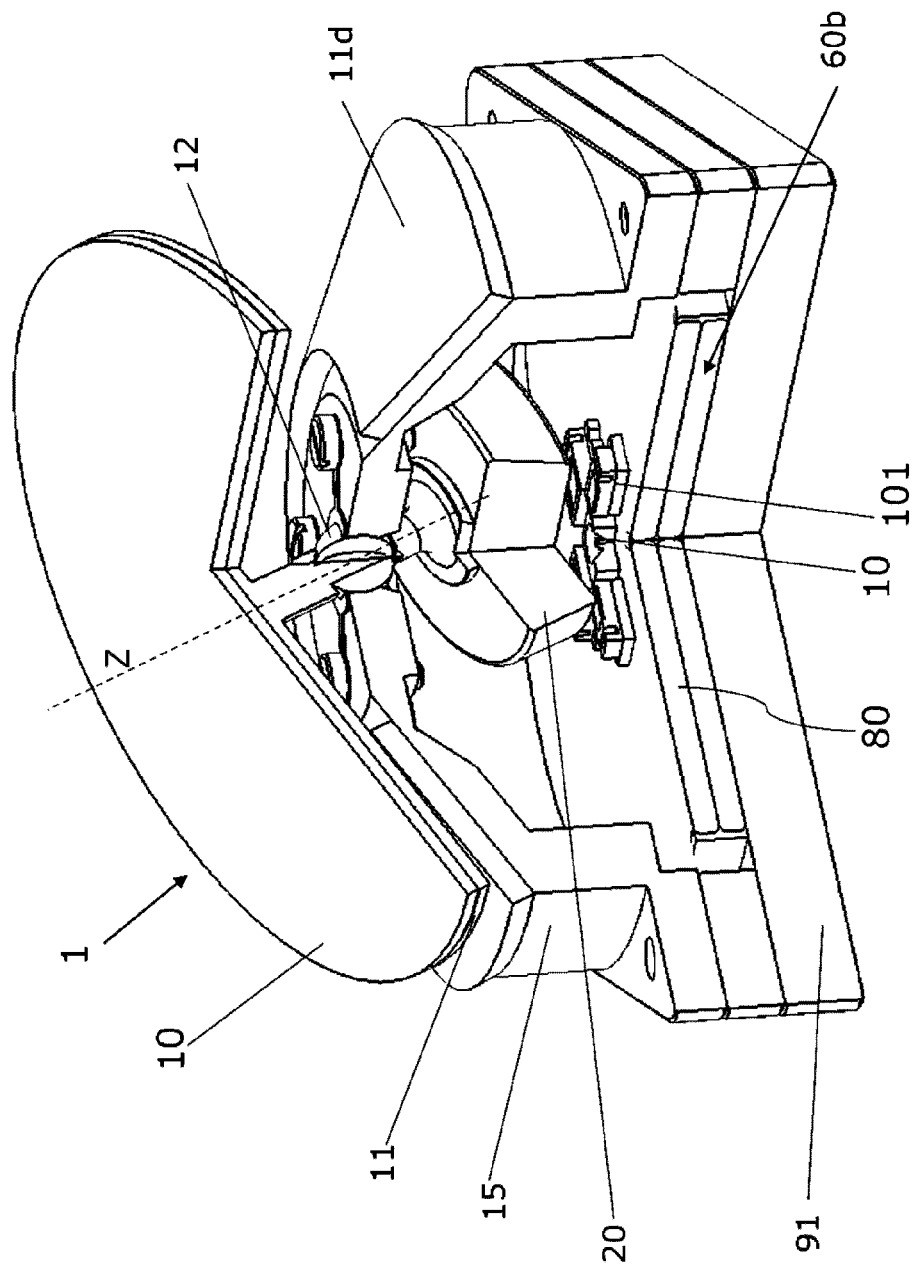
Figure 51:
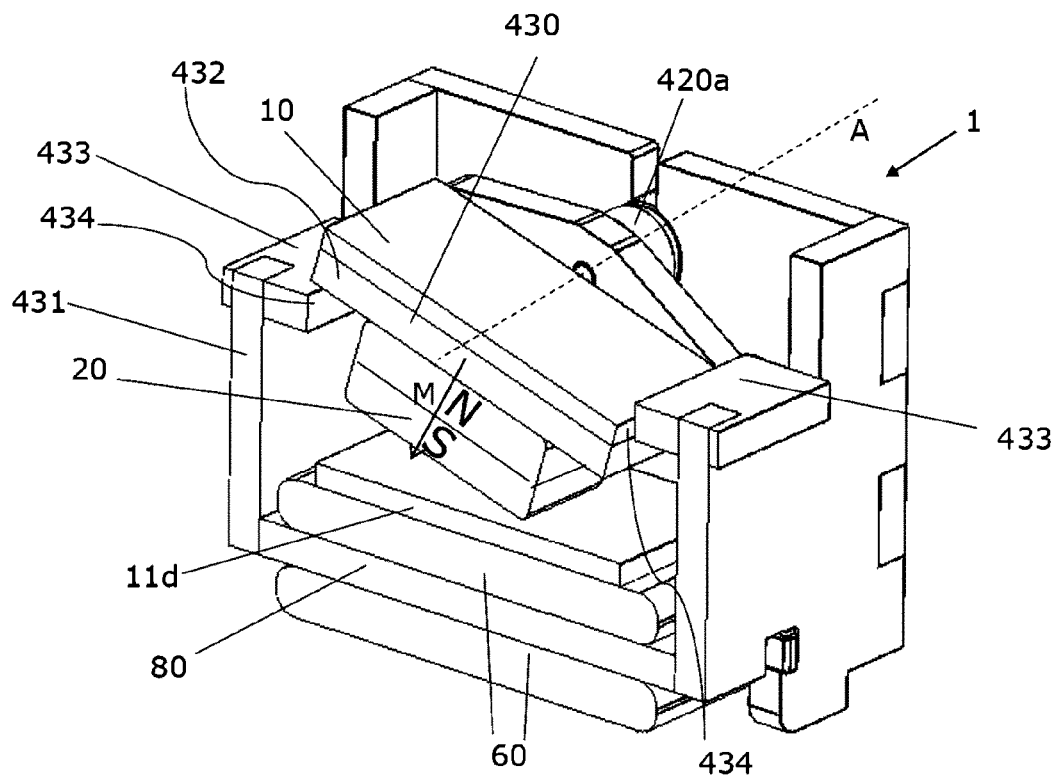
Figure 52:
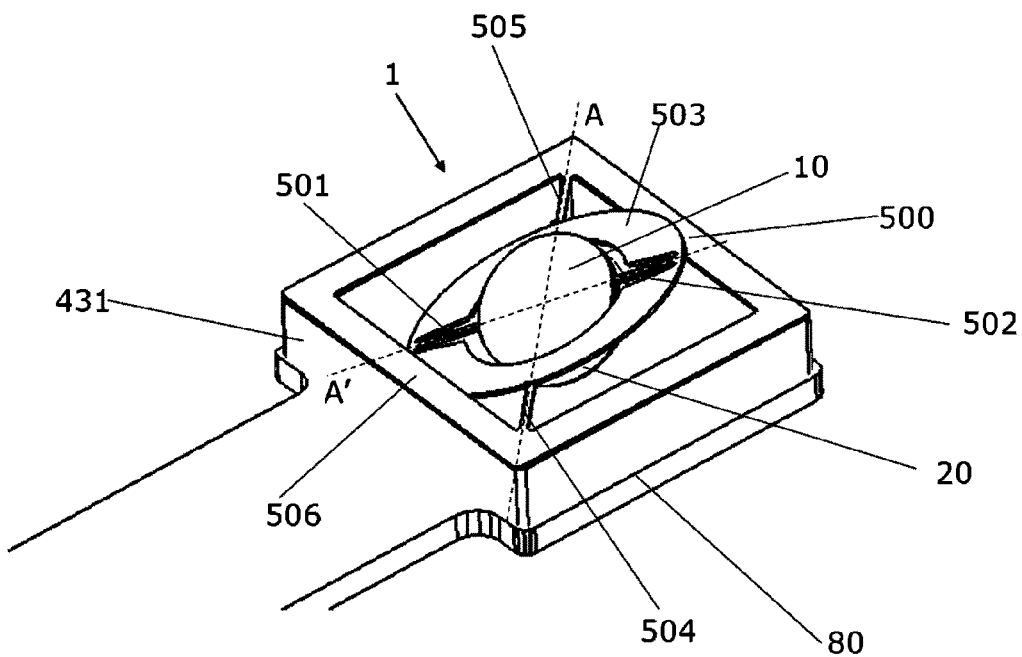
Figure 57:
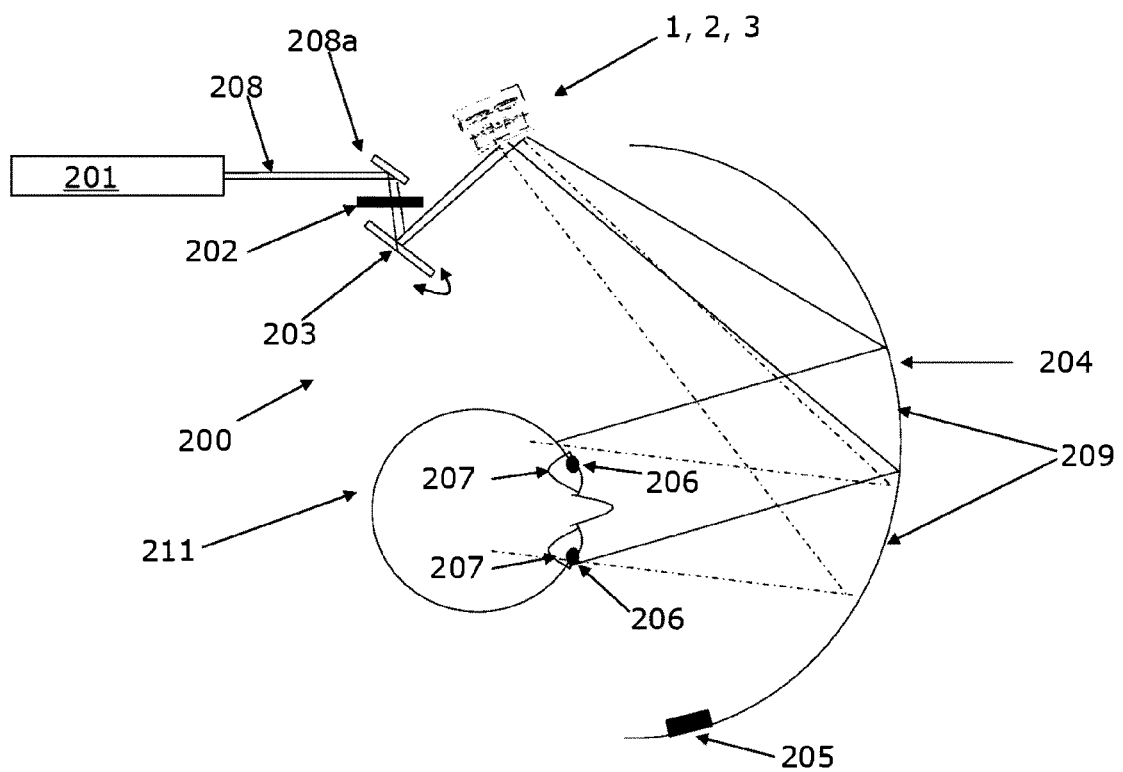
Figure 58:
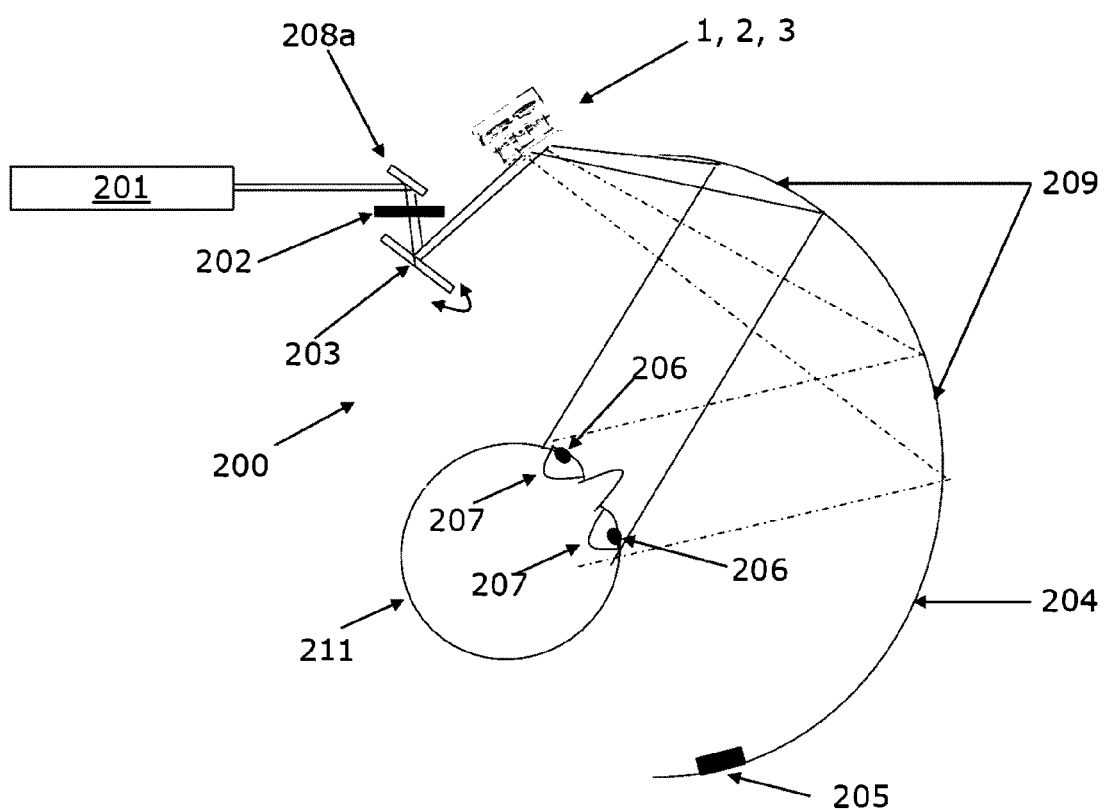

FIGS. 42-43 relate to the detection of axial rotation and tilt angle of the magnet of the device shown in FIG. 37;

FIG. 44 shows a further possibility for detecting the position of the magnet of a device according to the invention;

FIGS. 45-46 shows a further possibility of detecting the position of the magnet along one optical axis using two Hall sensors;

FIGS. 47-49 relate to the usage of inner and outer magnetic field guiding structures for preventing rotation of the magnet of the device according to FIG. 37 as well as for preventing snap-in of the magnet, e.g. to a ground return structure below the coil carrier/PCB;

FIG. 50 shows a further embodiment of the device according to the invention of the kind shown in FIG. 1;

FIG. 51 shows a further embodiment of a device according to the invention in the form of a 1D mirror device;

FIG. 52 shows a further embodiment of a device according to the invention, wherein the mirror is supported by a spring means;

FIGS. 53-56 relate to a first embodiment of an apparatus for 3D augmented reality according to the invention;

FIGS. 57-58 relate to a second embodiment of an apparatus for 3D augmented reality according to the invention.

Figure 11:
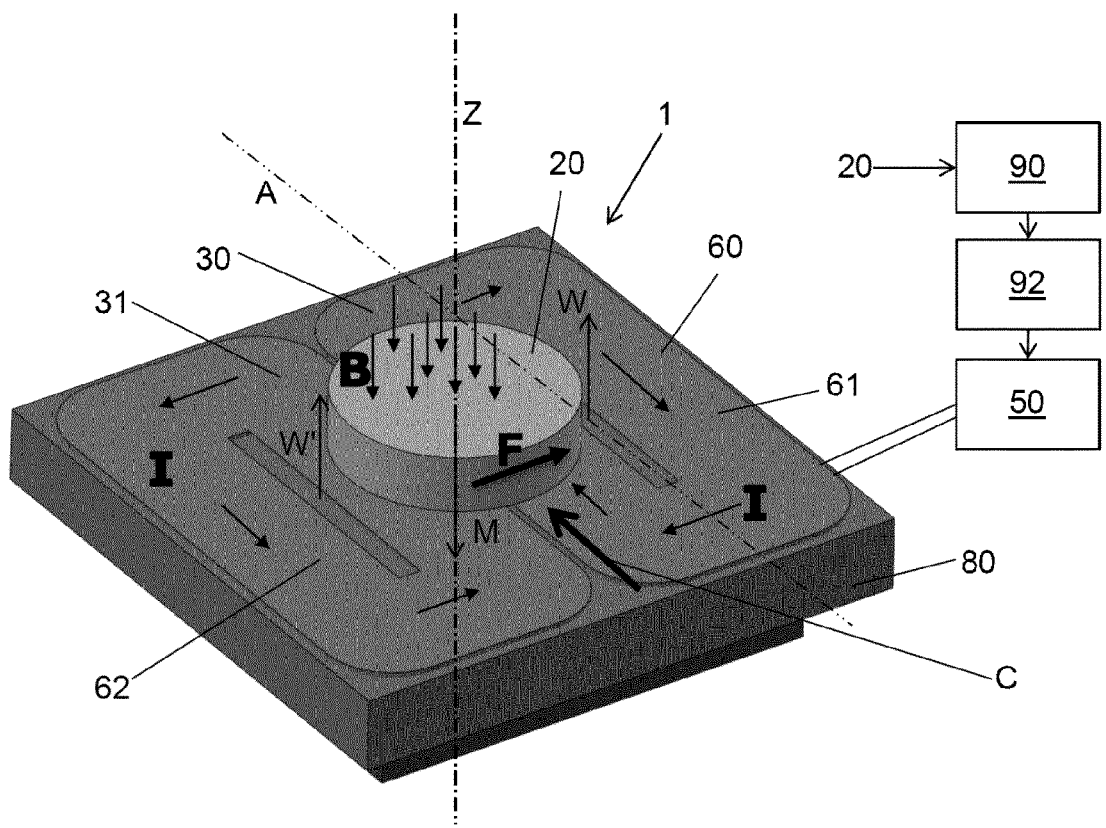

FIG. 11 shows a perspective view of the underlying principle of the first aspect of the present invention, namely a device 1 for pivoting or tilting an optical element 10 (not shown, cf. FIGS. 1-3 for instance), wherein the device 1 comprises an optical element 10 (such as a mirror) that is movably mounted, so that the optical element 10 can be tilted at least about a first axis A, as well as a cylindrical magnet 20 rigidly coupled to the optical element 10, which magnet 20 extends in an extension direction (cylinder axis) Z, wherein the magnet 20 comprises a magnetization M aligned with said extension direction Z, and a front side 20a, which is not visible in FIG. 11. The device 1 comprises a first conductor section 30 facing the front side 20a of the magnet 20 in the extension direction Z, wherein the first conductor section 30 extends in a first direction C along the first axis A, about which the magnet 20 and the optical element 10 connected thereto are pivotable or tiltable. Due to the fact, that the magnetization M of the magnet 20 is aligned with its extension direction Z, a Lorentz force F is generated when a current I is applied to the first conductor section 30 that acts in a first tilting direction X that runs orthogonal to the extension direction Z of the first conductor section 30 or orthogonal to the first axis A. For carrying out the invention, actually only a single first conductor section 30 is necessary per tilting direction, but according to FIG. 11 a further second conductor section 31 can be present, which runs along the first conductor section 30 below the front side 20a of the magnet 20. Particularly, as shown in FIG. 11, the two conductor sections 30, 31 extend parallel with respect to each other in a first direction C and form adjacent parts of a first coil means 60, which is formed as a planar coil means 60 in FIG. 11 comprising two loops 61, 62. This first coil means 60 extends along a fictitious extension plane P, wherein the first winding axis W of the first loop 61 and the second winding axis W' of the second loop 62 run perpendicular to said extension plane P. When the magnet 20 and optical element 10 are not pivoted or tilted about said first axis A, the extension direction Z and the magnetization M of the magnet 20 also run perpendicular to said extension plane P. Particularly, the first coil means 60 is held by a coil carrier 80 that extends along said extension plane P as well, i.e., said coil carrier 80 may comprise a surface facing the front side 20a of the magnet 20 that extends in said extension plane P or spans said extension plane P. Preferably, the optical element 10, which is not shown in FIG. 11, extends also along said extension plane P and particularly faces the magnet 20 and coil carrier 80 in the extension direction Z or magnetization direction of the magnet 20. Since the magnet is moving with respect to the conductor section(s) 30, 31 or first coil means 60 or coil carrier 80, the optical element 10 can in principle either be rigidly coupled to the magnet 20 and move with the magnet 20, or the optical element 10 can be rigidly coupled to the conductor section(s) 30, 31 or first coil means 60 or coil carrier 80 and move with this component.

Figure 8:
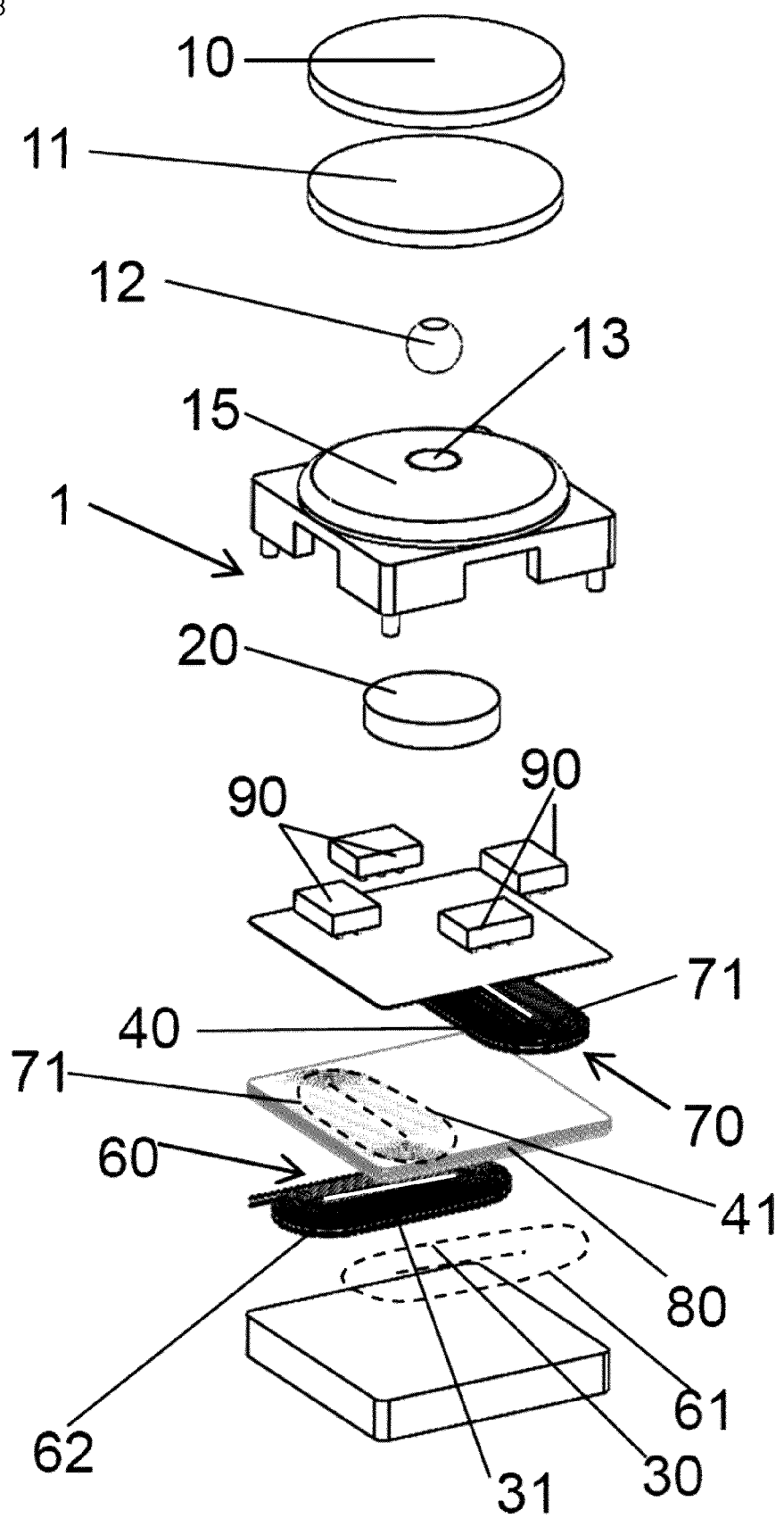

In general, in order to be able to tilt the magnet 20 and thus the optical element 10 coupled thereto also in a second tilting direction Y, running for instance orthogonal to the first tilting direction X, the device 1 according to said first aspect of the present invention may comprise a second conductor section 40 or two such second conductor sections 40, 41 (the second conductor sections 40, 41 are not indicated in FIG. 11 but can be inferred from FIG. 8), which are formed like the first conductor sections 30, 31 shown in FIG. 11, but are rotated (essentially about 90° in the extension plane P of the first coil means 60) with respect to the first conductor sections 30, 31 such that the first conductor sections 30, 31 cross the second conductor sections 40, 41, wherein the crossing point or region is located in a plump-vertical fashion below the front side 20a of the magnet 20. Particularly, the second conductor 40 section or the second conductor sections 40, 41 extend along a second axis A', about which the magnet 20 or optical element 10 is pivotably mounted, too. As shown in FIG. 8 in an exemplary fashion, the second conductor sections 40, 41 each form part of a first and a second loop 71, 72 of a second coil means 70 which is not shown in FIG. 11. It is to be noted that once two axes (i.e. the first and the second axis) A, A' are present, there is no need for them to be aligned with the conductor sections 30, 31, 40, 41. The magnet 20 is mechanically free to rotate in any direction.

Figure 7:
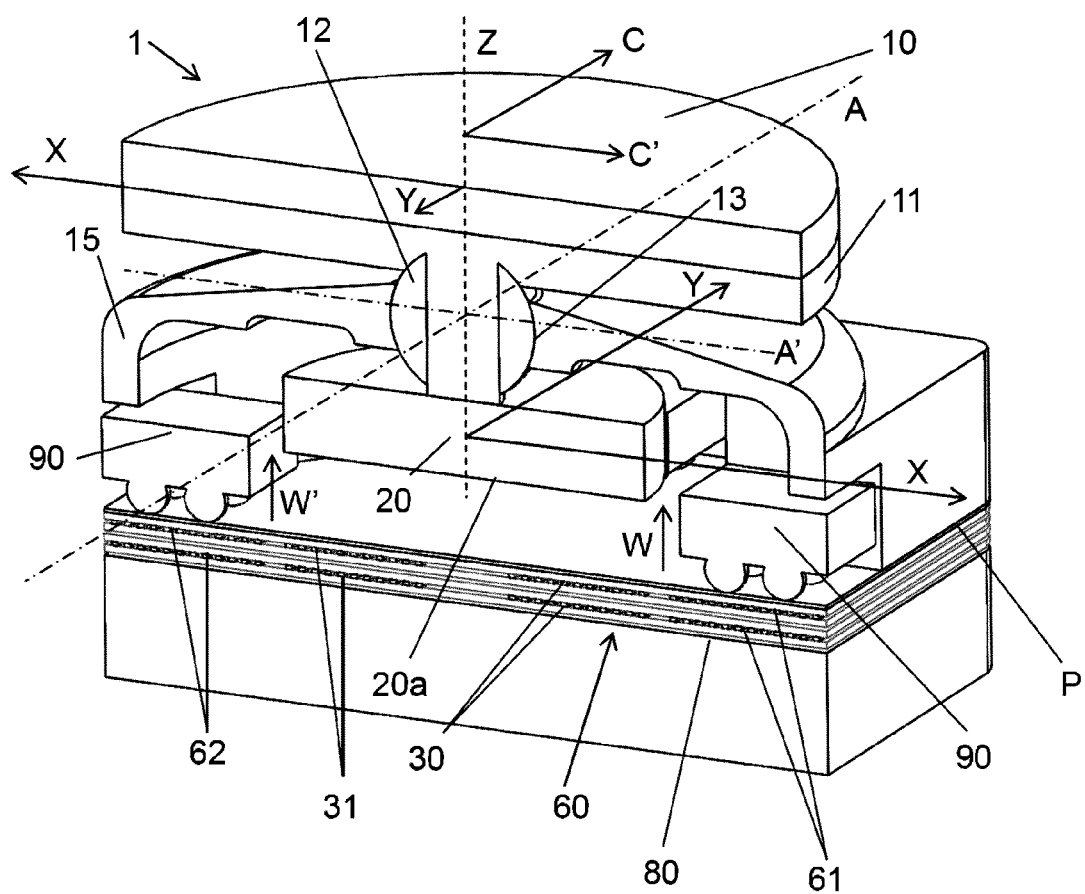

In case a current I is now applied to the second conductor section 40 or sections 40, 41, again a Lorentz force F is generated that forces the magnet 20 in a direction Y that runs orthogonal to the second axis A'. Thus, by applying appropriate currents I to the first and second conductor sections 30, 31, 40, 41, the magnet 20 and thus the optical element 10 connected thereto can be tilted continuously in two dimensions. As indicated in FIG. 11, the first conductor section 30 and the further first conductor section 31 can each be part of a separate coil or loop 61, 62 of a first coil means, but may also be parts of a so-called figure-8 coil 60, 70, as shown, for instance, in FIGS. 7 and 8. These coil means 60, 70 each comprise two connected loops 61, 62, 71, 72, so that the current I runs in opposite directions in each loop 61, 62, 71, 72 but runs in the same direction in the central region of the figure-8 coil, where said first conductor sections 30, 31 extend along the first axis A while the second conductor sections 40, 41 extend along the second axis A", so as to allow for tilting the magnet 20 and thus, the optical element 10, in 2D. As shown in FIG. 7 and FIG. 8, the coil means 60, 70 used in the present invention can in principal be multi-layer printed circuit board coils, wherein the first and second conductor sections 30, 31, 40, 41 are stacked on top of each other, as can be seen in the cross-section shown in FIG. 7 and the exploded view of FIG. 8. In this way, a very compact coil can be build, respectively, that comprises a region directly below the front side 20a of the first magnet 20, where currents I can flow either both ways along the first direction C (e.g. along the first axis A), or both ways along the second direction C' (e.g. along the second axis A'), thus, allowing to pivot the magnet 20 and the optical element 10 back and forth about the first and/or the second axis A, A' and in combination in any random direction.

Figure 2:
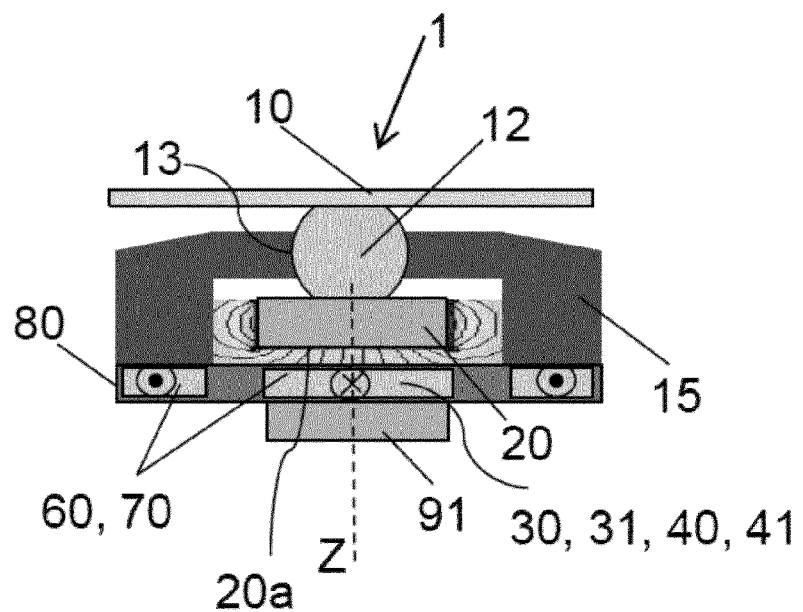
Figure 3:
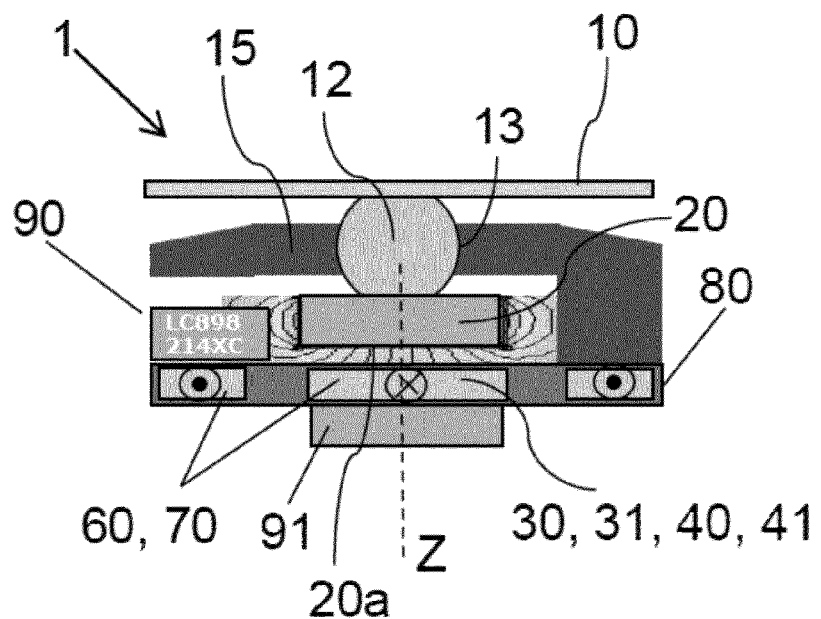
Figure 9:
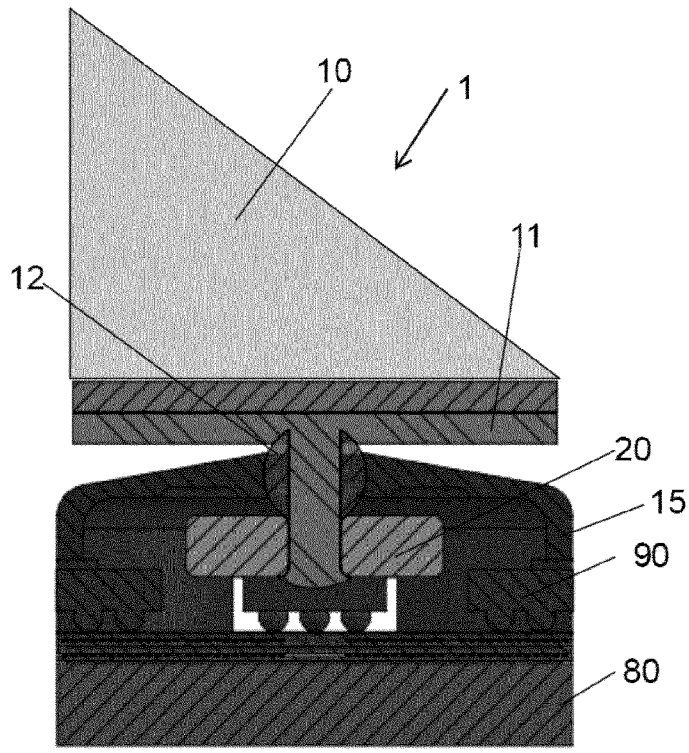
Figure 10:
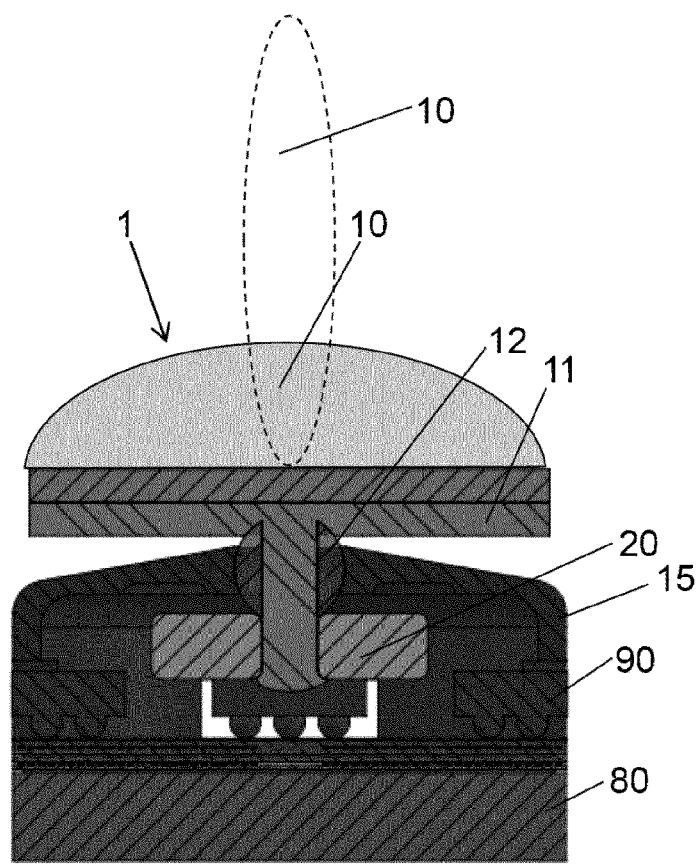

Of course, there are various ways to pivotably mount the magnet 20 and the optical element 10, which is rigidly coupled to the magnet 20. As shown in FIGS. 1-3, a ball-shaped bearing element 12 may be used, which is pivotably held in a recess 13 of a cage member 15 in a form-fitting manner, so that the bearing ball 12 can slide/rotate in said recess 13 in order to pivot the magnet 20 and optical element 10 connected thereto. Here, the cage member 15 may form a housing together with the coil carrier 80, in which the magnet 20 is arranged, wherein outside the housing the optical element 10 is arranged, which is connected in a rigidly fashion to the magnet 20 via the bearing ball 12. Thus, when the magnet 20 is moved due to the Lorentz forces F generated by the currents I running through the first and/or second conductor sections 30, 31, 40, 41, the bearing ball 12 connected to the magnet 20 is rotated and thus tilts the optical element 10 with respect to the coil carrier 80. As indicated in FIGS. 9 and 10, a huge variety of different optical elements 10 such as a prism 10 (FIG. 9) or a lens 10 (FIG. 10) can be attached to the bearing ball 12, either directly or indirectly via further elements (e.g. holding member 11), such that the device 1, 2 according to the invention has a very large number of possible applications. Furthermore, embodiments are conceivable, where a lens (or another optical element 10) is arranged vertically or perpendicularly e.g. with respect to the holding member 11 or coil carrier as shown in FIG. 10 with a dashed line (at least in some position of the optical element 10/magnet 20), with light passing from left to right or vice versa. In this way a lens 10 does not need to be used with a mirror in a double-pass fashion.

Figure 28:
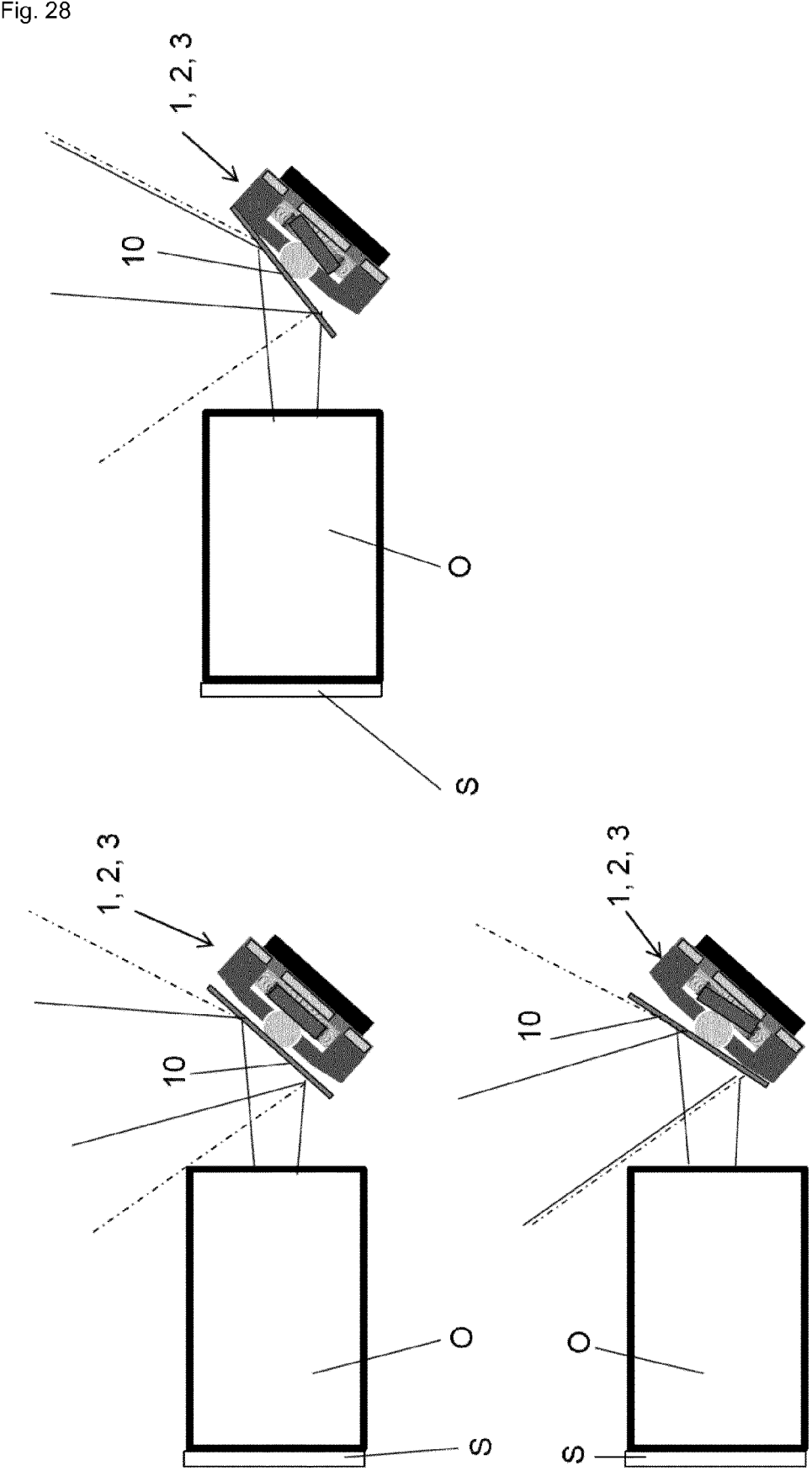
FIG. 28 shows a schematical illustration of a use of the device according to the invention.

A very important application is shown in FIG. 28, which shows an optical sensor S that is coupled via an optics O to a device 1 according to the invention, which is, in this example, used as a field of view expander. Thus, by pivoting an optical element 10 in the form of a mirror, light rays coming from a relatively large field of view can be focused on a relatively small sensor S, which has the benefit, that a relatively small and thus cost-efficient sensor S can be used for scanning a rather large area.

Possible optical elements 10 that can be pivoted with a device 1, 2 according to the invention are mirrors, prisms, lenses and many more.

Figure 4:
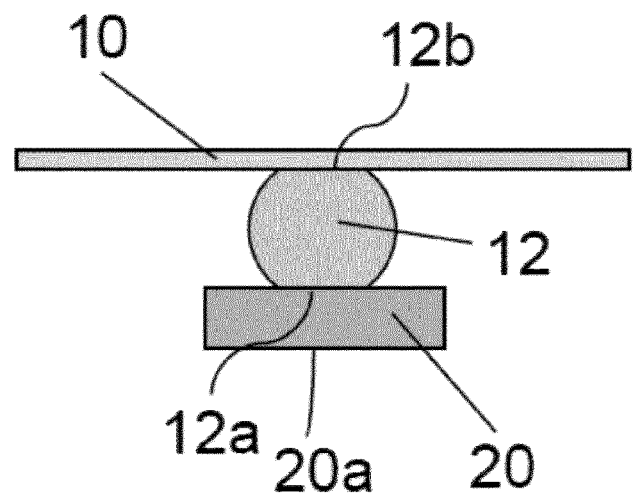
Figure 5:
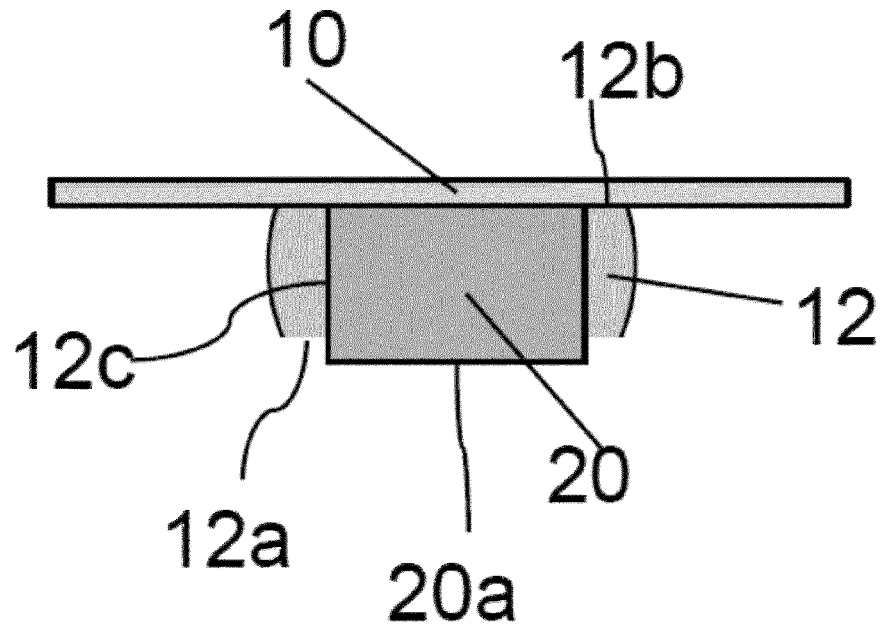
Figure 6:
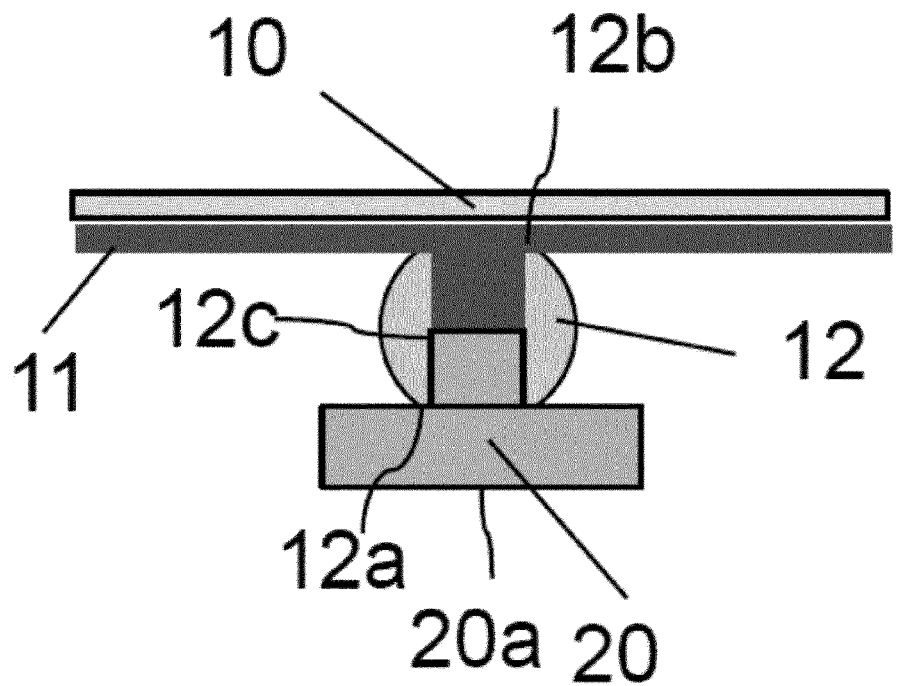

Furthermore, the FIGS. 4 to 6 show different possibilities of connecting the magnet 20 to the optical element 10 (e.g. mirror). As shown in FIG. 4, the bearing ball 12 comprises a first (lower) side 12a, which faces the coil carrier 80 or coil means, as well as a second side 12b facing away from the first side 12a. According to FIG. 4, the optical element 10 is connected to the second side 12b, while the magnet 20 is connected to the first side 12a of the bearing ball 12. For instance, the optical element 10 as well as the magnet 20 can be glued to the bearing ball 12. Furthermore, as shown in FIGS. 5 and 6, the magnet 20 can be inserted into a recess 12c of the bearing ball 12, at least in sections, such that the front side 20a of the magnet 20 protrudes out of the recess 12c of the bearing ball 12 or is arranged outside said recess 12c. Further, according to FIG. 5, the optical element 10 can be directly connected to the magnet 20, which is inserted into the recess 12c of the bearing ball 12. FIG. 6 shows a modification of this situation, wherein the optical element 10 is connected to a holding member 11, which is inserted with a portion into the through-opening 12c on the second side 12b of the bearing ball 12, while the magnet 20 is inserted with a portion into the recess 12c or through-opening 12c of the bearing ball from the first side 12a and is connected in the recess 12c to the holding member 11 to which the optical element 10 is attached.

In order to be able to control the movement or tilting of the magnet 20 and thus of the optical element 10 about the first and/or second axis A, A', the device 1, 2 according to the invention preferably comprises a sensor means, particularly a magnetic field sensor 90, such as a Hall sensor 90, which is shown in FIGS. 1-3. Particularly, as shown in FIG. 1, such a Hall sensor 90 is attached to the coil carrier 80, particularly on the side 80a facing away from the magnet 20. In such a case, the Hall sensor 90 preferably is a so-called two-dimensional Hall sensor 90, which is capable of detecting the two-dimensional pivoting of the magnet 20 due to the Lorentz forces F. Another possibility is shown in FIG. 3, where the Hall sensor 90 is arranged on the side 80b of the coil carrier 80 that faces the magnet 20. In this case, a magnetic flux return structure in the form of an (e.g. steel) plate 91 can be arranged on the side 80a of the coil carrier 80, facing away from the magnet 20, in order to guide the magnetic field lines and to create a restoring force that brings back the magnet 20 to an initial position, when the current through the coil means is reduced to zero. Furthermore, the restoring force enables an easier open loop controllability of the device 1. Particularly, the steel plate serves as a magnetic field guide. It forces the magnetic field lines to stay vertical instead of bending away too early.

Figure 12:
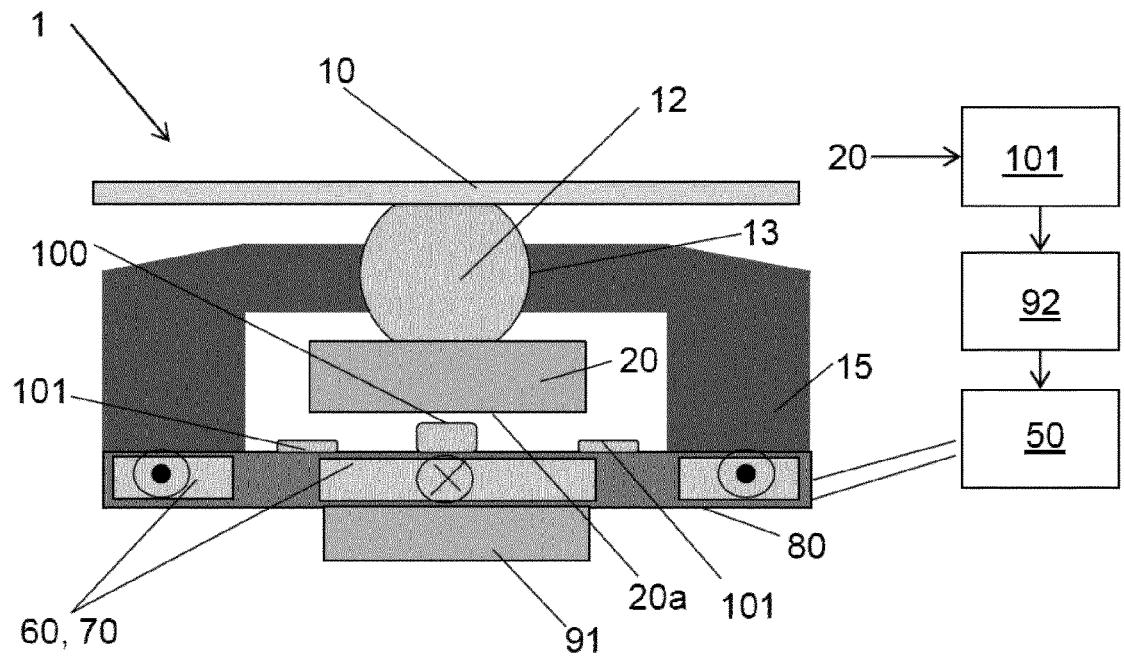

Furthermore, the device 1, 2 according to the invention as shown, for instance, in FIGS. 2-3, comprises a controller 92 for controlling the current source means 50 (e.g. the indi-vidual current sources, comprised by the current source means), such that a current (actual) position of the first magnet 20 and therefore of the optical element 10 connected thereto approaches a reference value (cf. FIG. 11). Another way to determine the position of the magnet 20 for controlling the movement of the magnet 20 is shown in FIG. 12, wherein a light source 100, particularly an LED, is arranged on the side of the coil carrier 80 and faces the front side 20a of the magnet 20 in the extension direction Z of the magnet 20, such that light emitted from said light source 100 hits the magnet 20 or a reflection means attached thereto, so that light reflected by the magnet 20 or said reflection means hits at least one, preferably two photo diodes 101, which are arranged on said side 80b of the coil carrier 80 that faces the magnet 20, too. Thus, depending on the position of the magnet 20, different amounts of light are reflected by the magnet 20 towards the photo diodes 101, so that the position of the magnet 20 can be inferred from the signal generated by the photo diodes 101. Also here, the device 1, 2 preferably comprises a controller 92 for controlling the current source means 50 (e. g. the individual current sources that are employed, see above), such that the signal provided by the at least one photo diode 101 approaches a reference signal associated to the desired reference position of the magnet 20 and therefore of the optical element 10.

Figure 13:
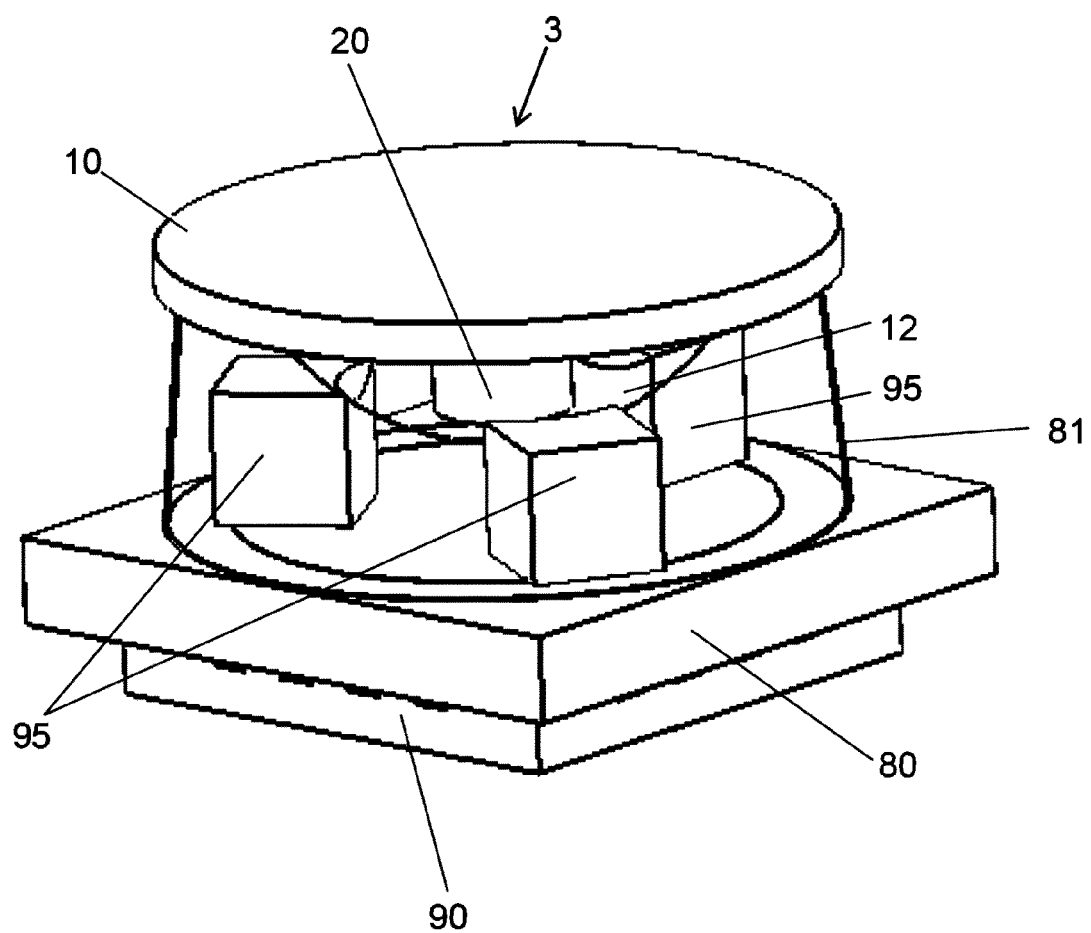

As shown in FIG. 13, apart from using Lorentz forces F or electromagnetic forces in order to pivot a magnet 20 and an optical element 10 connected rigidly thereto, piezo actuators 95 may also be used to pivot the optical element 10. Such a device 3 for tilting an optical element (e. g. mirror) 10 is shown in FIG. 13. Here, a hemisphere 12 is attached to the side of the optical element (e.g. mirror) 10 that faces a printed circuit board 80, on which three piezo actuators 95 are arranged, which actuators 95 contact the hemisphere 12 and are designed to rotate the hemisphere 12 by way of suitable compressions and expansions of the piezo actuators 95. In order to determine the position of the optical element 10, which allows one to control the tilting of the optical element 10, a magnet 20 is attached to the optical element 10, which magnet 20 generates a field that is sensed by a two-dimensional Hall sensor 90 that is arranged on the printed circuit board 80 on the side facing away from the piezo actuators 95. A circumferential gap between the optical element 10 and the PCB 80 may be covered by a (e.g. flexible) membrane 81, which is applying a defined force onto the hemisphere 12 sliding on the piezo actuators 95.

Figure 14:
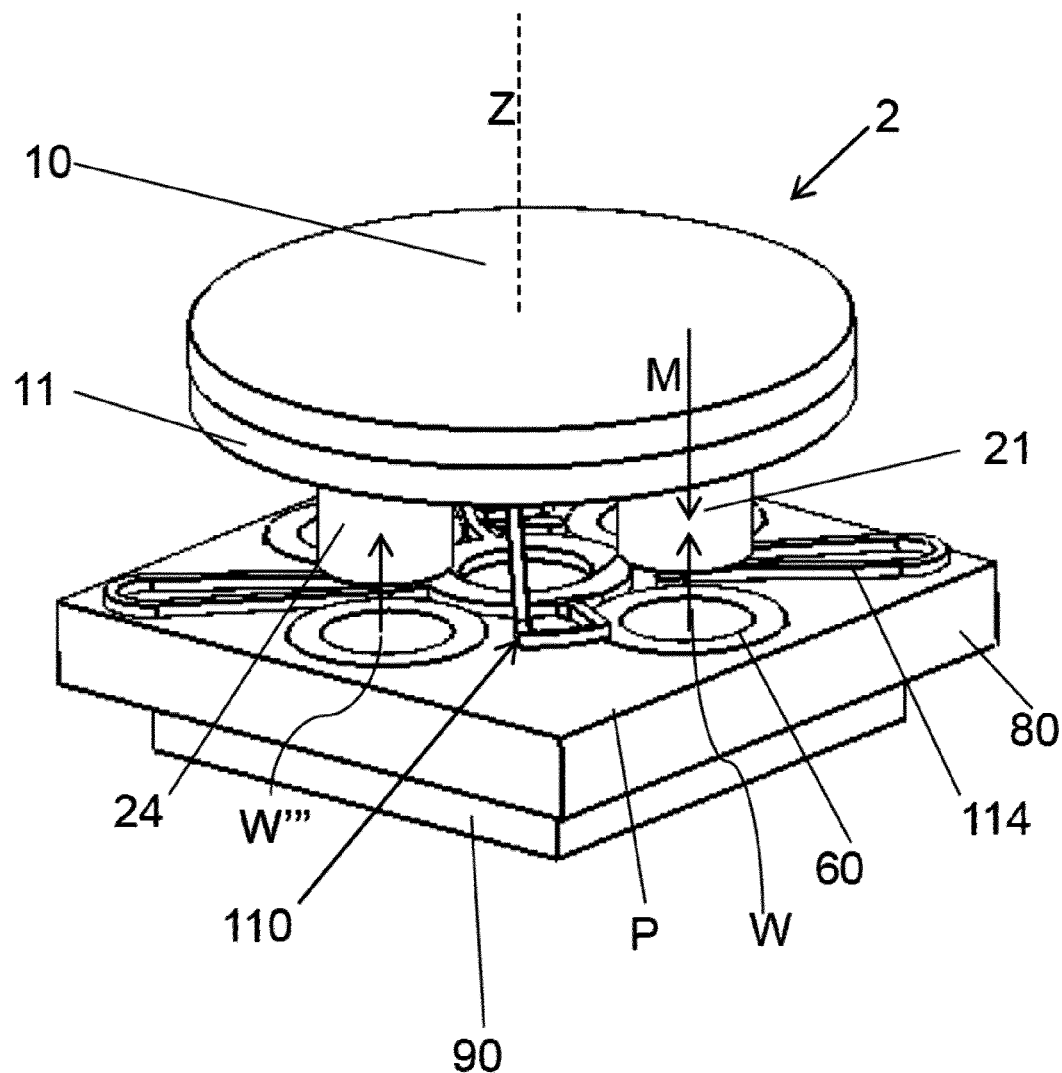

FIG. 14 shows an embodiment according to the second aspect of the present invention. Here, the device 2 comprises an optical element (e.g. a mirror, particularly a circular or oval mirror) 10 that is attached to a holding member 11 which may be formed out of a magnetizable steel.

Figure 15:
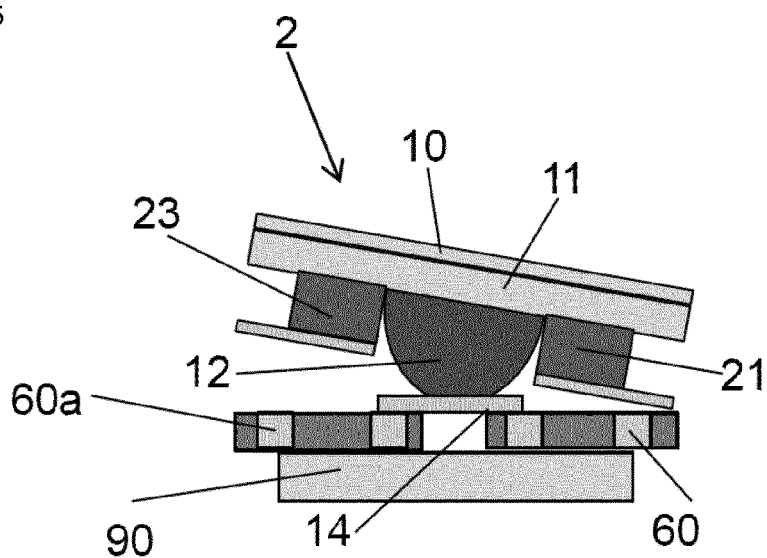

The holding member 11 is elastically supported on a coil carrier 80 (e.g. in form of printed circuit board) with help of a spring means 110 (here and in the following such a spring means 110 may be, e.g. integrally, formed out of steel or another suitable material) so that the holding member 11 and the optical element 10 can be pivoted about at least a first and an orthogonal second axis A, A' and particularly also experience a restoring force due to the elasticity of the spring means 110. As shown in FIG. 15 the optical element 10 and holding member 11 may alternatively or additionally be supported by a ball member 12 having a curved surface that rests on a ring member 14 attached to the coil carrier 80.

Figure 16:
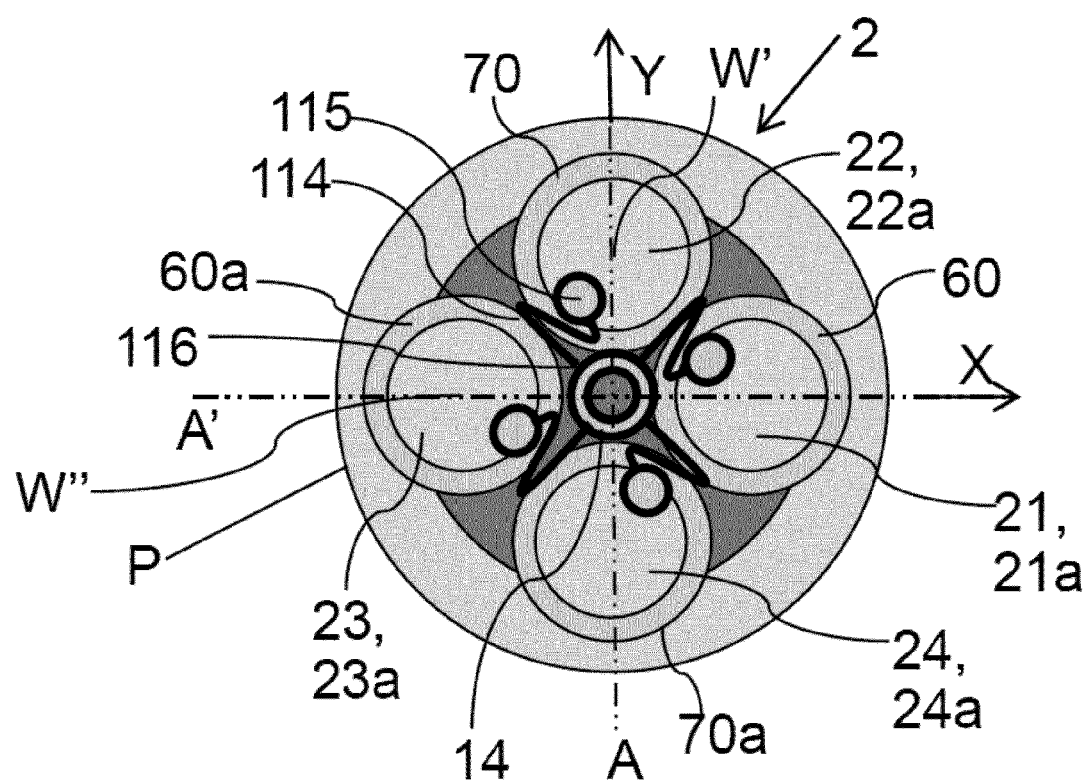

As indicated in FIGS. 14 and 16, the spring means 110 comprises four arms 114 each extending from an upper first fixation point 115 via which the respective arm 114 is connected to the holding member 11 or optical element 10 adjacent to an associated magnet 21, 22, 23, 24, to a lower central second fixation point 116, e.g. on the ring member 14. Particularly, each arm 114 comprises a specific course, wherein the respective arm 114 extends inwards from the respective first fixation point towards the central second fixation point 116, then changes direction and extends outwards (away from the central second fixation point 116), and finally changes direction and extends again inwards towards the respective central second fixation point 16. Here, each of these arms 114 extends between two neighboring magnets 21, 22, 23, 24.

The coil carrier 80 carries at least a first and a second coil means 60, 70, and preferably also a third and a fourth coil means 60a, 70a, wherein said coil means 60, 70, 60a, 70a are each formed as separate (e.g. circular) coils that extend along a common extension plane P along which also said plate-like coil carrier 80 extends. Particularly, the coils 60, 70, 60a, 70a are embedded into the coil carrier 80 (e.g. a printed circuit board). Further, the device 2 comprises at least a first and a second magnet 21, 22, but preferably also a third and a fourth magnet 23, 24. Each magnet 21, 22, 23, 24 extends in the same extension direction Z and is rigidly connected to a first (lower) side 11a of the holding member 11. Each magnet 21, 22, 23, 24 further comprises a magnetization M aligned with the respective extension direction Z. Particularly, the first coil 60 is associated to the first magnet 21 and faces the front side 21a of the first magnet 21 in the extension direction Z of the first magnet 21, and the second coil 70 is associated to the second magnet 22 and faces the front side 22a of the second magnet 22 in the extension direction Z of the second magnet.

Furthermore, the third coil means 60a is associated to the third magnet 23 and faces the front side 23a of the third magnet 23 in the extension direction Z of the third magnet 23, and finally the fourth coil means 70a is associated to the fourth magnet 24 and faces the front side 24 of the fourth magnet 24 in the extension direction Z of the fourth magnet 24. The front sides 21a, 22a, 23a, 24a of the magnets 21, 22, 23, 24 extend perpendicular to the respective extension direction Z.

Further, each coil 60, 60a, 70, 70a comprises a winding axis denoted as first, second, third and fourth winding axis W, W', W'', W''', wherein these axes all run parallel to the extension direction Z or magnetization M of the respective magnet 21, 22, 23, 24, when the magnets 21, 22, 23, 24 or the optical element 10 reside in a certain (non-tilted) position (extension directions Z perpendicular to extension plane P).

Further, the first and the third coil means 60, 60a as well as the first and the third magnet 21, 23 face each other in the first tilting direction X or perpendicular to the first axis A while the second and the fourth coil means 70, 70a as well as the second and the fourth magnet 22, 24 face each other in the second tilting direction Y (or perpendicular to the second axis A'. Here, the first and the second tilting direction X, Y (like the first and the second axis A, A') are orthogonal. Particularly, the coils 60, 70, 60a, 70a are also coaxially arranged with respect to the associated magnet 21, 22, 23, 24, wherein particularly the outer diameter of the respective coil 60, 70, 60a, 70 is larger than the outer diameter of the associated magnet 21, 22, 23, 24.

Now, for pivoting (or tilting) the optical element 10 by moving the magnets 21, 22, 23, 24 a current source means 50 (cf. FIG. 11) is provided as according to the first aspect of the present invention, wherein the current source is designed to apply a current to the first and third coil and separately to the second and the fourth coil. Depending on the direction of the individual current the respective magnet is attracted towards the associated coil or pushed away so that a 2D tilting of the optical element 10 can be achieved. Controlling of the tilting of the optical element can be performed as described above by using one or several magnetic field sensors (e.g. Hall sensors) or by using the optical sensor means described above employing a light source (e.g. LED) and at least one, preferably two photo diodes or other light intensity sensors).

Figure 17:
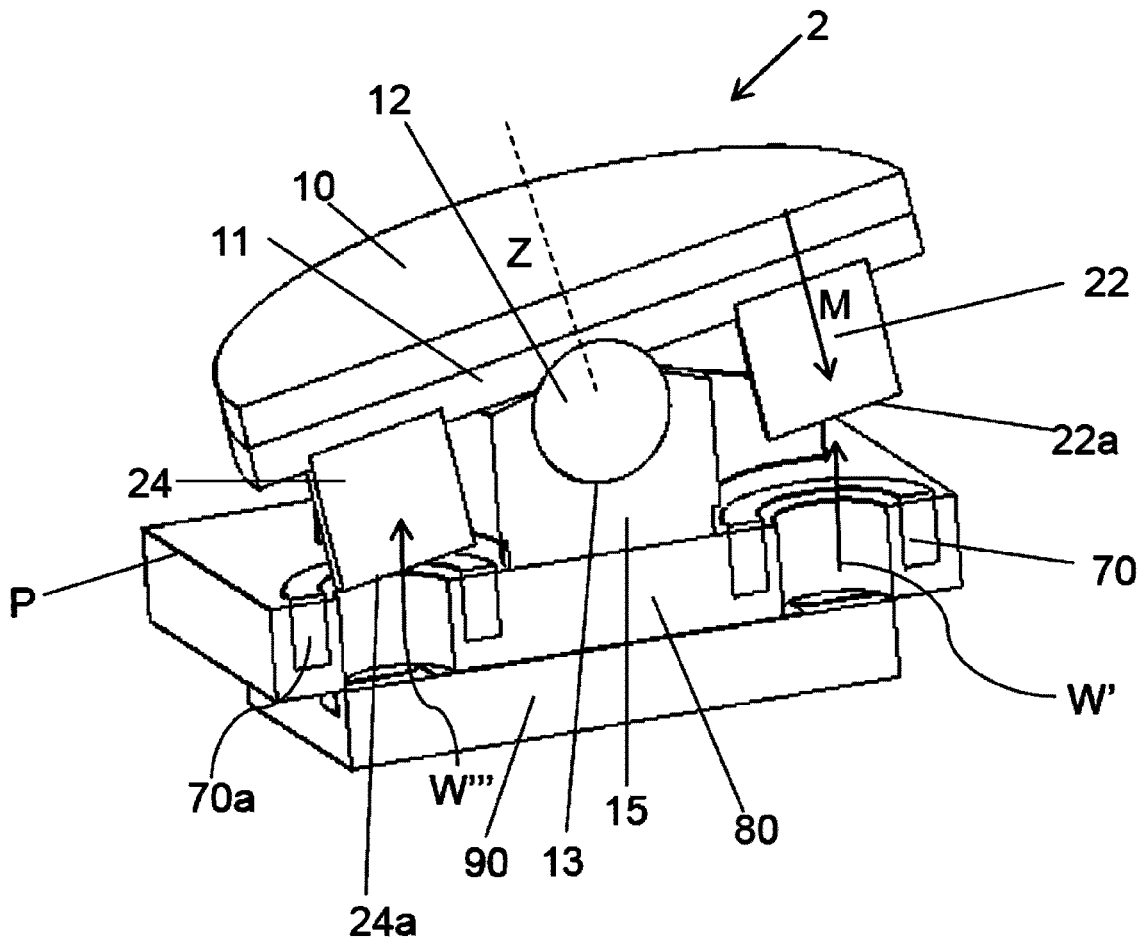

FIG. 17 also shows an embodiment according to the second aspect of the present invention. Here, again, the device 2 comprises an optical element (e.g. a mirror, particularly a circular mirror) 10 that is attached to a holding member 11 which may be formed out of a magnetizable steel. The holding member 11 is attached to a bearing ball 12 that is pivotably arranged in a recess 13 of a cage member 15 so that the holding member 11 and the optical element 10 can be pivoted about at least a first and an orthogonal second axis A, A' (cf. FIG. 16).

The cage member 15 is connected to a coil carrier 80 carrying at least a first and a second coil means 60, 70 and preferably a third and a fourth coil means 60a, 70a as described in conjunction with FIG. 14. As can be seen from FIG. 17, the cage member 15 is essentially arranged between the four magnets 21, 22, 23, 24 which are arranged concerning the coils 60, 70, 60a, 70a as described with respect to FIG. 14. Particularly, the cage member 15 comprises four recesses for receiving the magnets 21, 22, 23, 24. Actuation and control of the tilting movement of the optical element 10 can be performed as described with respect to FIG. 14. Further, a spring means 110 as described with respect to FIGS. 14 and 16 may be used to provide an additional restoring force or improved support.

Figure 18:
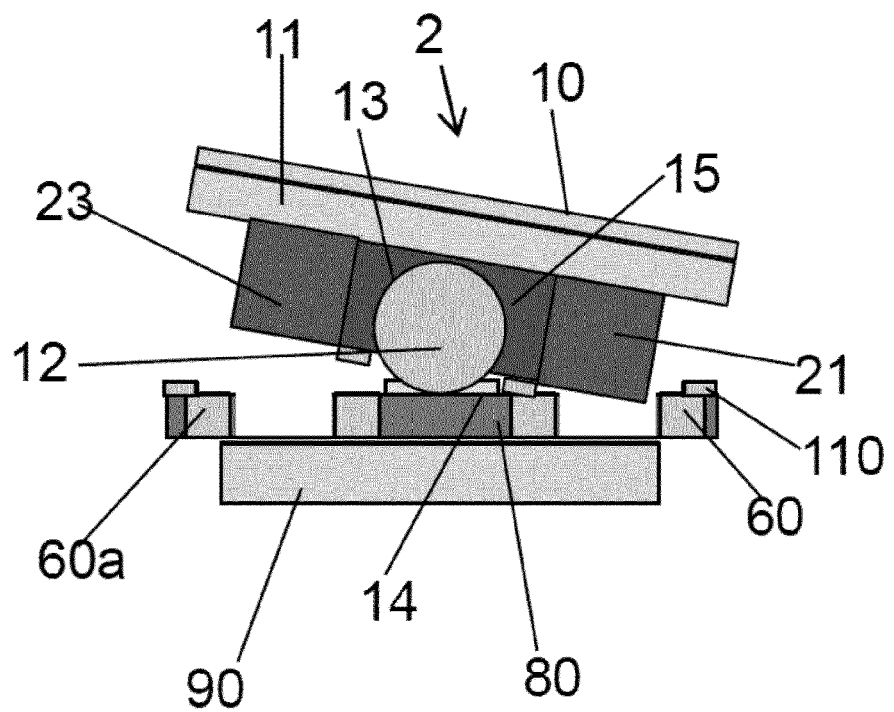

As can further be seen from the modification shown in FIG. 18, the cage member 15 may also be rigidly connected to the holding member 11 (or optical element 10) on a side facing the coil carrier 80 and then slides along the spherical surface of the bearing ball 12 that is fixed to the coil carrier 80. In addition a spring means 110 as described before in conjunction with FIGS. 14 and 16 may be employed.

Figure 19:
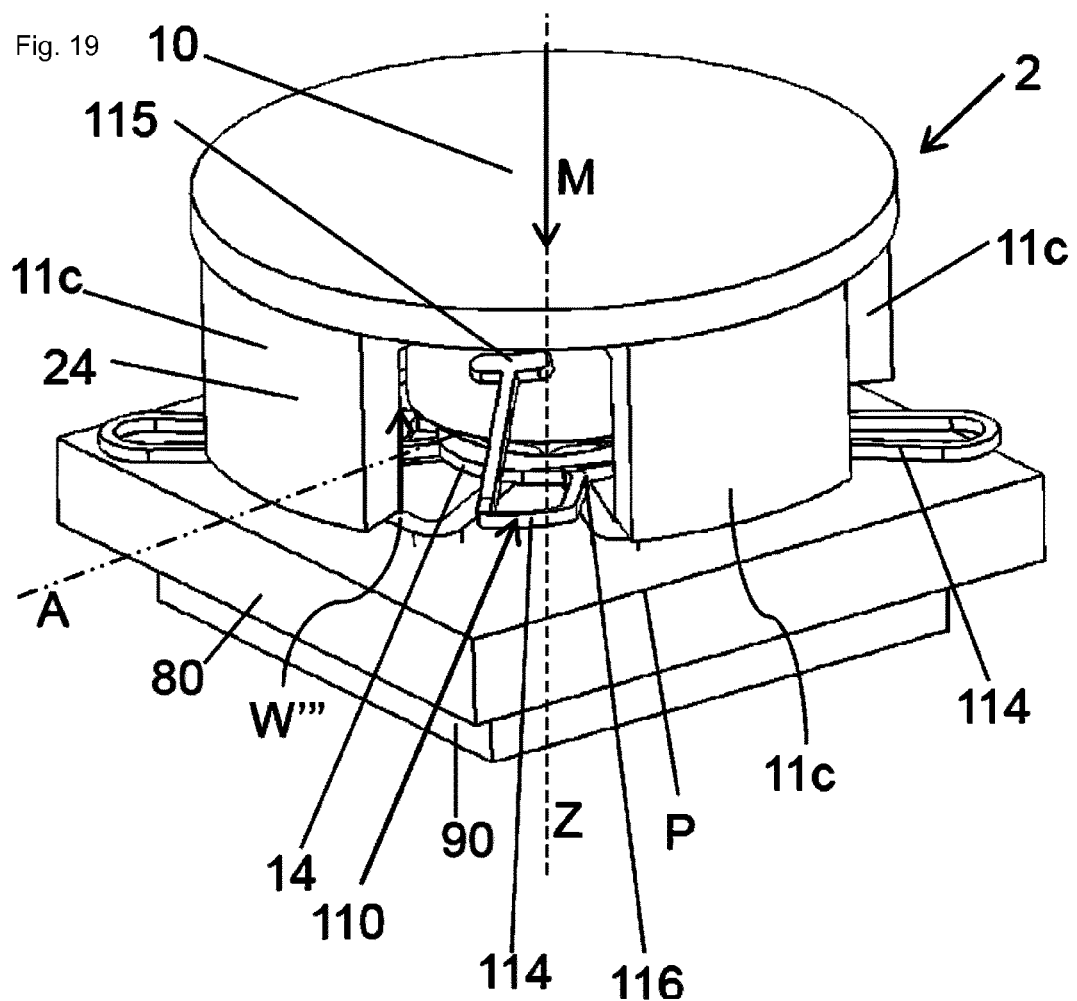
Figure 20:
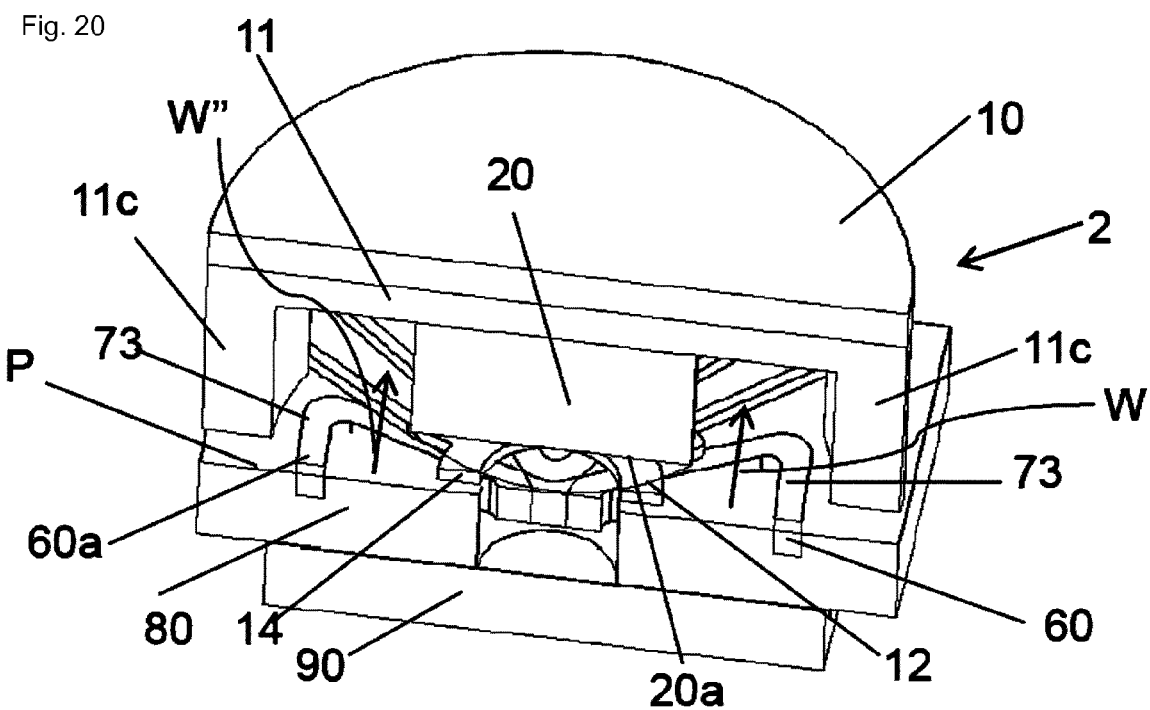
Figure 21:
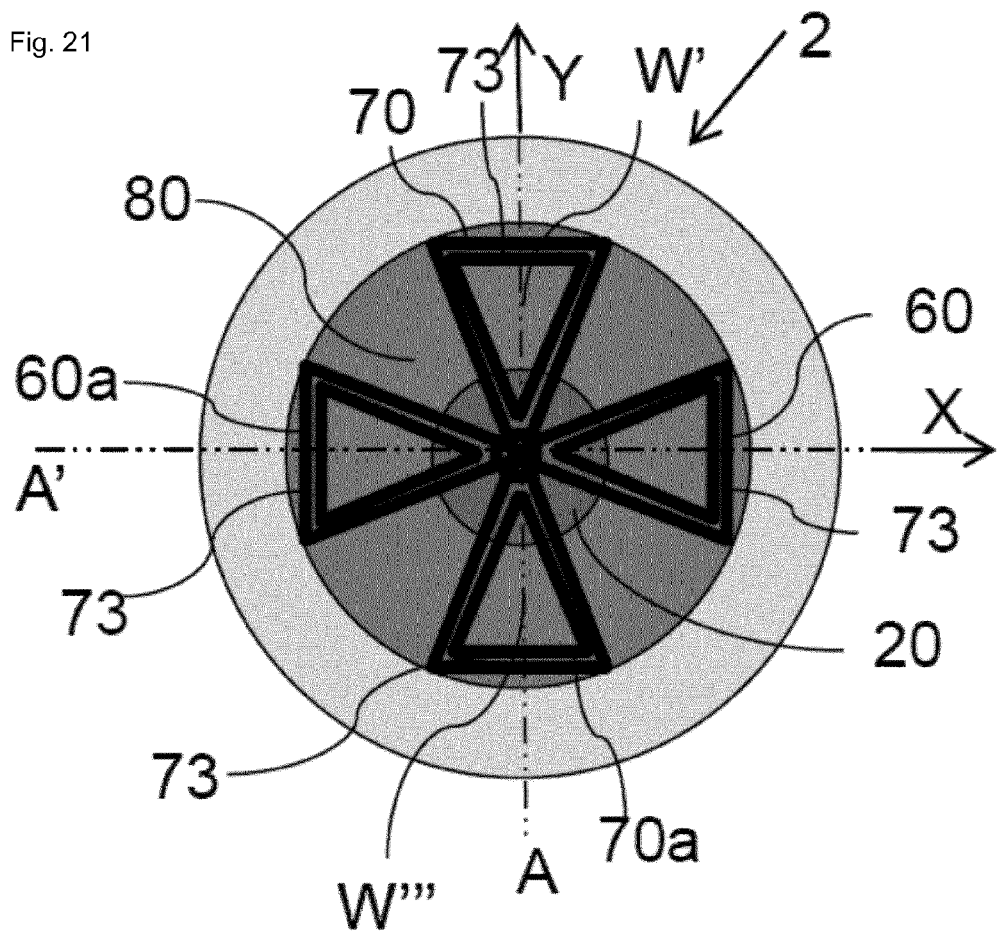

FIG. 19 shows in conjunction with FIGS. 19 to 21 a further embodiment of the present invention comprising a coil carrier (e.g. in form of printed circuit board) with integrated coils means, namely in form of a first, second, third and fourth coil 60, 70, 60a, 70a each having a triangular loop. Instead of four magnets, the device comprises a central magnet 20 extending along an extension direction Z that runs (when the magnet 20 is not pivoted) perpendicular to the extension plane P along which the coil carrier 80 and the embedded triangular coils 60, 70, 60a, 70a extend. The magnetization M of the magnet 20 is aligned with the extension direction Z and extends parallel to the winding axes of the triangular coils. The magnet 20 is attached to a lower side of a holding member 11 which is formed out of magnetisable steel and which comprises four protrusions 11c extending in the extension direction towards the coil carrier 80, wherein said protrusions 11c each extend along an outer (straight) section 73 of an associated coil. The magnet 20 can be supported on the coil carrier 80 by means of a bearing ball 12 attached to the front side 20a of the magnet 20 which slides on a ring member 14 of the coil carrier 80 and/or by means of a spring means 110 providing a pivotable support and a restoring force for the optical element 10/holding member 11, which spring means 110 comprises four arms 114 that extend from an (upper) first fixation or contact point 115, via which the respective arm 114 is fastened to the holding member 11 or contacts the latter, to a second fixation point 116 (e.g. on the central ring member 14) via which the respective arm 114 is fastened to the coil carrier 80.

Figure 22:
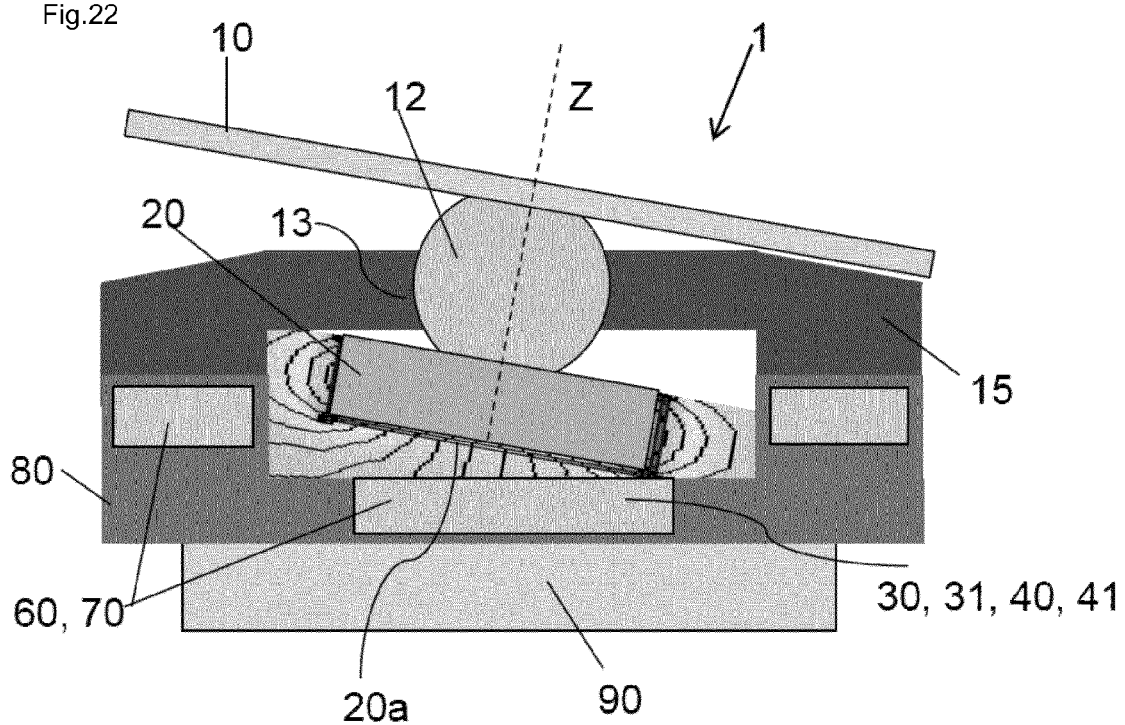

In the present embodiment according to FIG. 19, the tilting force is not created below the magnet 20, but instead below the protrusions 11c of the ferromagnetic structure. The protrusions 11c guide the magnetic fields so that they emerge vertically above the outer edges of the coil carrier (PCB) 80. There, they interact with the respective outer sections 73 of the triangular coils to produce torque. The main advantage of this embodiment is that, for a given force, the torque is increased due to the larger leverage. The two inner sides of the respective triangular coil 60, 60a, 70, 70a (the ones pointing towards the center) of the coil carrier 80 are not used for the force production. They are not fundamentally required. They simply provide a convenient way to connect the outer edge conductors in series. In the center, below the magnet 20, there might be some parasitic forces, but since the currents flow in and back out in almost opposite directions, the resultant parasitic force should be marginal. Further, FIG. 22 shows a modification of the embodiment shown in FIG. 2, wherein the outer parts of the used coil means 60, 70 are arranged in the extension direction Z at an other level than the conductor sections 30, 31, 40, 41, particularly closer to the magnet 20 and in particular on the same level as the magnet 20, while below the front side 20a of the magnet 20 the force generating crossed conductor sections 30, 31, 40, 41 have a larger distance to the magnet in the extension direction Z. In this position, the outer parts of the coil means 60, 70 produce a larger beneficiary force instead of the beneficiary force they produce in their original position. This happens because the magnetic fields have flipped 180° at outer parts of the coils means at the level of the magnet 20, compensating the inverted current direction of the conductors.

Figure 23:
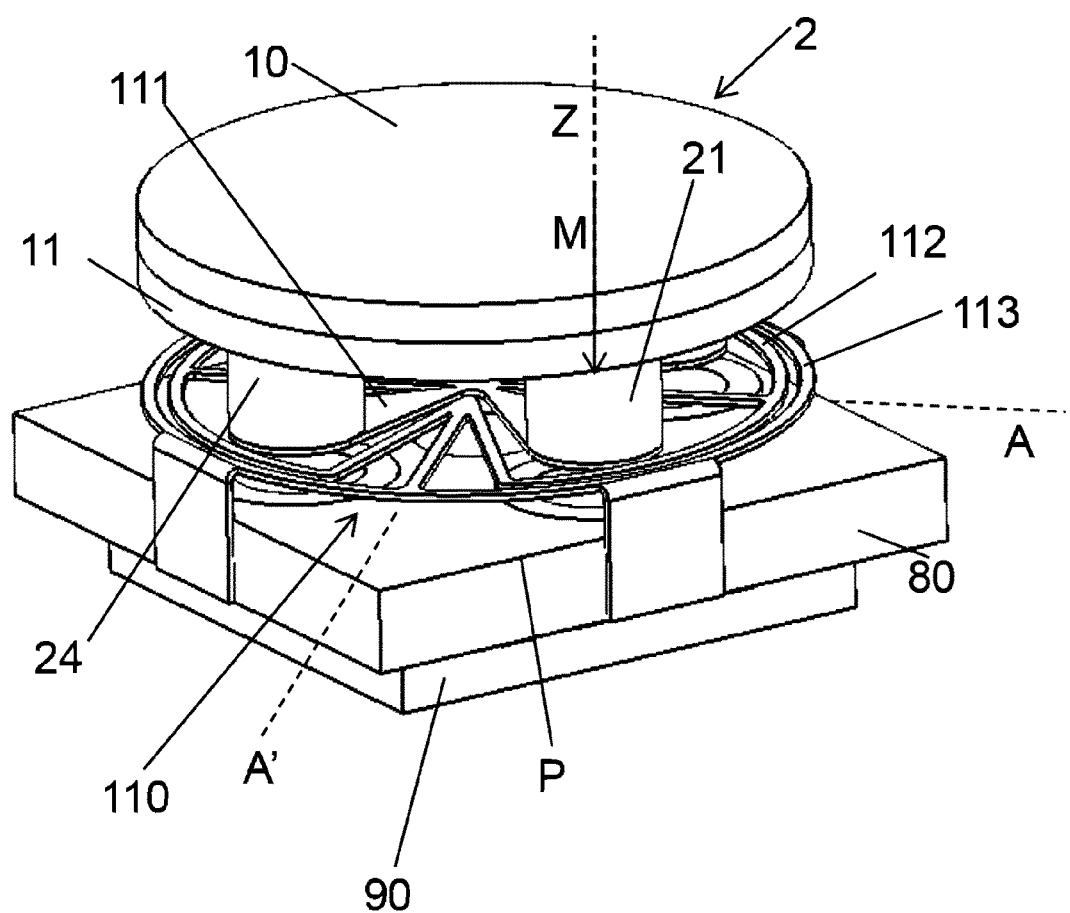
Figure 24:
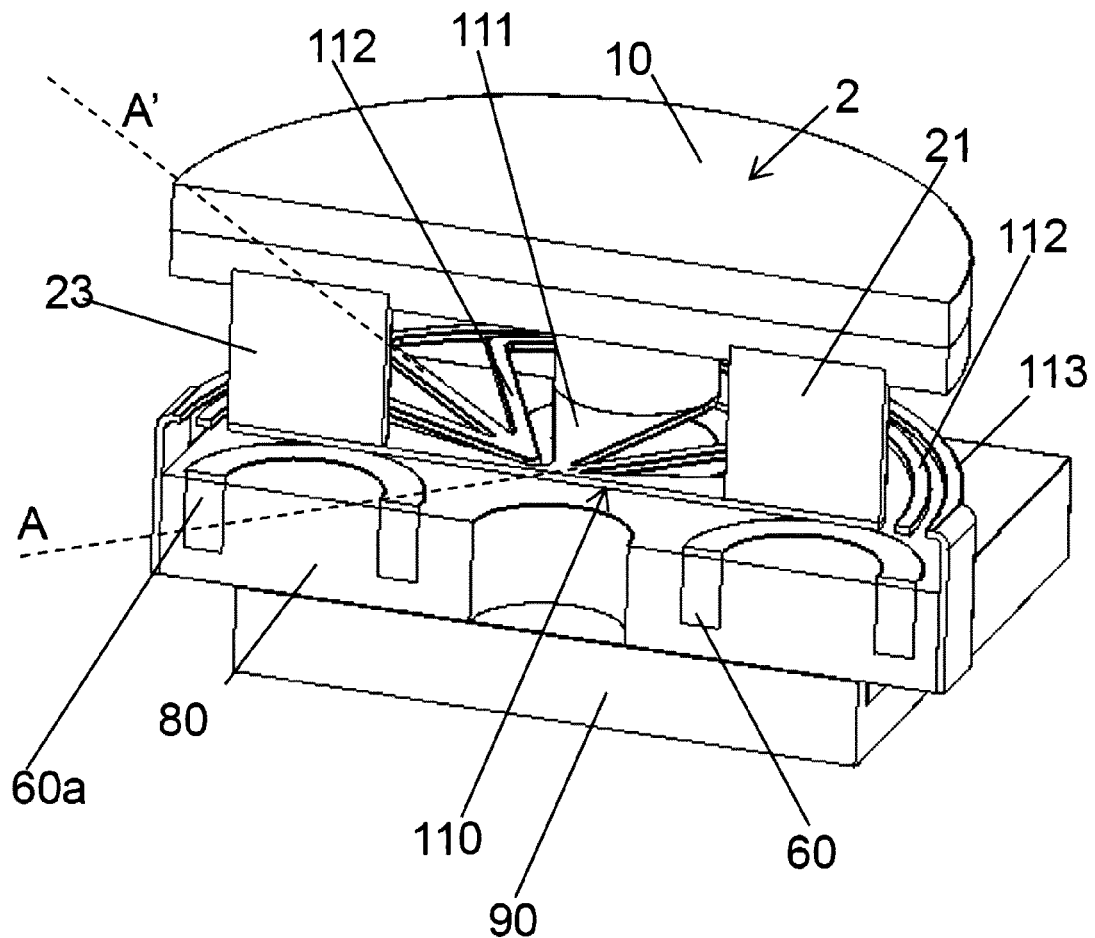

Furthermore, FIGS. 23 to 24 show a modification of the embodiment shown in FIG. 14, comprising a modified spring means 110 allowing a tilting movement about a first axis A and an independent second axis A'. For this, the spring means 110 comprises a central part 111 connected to the magnets 21, 22, 23, 24, wherein the central part 111 is integrally connected to a circumferential first part 112 surrounding the central part 111 such that the central part 111 is tiltable about the first axis A with respect to the first part 112, and wherein the first part 112 is integrally connected to a circumferential second part 113 surrounding the first part 112 and the central part 111 so that the first part 112 together with the central part 111 can be tilted with respect to the second part 113 about the second axis A' running perpendicular to the first axis A. Here, the second part 113 of the spring means 110 is particularly connected to the coil carrier 80.

Figure 29:
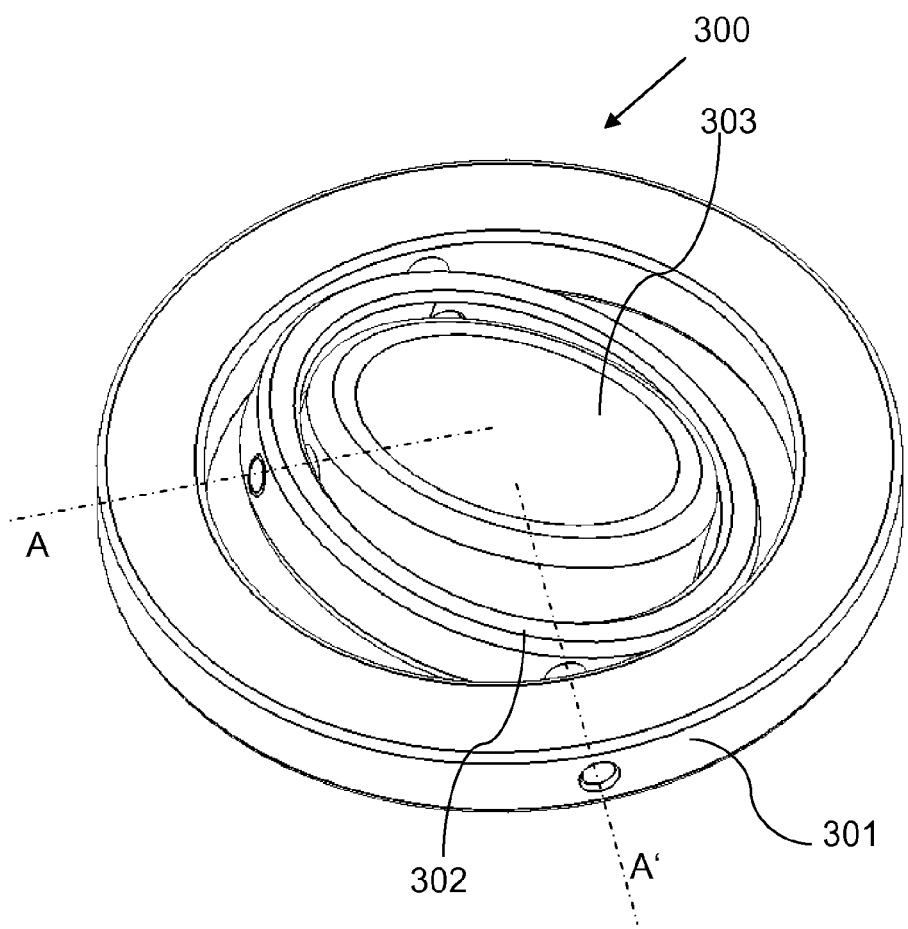
FIG. 29 shows a bearing structure (two-axis gyro) for supporting the optical element and magnet(s) rigidly coupled to the optical element.

Instead of a spring means 110 one may also employ a two-axis gyro 300 shown in FIG. 29 which comprises a first member in form of an outer ring member 301, a second member in form of a middle ring member 302, and a third member in form of an inner member 303 forming a holding member for holding the optical element 10 and/or the magnet 20 or magnets 21, 22, 23, 24, wherein the outer ring member 301 surrounds the middle ring member 302 and the inner member 303, and wherein the middle ring member 302 surrounds the inner member 303. In order to achieve a 2D pivotable support for the optical element 10 and the magnet 20 or the magnets 21, 22, 23, 24, the middle ring member 302 is rotatably supported on the outer ring member 301 so that the middle ring member 302 can be tilted about a first axis A with respect to the outer ring member 301, and wherein the inner member 303 is rotatably supported on the middle ring member 302 so that the inner member 303 can be tilted about a second axis A' (with respect to the middle ring member 302) that is orthogonal to the first axis A. As a result, the inner member 11 can be tilted about the two independent axes A, A' with respect to the outer ring member 301 in 2D, to which outer ring member 301 one may connect the coil carrier 80 and/or the used coil means.

Figure 25:
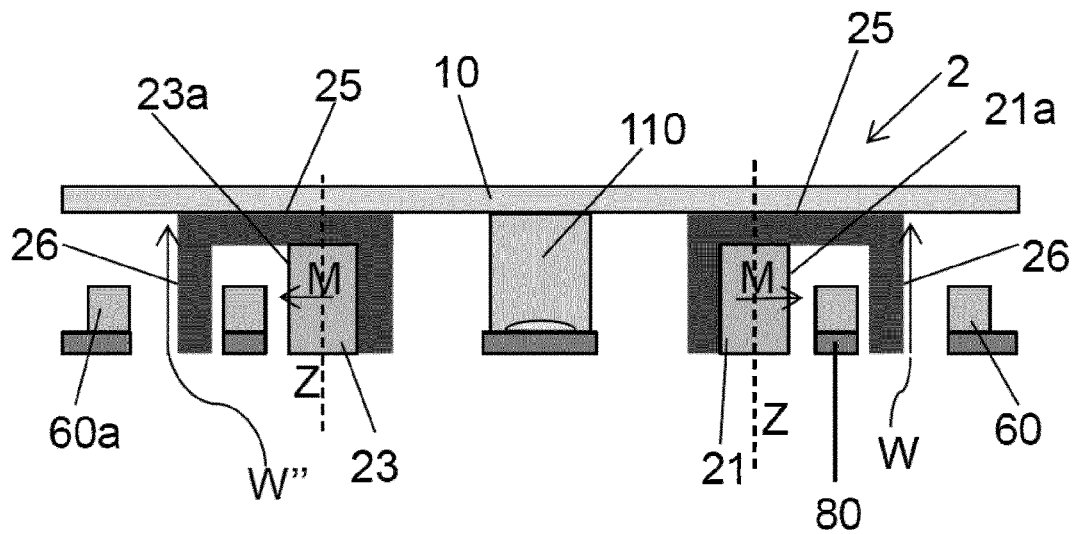
Figure 26:
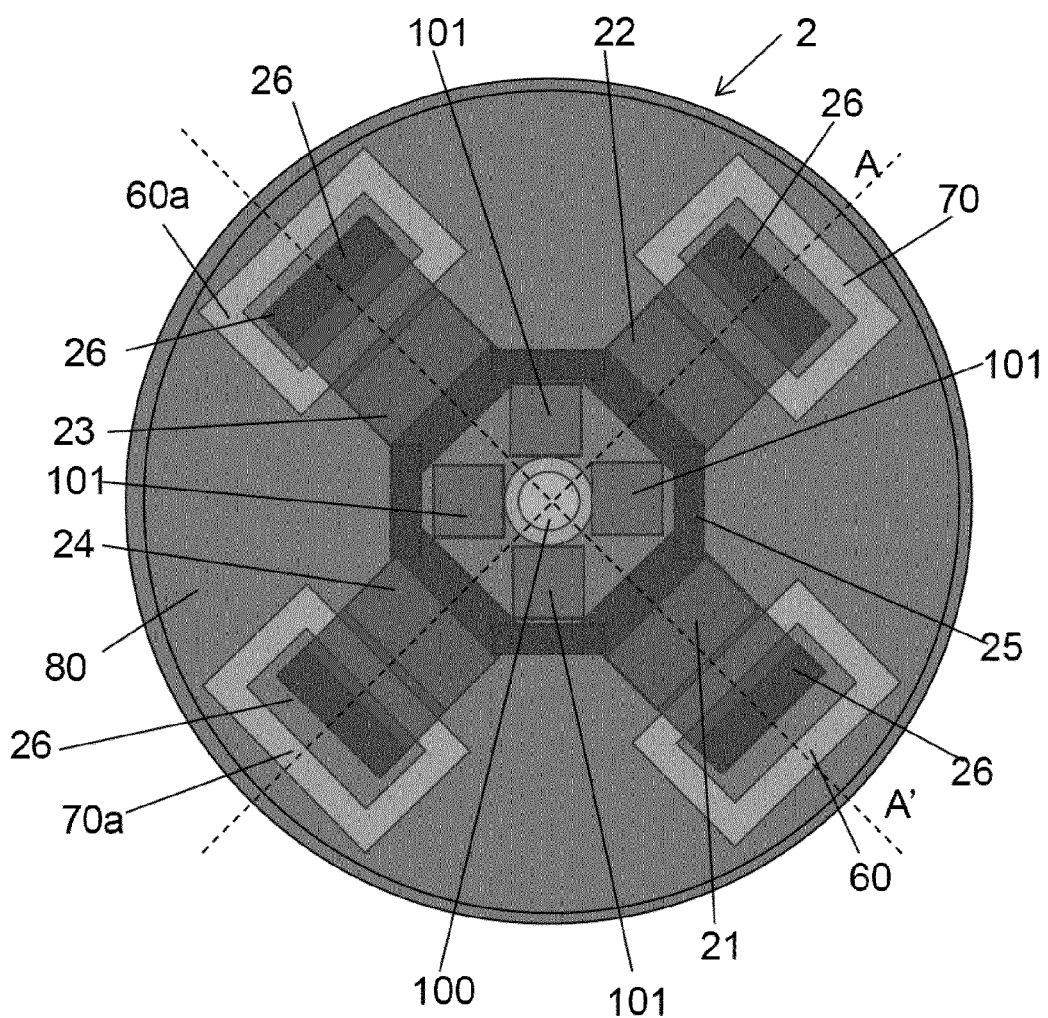

FIGS. 25 and 26 show a further embodiment of a device 2 according to the second aspect of the present invention, wherein an optical element (e.g. a mirror, particularly a circular mirror) is attached via a spring means 110 in form of a polymer block to a coil carrier 80 in form of a printed circuit board. The polymer block 110 is arranged on the center of the optical element 11 and the coil carrier 80 and supports the optical element 10 on the coil carrier 80. The polymer block 110 allows the optical element 10 to be pivoted about at least two orthogonal axes A, A' in corresponding tilting directions X, Y.

The coil carrier 80 carries at least a first and a second coil means 60, 70, and preferably also a third and a fourth coil means 60a, 70a, wherein said coil means 60, 70, 60a, 70a are each formed as separate (e.g. circular) coils that extend along a common extension plane P along which also said plate-like coil carrier 80 extends. Particularly, the coils 60, 70, 60a, 70a are embedded into the coil carrier 80 and comprise a rectangular contour.

Further, the device 2 comprises at least a first and a second magnet 21, 22, but preferably also a third and a fourth magnet 23, 24. Each magnet 21, 22, 23, 24 extends in a respective extension direction Z (which runs perpendicular to the optical element 10 and also perpendicular to the coil carrier 80 when the optical element 10 is in a certain non-tilted position as shown in FIG. 25) and is rigidly connected to a first (lower) side 10a of the optical element 10 via a magnetic flux return structure 25 that is adapted to guide the magnetic flux. Particularly, the return structure 25 comprises or is made out of a magnetically soft material. Further, each magnetic flux return structure 25 particularly comprises a limb 26 extending in the extension direction Z of the associated magnet 21, 22, 23, 24. Each limb 26 extends through an associated coil means 60, 70, 60a, 70a, wherein the respective coil 60, 70, 60a, 70a faces the associated magnet 21, 22, 23, 24 perpendicular to the respective extension direction Z (in the direction of the magnetization M) or along said extension plane P.

Also here, each magnet 21, 22, 23, 24 further comprises a magnetization M running perpendicular to the respective extension direction Z. Particularly, the first coil 60 is associated to the first magnet 21 and faces a vertical front side 21a of the first magnet 21 along the extension plane P, and the second coil 70 is associated to the second magnet 22 and faces a vertical front side 22a of the second magnet 22 along the extension plane P. Furthermore, the third coil means 60a is associated to the third magnet 23 and faces a vertical front side 23a of the third magnet 23 along the extension plane P, and finally the fourth coil means 70a is associated to the fourth magnet 24 and faces a vertical front side 24 of the fourth magnet 24 along the extension plane P. The front sides 21a, 22a, 23a, 24a of the magnets 21, 22, 23, 24 facing outwards each extend in the respective extension direction Z.

Further, each coil 60, 60a, 70, 70a comprises a winding axis denoted as first, second, third and fourth winding axis W, W', W'', W''', wherein these axes all run parallel to the respective extension direction Z and perpendicular to the magnetization M of the respective magnet 21, 22, 23, 24, when the magnets 21, 22, 23, 24 or the optical element 10 reside in said certain (non-tilted) position (extension directions Z perpendicular to extension plane P).

Further, the first and the third coil means 60, 60a as well as the first and the third magnet 21, 23 face each other in the first tilting direction X or perpendicular to the first axis A while the second and the fourth coil means 70, 70a as well as the second and the fourth magnet 22, 24 face each other in the second tilting direction Y (or perpendicular to the second axis A'. Here, the first and the second tilting direction X, Y (like the first and the second axis A, A') are orthogonal.

For pivoting (or tilting) the optical element 10 by moving the magnets 21, 22, 23, 24 a current source means 50 is provided as already described above, which current source means is designed to apply a current to the first and third coil and separately to the second and the fourth coil. Depending on the direction of the individual current the respective magnet 21, 22, 23, 24 is attracted towards the associated coil or pushed away so that a 2D tilting of the optical element 10 can be achieved. Controlling of the tilting of the optical element 10 is here performed using a light source (e.g. LED) being arranged in the transparent polymer block 110 so that light emitted by said light source 100 impinges on the optical element 10 and is reflected back to one of four photo diodes 101 that are arranged on the coil carrier 80 around the polymer block 110. The signal of the photodiodes 101 depends on the position of the optical element 10 so that the tilting can be controlled by letting a current source means 50 apply a current to the coils 60, 70, 60a, 70a such that a desired reference signal of the photodiodes 101 is approached.

Figure 27:
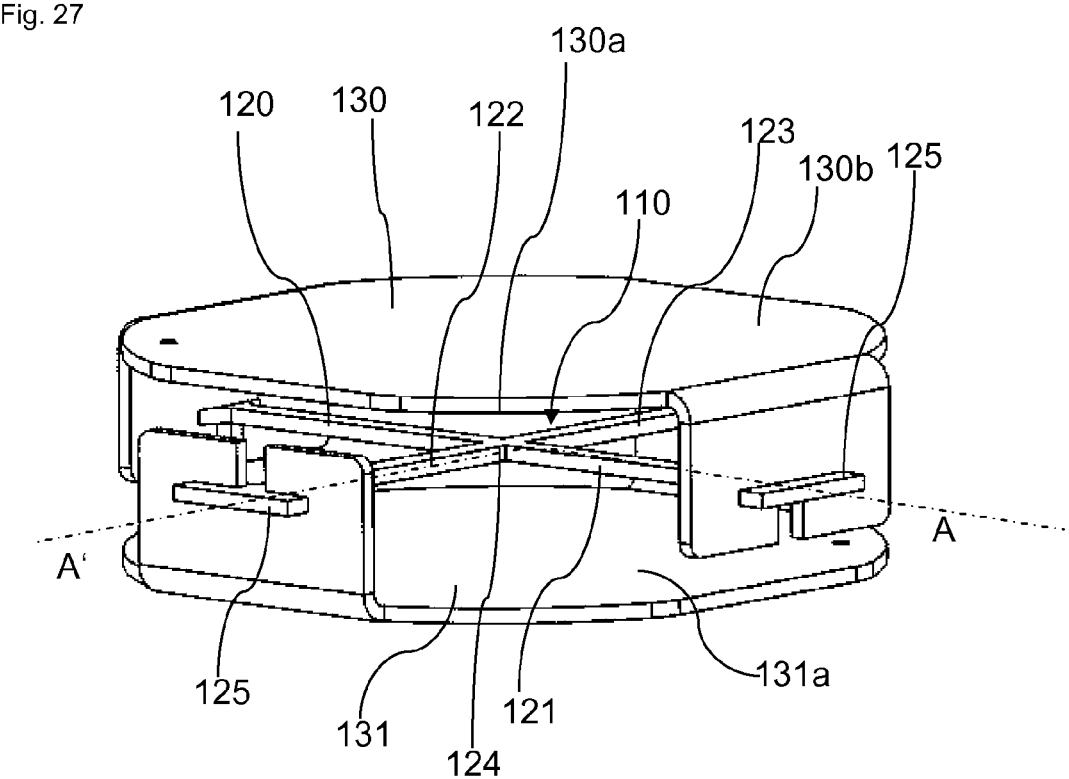

FIG. 27 shows a further embodiment of a spring means 110 that can be used to elastically support the optical element 10 in a device 1, 2 according to the invention so that it can be pivoted about two orthogonal axes A, A'. For this, the spring means 110 is formed as a cross-shaped spring member comprising four integrally connected arms 120, 121, 122, 123 extending outwards from a center 124 of the spring member 110, wherein a first arm 120 is aligned with a second arm 121, wherein the first and the second arm 120, 121 extend along said first axis A, and wherein a third arm 122 is aligned with a fourth arm 123, wherein the third and the fourth arm 122, 123 extend along said second axis A', and wherein each arm 120, 121, 122, 123 comprises an end region 125. By means of the cross-shaped spring member 110 a first carrier member 130 of the device 1, 2 to which the optical element 10 can be connected, as well as the magnet 20 or the magnets 21, 22, 23, 24, can be pivotably supported on a second carrier member 131 to which the first and/or second coil means 60, 70 or the four coil means 60, 70, 60a, 70a can be connected. Particularly, the first carrier member 130 comprises a first side 130a for connecting to the magnet(s) 20, 21-24 and a second side 130b facing away from said first side 130a, which second side 130b is preferably connected to the optical element 10. The end regions 125 of the first and the second arm 120, 121 are fastened to the first carrier member 130, and the end regions 125 of the third and the fourth arm 122, 123 are fastened to the second carrier member 130, so that the first carrier member 130 can be tilted together with the optical element 10 about the first and/or second axis A, A' with respect to the second carrier member 131.

Figure 30:
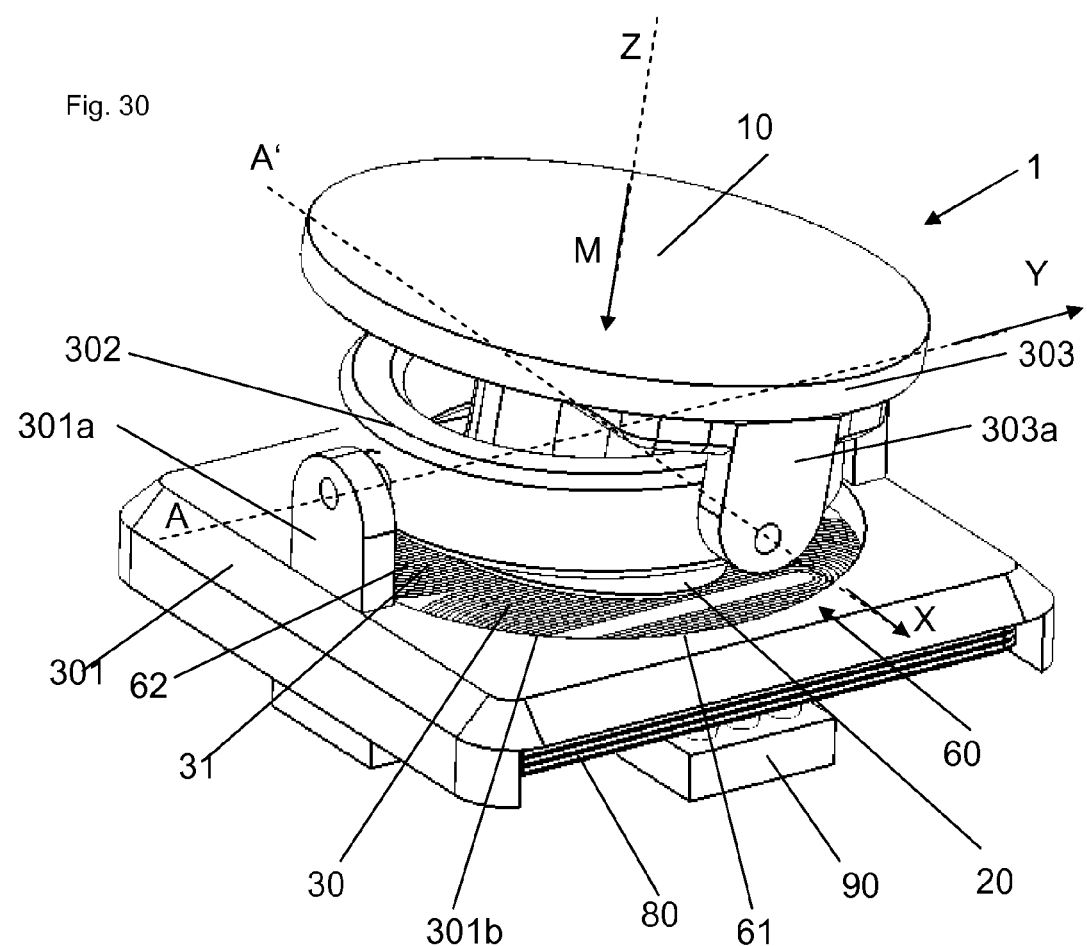
FIG. 30 shows an embodiment of the present invention using a gyro of the kind shown in FIG. 29.

Further, FIG. 30 shows an embodiment of the present invention according to the first aspect which uses a gyro joint 300 according to the principle shown in FIG. 29. Here, the magnet 20 is rigidly coupled to the optical element 10, wherein the magnet 20 and the first and second coil means 60, 70 (the second coil means 70 is not shown) are configured as described with respect to FIGS. 7 and 8, i.e., the first coil comprises two first parallel conductor sections 30, 31 facing the front side 20a of the magnet 20 in the extension direction Z or in the direction of the magnetization M of the magnet 20. In the non-pivoted position of the magnet 20 these conductor sections extend perpendicular to the magnetization M/extension direction Z of the magnet 20 and generate a Lorentz force for tilting the magnet 20/optical element 10 in the first tilting direction X that runs orthogonal to the first axis A about which a circumferential second member 302 of the gyro joint is pivotably supported on a first member 301 that carries a coil carrier 80 carrying the coil means 60, 70 (e.g. as described before). The first member 300 comprises a recess 301b for better exposure of the conductor sections 30, 31 to the magnet 20. Particularly, the first member 301 comprises two opposed protrusions 301a extending along the extension direction Z on which the second member 302 is pivotably supported, wherein the magnet 20 is arranged between these protrusions 301a. Further, said joint comprises a third member 303 which is itself pivotably supported on the second member 302 about a second axis A' via two protrusions 303a which protrude from the third member 303 along the extension direction Z in the opposite direction as the protrusions 301a of the first member 301. The third member carries the magnet 20 and—on the other side—the optical element 10. Particularly, the optical element 10 may form part of the third member 303, wherein particularly the protrusions 303a then may protrude from the optical element 10 itself. As a result, the third member 303 and thus the optical element 10 and magnet 20 can be tilted in 2D about the axes A, A'. Actuation and control of the magnet 20 can be conducted as described before, e.g. in conjunction with FIG. 11, using a current source means 50 and a controller 92 as well as a sensor means 90 for sensing the actual position of the magnet 20 (e.g. by means of one or several Hall sensors or other suitable sensors). Generally, although mostly embodiments with the optical element 10 connected to the magnet 20 or magnets 21-24 are shown, it is also within the spirit of this invention to have the optical element 10 mounted to the coil carrier 80 that is than tiltable with respect to the magnet 20 or magnets 21-24, which are then fixed in space.

Figure 31:
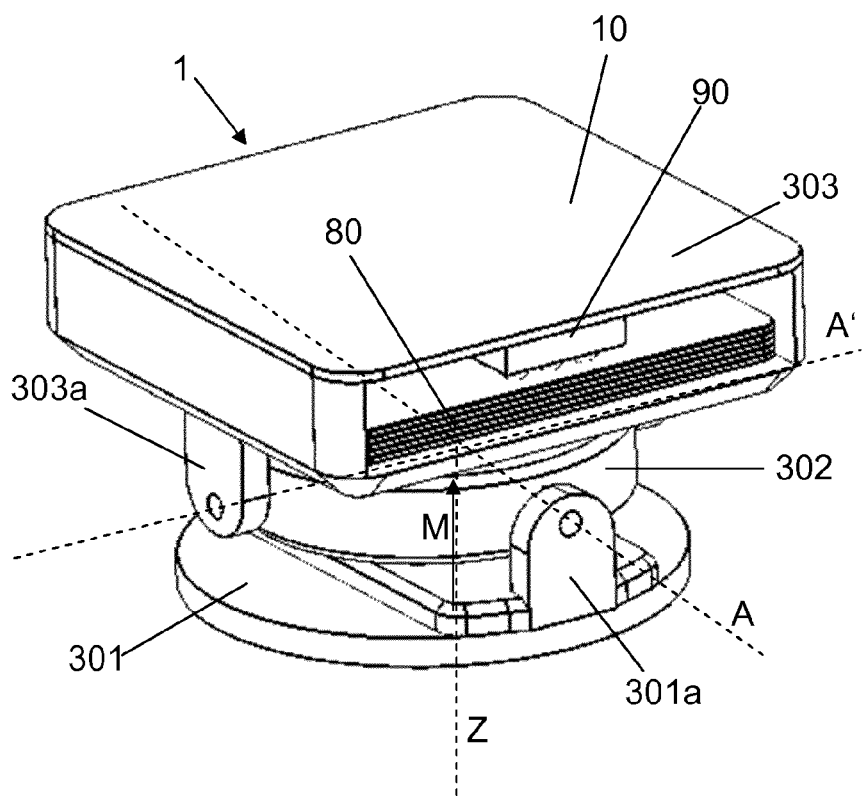
FIG. 31 shows a modification of the embodiment shown in FIG. 30.

Such an embodiment being a modification of the embodiment according to FIG. 30 is shown in FIG. 31.

According thereto, in contrast to FIG. 30, the first member 301 now carries the magnet 20 (not visible), wherein the circumferential second member 302 is pivotably supported on the opposed protrusions 301a of the first member 301 about the first axis A. The third member 303 which now carries the coil carrier (PCB) 80 and coil means 60, 70 (not shown) is pivotably supported about the second axis A' via its opposed protrusions 303a on the second member 302 so that the coil carrier (PCB) 80 with its e.g. integrated coils means 60, 70 can be tilted in 2D with respect to the fixed magnet 20. On an upper side of the third member 303 (facing away from the coil carrier 80), the optical element 10 can be mounted so that it faces the magnet 20 along the extension direction Z or direction of magnetization M of the magnet 20 as in the arrangement shown in FIG. 30.

Figure 32:
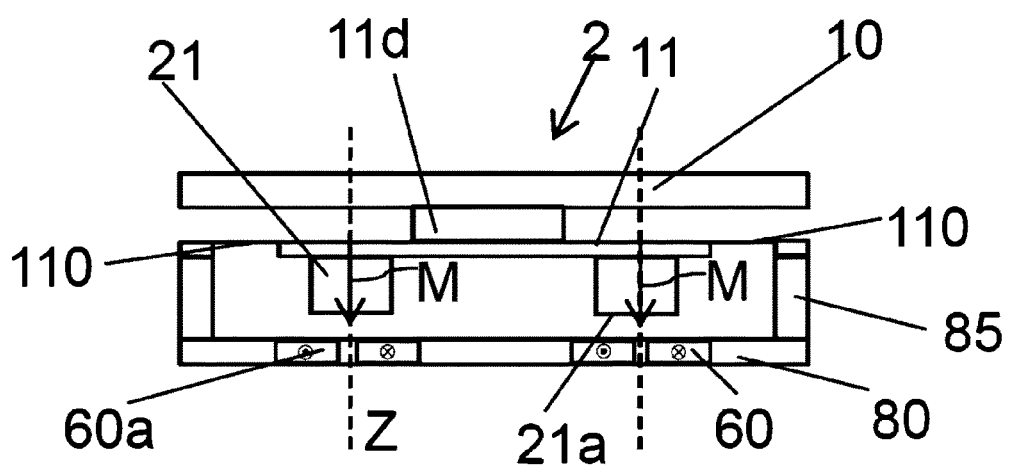
FIGS. 32-34 shows different views of a further embodiment of the present invention.
Figure 33:
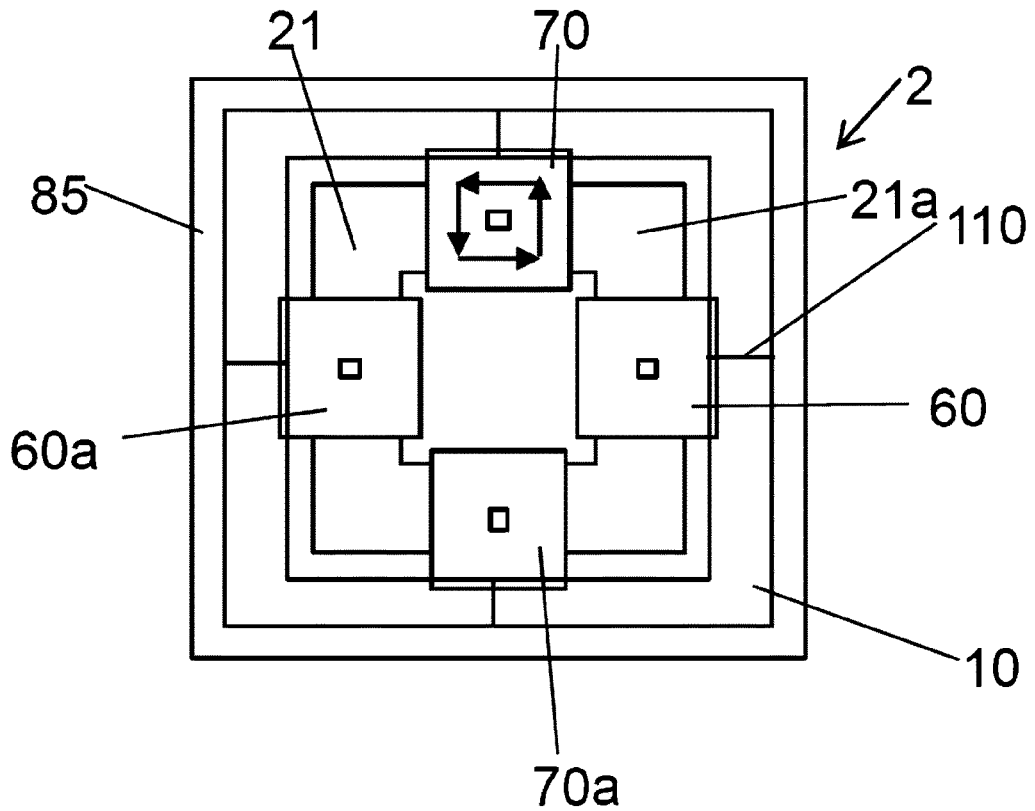
Figure 34:
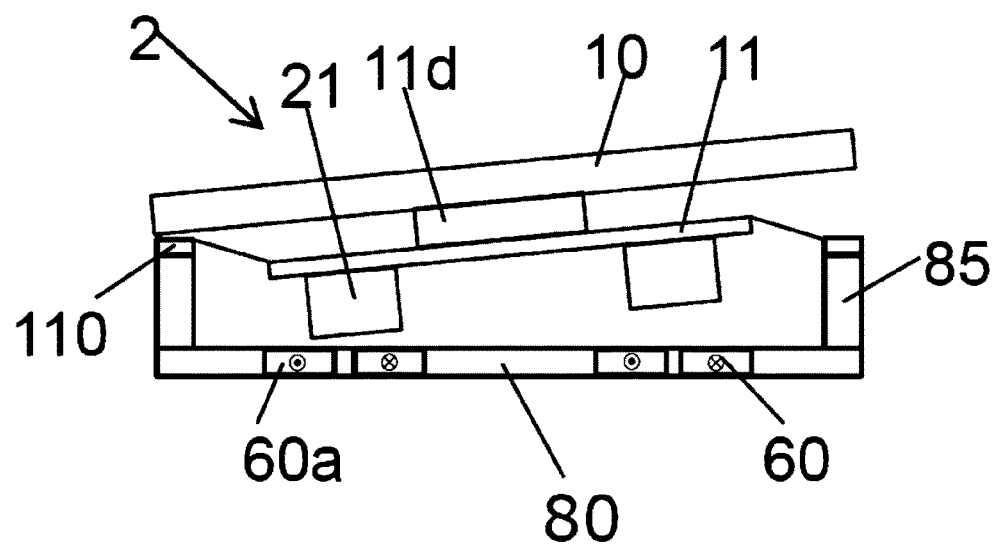

A further embodiment according to the second aspect of the present invention, which is particularly suitable for array applications, is shown in FIGS. 32 to 34. Here, the device 1 comprises a coil carrier (e.g. PCB) with (e.g. integrated) four coils 60, 60a, 70, 70a having a quadrangular contour, respectively. These coils 60, 60a, 70, 70a face each other pairwise as described with respect to FIG. 26 for instance.

The coils are configured to interact with a single magnet 21 for tilting the magnet 21 and thus an optical element 10 rigidly coupled to the magnet 21. The magnet 21 comprises a circumferential, quadrangular shape comprising four connected arms, wherein each arm faces an associated coil 60, 60a, 70, 70a in an extension direction Z of the magnet that is aligned with the magnetization M of the magnet 21. Here, when the magnet 21 is not pivoted, the magnetization is perpendicular to the extension plane in which the coils 60, 60a, 70, 70a extend side-by-side wherein the winding axes of these coils preferably run perpendicular to said plane/coil carrier 80.

Figure 35:
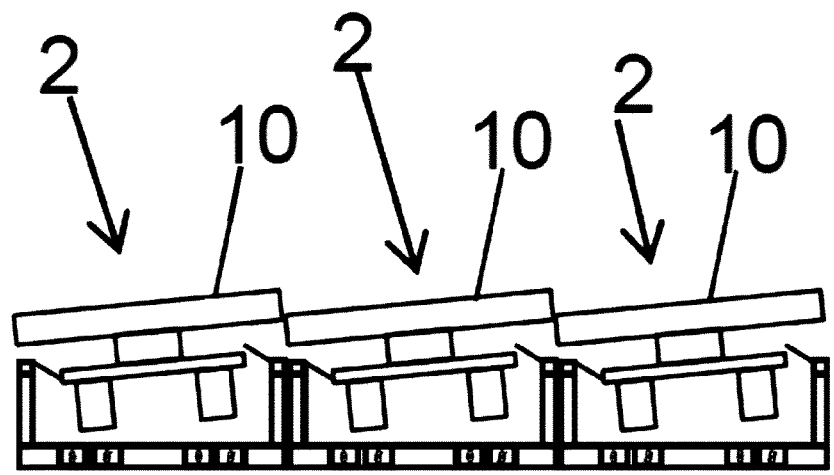
FIGS. 35-36 shows the device according to FIGS. 32 to 34 in an array configuration.
Figure 36:
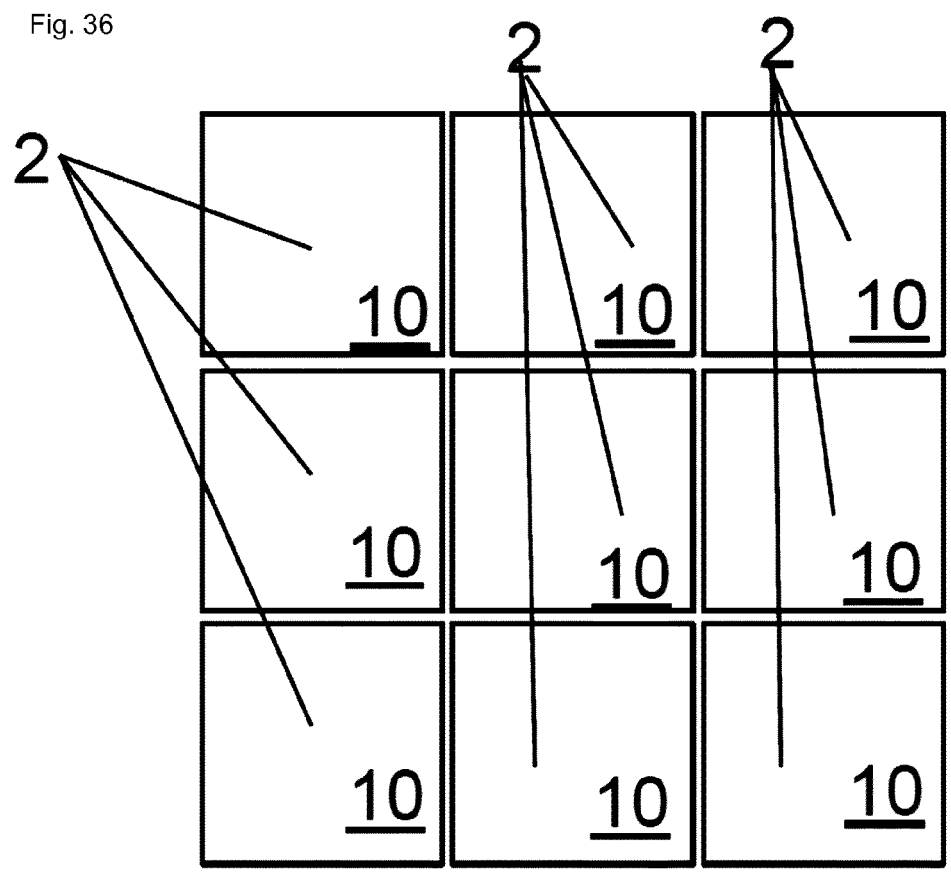

Now, in order to pivotably support the magnet 21 and the optical element, the magnet is connected to a holding member 11 which in turn is supported via two opposed spring means 110 on a circumferential wall 85 which is preferably formed out of a magnetically soft material and protrudes from the coil carrier 80. The wall preferably comprises a quadrangular configuration so that an array of the devices 2 can be easily constructed by arranging them side by side as shown in FIGS. 35 and 36.

Furthermore, all embodiments of the device 1, 2 according to the invention can be extended to an array of equal devices 1 or 2.

Further, FIG. 37 shows another embodiment of a device 1 according to the invention for pivoting or tilting an optical element 10, preferably in the form of a mirror 10, that is movably mounted by means of a ball bearing 420, so that the optical element 10 can be tilted about an arbitrary axis. The device 1 further comprises a cylindrical magnet 20 that is rigidly coupled to the optical element 10, which magnet 20 extends in an extension direction (cylinder axis) Z, wherein the magnet 20 comprises a magnetization M aligned with said extension direction Z, and a front side 20a.

Figure 38:
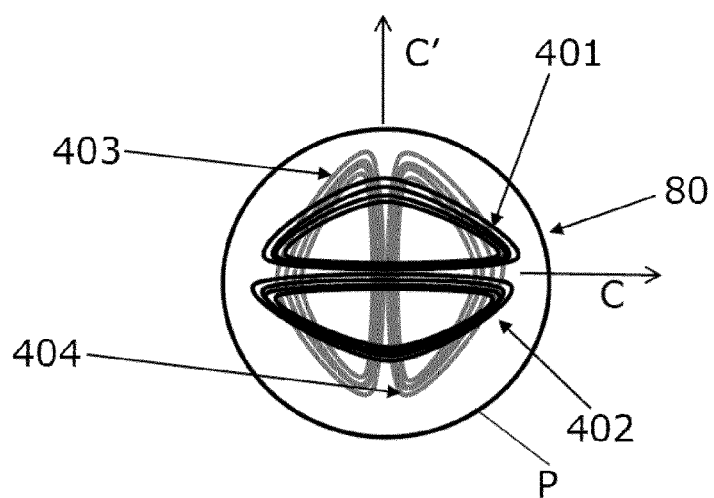
FIG. 38 shows a schematical plan view of the arrangement of coils shown in FIG. 38 for moving the magnet of the device shown e.g.

As shown for instance in FIG. 38, for moving the magnet 20 in the manner already described above, the device 1 may comprise four separate coils, namely a first coil 401, a second coil 402, a third coil 403, and a fourth coil 404, that are arranged on a coil carrier 80 (preferably in the form of a PCB). These coils 401, 402, 403, 404 are planar coils that extend parallel to an extension plane P, wherein the winding axes of the coils 401, 402, 403, 404 extend perpendicular to this plane P. The first and the second coil 401, 402 may extend in the same plane and may be arranged on top of the third and the fourth coil 403, 404 which may again also extend in the same plane. Further, the first and the second coil 401, 402 form parallel first conductor sections 30, 31 extending along a first direction C, whereas the third and the fourth coil form second conductor sections 40, 41 that extend in a second direction C' that runs perpendicular to the first direction C. The first conductor sections 30, 31 run across the second conductor sections 40, 41 below the front side 20 of the magnet 20, which front side (in case the magnet 20 is not tilted) runs parallel to said extension plane P. Thus, when a current is applied to the coils 401, 402, 403, 404 such that it flows in the first conductor sections 30, 31 in or counter to the first direction C and/or in the second conductor sections 40, 41 in or counter to the second direction C', the magnet 20 can be tilted in a desired direction due to a corresponding Lorentz force as described in detail above. For providing said currents, the device 1 may provide a current source means that may be controlled by a controller as described herein.

Figure 39:
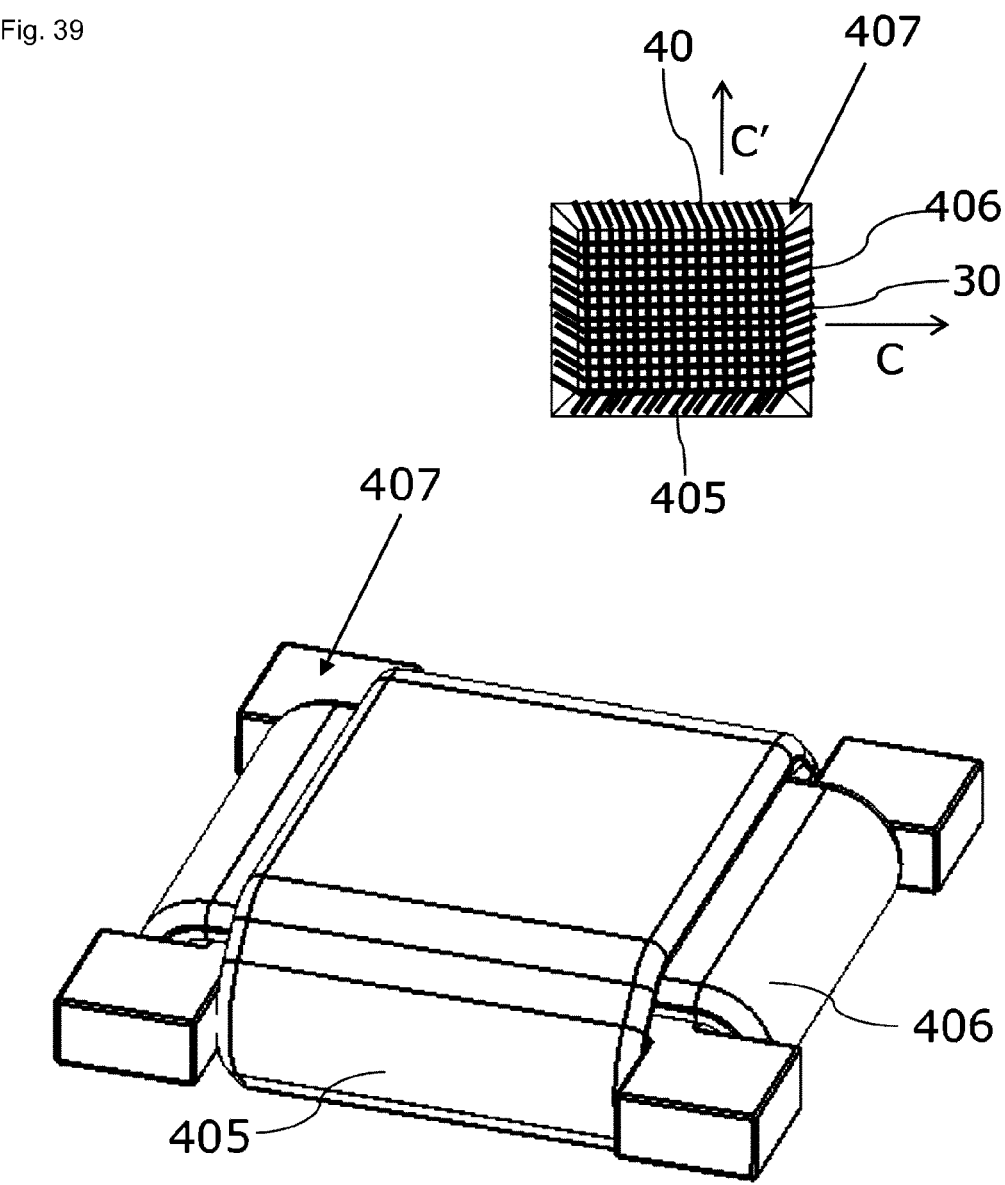
FIG. 39 shows in the upper part a schematical plan view of an arrangement of coils which is shown as an example in the lower part of FIG. 39 in a perspective view; these coils may be used for moving the magnet of the device shown e.g.

Another possibility for providing two crossing conductor sections 30 and 40 for driving the magnet 20 in the embodiment shown in FIG. 37 (or any other embodiment) is shown in FIG. 39. Here, a sufficiently thin PCB with the required electrical and optical components may be arranged on top of coils 405, 406 which are configured to create an ideal homogenous current flow per direction C, C' (there is no current flow in opposite direction potentially causing a back action force). For this, the first and the second conductor section 30, 40 are each formed by a separate coil 405, 406, which separate coils 405, 406 are each wound around a magnetic flux guiding plate 407 (e.g. an iron or steel plate 407), which is preferably embedded into an (e.g. iron) ground plate 91 of a magnetic flux guiding structure 431 such as a magnetic field return structure (also denoted as magnetic flux return structure herein), which will be explained in detail further below, or may form a bottom or part of a bottom (e.g. 91) of an outer magnetic flux guiding structure 431 (cf. e.g. FIG. 37) as shown in the lower part of FIG. 39. The coils 405, 406 are wound around the iron plate 407 such that on a surface of the plate 407 facing the front side 20a of the magnet 20 the first and the second conductor section 30, 40 each comprise a plurality of parallel wire sections, wherein the wire sections of the first conductor section 30 run across the wire sections of the second conductor section 40 so that a lattice structure of wire sections is formed on said surface of the iron plate 407. In this way coils 405, 406 wound around plate 407 allow to generate a uniform unidirectional force, comprises a high coil package density as well as a good thermal connection of coil (namely to the iron plate/return structure).

For allowing tilting of the magnet 20 and thus of the mirror 10 about an arbitrary axis, the device 1 comprises a ball bearing 420 for supporting the magnet 20, which ball bearing 420 is arranged in a circumferential gap 421 formed between a first support member 422 supporting the magnet 20 and the optical element 10 and a second support member 423 resting on the coil carrier 80, which second support member 423 surrounds the first support member 422 and the magnet 20.

Here, the first support member 422 provides a convex surface having a spherical curvature for contacting the balls of bearing 420, while the second support member 423 forms a concave surface having a spherical curvature for contacting the balls of the bearing 420 from the other side.

The magnet 20 and optical element (e.g. mirror 10) are further surrounded by an outer magnet flux guiding structure 431 that is connected via screws 39 to a bottom or ground plate 91 of the magnetic flux guiding structure 431, which bottom 91 may also be denoted as magnetic flux return structure. A transparent cover element or glass 10b may be connected to the outer magnetic flux guiding structure to cover and protect the optical element 10. Further, an inner magnetic field guiding structure 430 is attached to the magnet 20 such that it is encompassed by the outer magnetic flux guiding structure 431. The inner and outer magnetic flux guiding structures 430, 431 may be formed out of a magnetically soft and/or ferromagnetic material. The device 1 may further comprise a connector 38 for providing a signal connection to another device.

Preferably, the two guiding structures 430, 431 are configured for preventing a snap-in of the magnet 20 to the bottom 91/PCB 80 and/or for preventing a rotation of the magnet 20 about its extension direction or axis z. For this, as shown in FIG. 37 and particularly FIGS. 47, 48, 49, the inner magnetic flux guiding structure 430 comprises a plurality of first protrusions 432, wherein each first protrusion 432 protrudes radially outwards towards the outer magnetic flux guiding structure 431. Further, the outer magnetic flux guiding structure 431 comprises a corresponding number of second protrusions 433, wherein each second protrusion 433 protrudes radially inwards towards the inner magnetic flux guiding structure 430, so that each first protrusion 432 is aligned with an associated second protrusion 433 with which it forms a gap 434. Therefore, on both sides of each protrusion pair 432, 433 a larger gap A", A'" (cf. FIG. 48) is present.

Due to this configuration, a finite torque is induced into the inner magnetic flux guiding structure 430 and thus into the magnet 20 and optical element 10 connected thereto, when the first protrusions 432 get out of alignment with the outer protrusions 433 due a rotation of the magnet 20/optical element 10 about said axis z. This torque counteracts the rotation so that the latter is suppressed as illustrated in FIG. 47 which shows the generated torque on the axis of ordinate and the rotation angle on the abscissa.

Generally, without a lateral wall or barrier, the magnet 20 tends to snap to the bottom ground plate 91 (cf. FIG. 37), which can be suppressed by means of such a wall, here in form of the outer magnetic flux structure 431.

Further, the magnet 20/optical element 10 will predominantly stay in a horizontal position as shown in FIG. 37, when the circumferential air gap 434a (cf. FIG. 49) between the inner magnetic flux guiding structure 430 connected to the magnet 20 and the outer magnetic flux guiding structure is minimized.

Using said protrusions 432, 433 an equilibrium between the tendency of the magnet 20 to snap to the bottom 91 and to maintain the horizontal position can be achieved by optimizing the filling factor of the protrusions 432, 433, i.e., the size of the area A", A'" between the protrusions 432, 433 as shown in FIGS. 48 and 49 (in FIG. 48, the structure on the left hand side has a lower filling factor, i.e., an area A" that is larger than the area A'" on the right hand side of FIG. 48).

Further, the height of the second protrusions 433 in the z-direction can be further optimized to inhibit snapping of the magnet 20 to the ground plate 91.

Particularly, FIG. 49 shows the torque on the axis of ordinates and the tilt angle on abscissa for the two configurations on the left hand side having a smaller air gap 434a (solid line in the graph) and a larger air gap 434a (dashed line in the graph). Combining these to air gaps 434a using the structure of aligned protrusions 432, 433 shown on the right hand side of FIG. 49 as described above yields the desired equilibrium.

Thus, when the forces are properly minimized as illustrated in FIG. 49, the torque is minimized and the efficiency of the entire device 1 such as speed is maximized. This further simplifies a control algorithm for controlling tilting of the magnet 20.

Advantageously, as described above using the aligned protrusions 432, 433 also prevents said axial rotation of the magnet 20.

In other embodiments of the present invention, spring structures or means 500 may be used to prevent said axial rotation of the magnet 20 (cf. e.g. FIG. 52) and particularly to prevent the mirror from falling out of a housing of the device 1. Thus such spring means may be combined with the other embodiments of the device 1 of the present invention.

Further, in an alternative embodiment, a membrane (e.g. a thin and elastic/flexible polymer membrane may be spanned between the movable optical element/mirror 10 and the outer magnetic flux guiding structure to inhibit said axial rotation.

Particularly, FIG. 52 shows an embodiment of the device 1, where a flexible coil carrier (e.g. PBC) 80 is provided that comprises the coils and sensor means as described in various embodiments herein, wherein an outer circumferential magnetic flux guiding structure 431 rests as a housing of the magnet 20 to which the optical element (e.g. mirror) 10 is attached on said PCB (printed circuit board) 80.

The spring means 500 for providing a support of the magnet 20 and optical element 10, such that the latter can be tilted about the indicated axes A, A' is mounted in turn to the guiding structure 431 and comprises an outer frame member 506 via which the spring means 500 is connected to the guiding structure 431 and an inner frame member 503 to which the magnet 20 and optical element 10 are connected.

Particularly, the annular inner frame member 503, which accommodates the magnet 20 optical element 10 in a central recess of the inner frame member 503, is connected to the rectangular outer frame member 506 by two first arms 504, 505 that are aligned with a first rotation axis A about which the inner frame member 503 (and thus the optical element 10) can be tilted with respect to the outer frame member 506. Further, the magnet 20 and optical element 10 are connected to the inner frame member 503 via two second arms 501, 502 that are aligned with a second rotation axis A' running perpendicular to the first rotation axis such that the optical element 10 can be tilted with respect to the inner frame member 503 about the second rotation axis A'. Again, the magnet can be actuated by means of coils as described herein, which coils can be controlled by a controller as described herein.

According to a modification of the embodiment shown in FIG. 52, it is possible to additionally support the magnet 20/optical element 10 in order to avoid vibrations (e.g. due to external disturbances) e.g. by positioning a ball bearing 420 as described above underneath the spring structure 500.

In order to be able to detect the position of the magnet 20 (e.g. in the embodiment shown in FIG. 37), the device 1 may comprise a quadrature photo diode 101, i.e. a photo diode comprising four individual quadrants or photo diodes that are arranged on the corner points of a square. Further, this quadrature photo diode 101 (cf. also FIG. 43) comprises a recess in the center for accommodating a light source 100 e.g. in the form of an LED.

Figure 40:
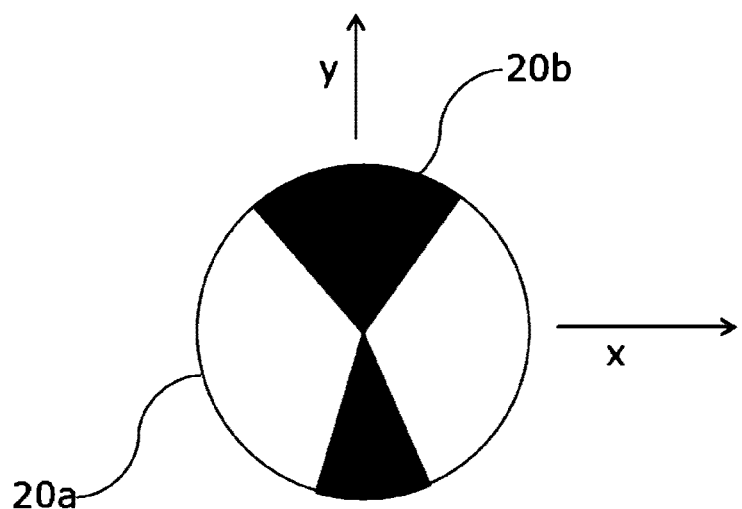
FIGS. 40-41 shows a plan view onto a bottom of a mirror of the device according to FIG. 37 having a shading for detection of axial rotation of the magnet as well as of the tilt angle in the first and second tilting directions x and y.
Figure 41:
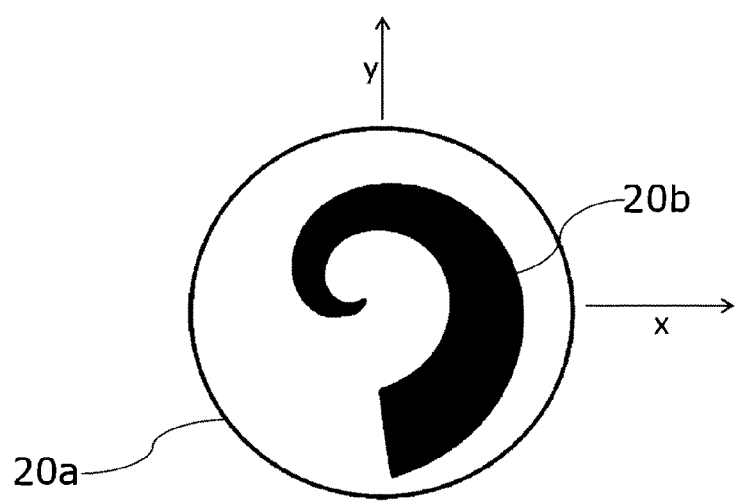

This structure 100, 101 is arranged on top of the coil carrier 80 below the front side 20a of the magnet 20 so that the quadrature photo diode 101 and the LED face the front side 20a of the magnet 20 (10e denotes the mirror pivot point in FIG. 43), wherein the LED 100 is configured to emit light that impinges onto the front side 20a which comprises a shading 20b as shown for instance in FIGS. 40 and 41. Such a shading 20b is formed such that a signal provided by the quadrature diode 101 that is derived from detected light of the LED 100 that is reflected back from the front side 20a to the quadrature photo diode 101 is indicative of an axial rotation angle of the magnet 20 (i.e. about the z-axis) and indicative of the tilt angles in the two (e.g. orthogonal) tilting directions x, y. This can be achieved by using a shading pattern 20b that is not rotationally symmetric (e.g. with respect to the central normal of the front side 20a as a rotation axis).

Particularly, FIGS. 42 to 43 illustrate how a nearly linear progression of the normalized signals of the photo diode 101 can be achieved over a wide range of Gaussian sigmas which relate to the scattering properties of the front side of the magnet. Here, one preferably wants to achieve that the signal still contains angle information independently of how much light is scattered. When the surface is rougher and less reflective, light rays are scattered back in different directions and the arrangement is less sensitive to the arrangement of the photo diodes, i.e., mechanical tolerances can be increased. The shown configuration (e.g. FIG. 43) corresponds essentially to the ideal linear feedback curve.

The signal provided by the photo diode 101 can be used as a feedback signal for controlling the movement of the magnet 20 and thus of the optical element 10 (e.g. mirror). For this a controller as described herein may move the magnet such by providing appropriate currents using the current source means such that said feedback signal reaches a desired reference signal.

In an alternative embodiment, the feedback signal may be provided by a capacitive sensor means 410 as illustrated in FIG. 44. Here, particularly, said sensor means 410 may comprise an electrically conducting first plate member 411 mounted to the moving optical element/mirror 10. Further, particularly, the sensor means 410 may comprise a second and a third (separate) plate member 412, 413 coupled e.g. to the coil carrier 80 or a housing structure, which second and third plate member 413, 414 do not move with the optical element 10 and are spaced apart from the first plate member 411 but face the latter, so that two capacitors arranged in series are formed by said plate members 411, 412, 413.

The capacitive sensor means 410 is thus configured to measure the capacity of the two capacitors in series which changes when the optical element 10 is tilted. This capacity corresponds to a feedback signal that can be used by the controller as described above for controlling movement of the optical element 10.

Further, in an alternative embodiment, the feedback signal may be provided by means of two Hall sensors 90a, 90b (e.g. per rotation axis) as shown in FIGS. 45 and 46.

Here, the two Hall sensors 90a, 90b may be arranged on opposing sides of the magnet 20, e.g. below the gaps 434 of said protrusion pairs 432, 433 described in conjunction with the embodiment in FIG. 37. The difference Hall signal that is provided by these two sensors 90a, 90b and shown in FIG. 45 provided a monotonous feedback signal as shown in FIG. 45 (differences of Hall signals over tilt about tilt or rotation axis of magnet 20 in FIG. 46) that can be used to control the position of the magnet 20 as described above using the controller and current source means.

Further, FIG. 50 shows another embodiment of a device 1 according to the invention, where the magnet 20 may be moved and controlled as described in conjunction with FIG. 37 (using e.g. the above-described quadrature photo diode 101 and LED 100, wherein in contrast to FIG. 37, the magnet 20 is now supported using a bearing ball 12 according to the principle explained in conjunction with FIG. 7 and similar embodiments. This bearing ball 12 is pivotably held in a recess of a cage member 15 in a form-fitting manner, so that the bearing ball 12 can slide/rotate in said recess in order to pivot the magnet 20 and optical element 10 (e.g. mirror) connected thereto. The cage member 15 forms a housing together with a bottom 91 connected to the cage member 15. Both components 15, 91 form a magnetic flux guiding structure for guiding the magnetic flux of the magnet 20. A coil carrier 80 supporting e.g. the first and/or second conductor sections 30, 31, 40, 41 formed by a flat coil structure (not shown) is arranged on the bottom 91 below the quadrature photo diode 101 and LED 100. The magnet 20 is arranged in the housing formed by the cage member 15 and bottom 91 while the optical element 10 is arranged outside this housing and connected in a rigidly fashion to the magnet 20 via the bearing ball 12. Thus, when the magnet 20 is moved due to the Lorentz forces F generated by currents running e.g. through the first and/or second conductor sections 30, 31, 40, 41, the bearing ball 12 connected to the magnet 20 is rotated and thus tilts the optical element 10 with respect to the coil carrier (e.g. PCB) 80 or cage member 15. Particularly, the optical element 10 is supported by a holding member 11 that is connected to the bearing ball 12, wherein this holding member 11 forms a magnetic flux guiding structure, too. Here, the holding member 11 may contact a conical roof region of the cage member 15 from above which is therefore covered with a silicon pad 11d to softly stop the optical element 10 when it is tilted.

Further, FIG. 51 shows a further embodiment of a device 1 according to the invention for tilting an optical element 10 (e.g. a mirror) in one dimension (1D), i.e., about an axis A which extends perpendicular to an axial magnetization M of the magnet 20.

The magnet 20 is connected to a lower side of an inner magnetic flux guiding structure 430 that comprises an upper side to which the optical element (e.g. a mirror) 10 is attached that is to be tilted about axis A.

As shown in FIG. 51, the inner guiding structure 430 comprises two opposing first protrusions 432 that each extend beyond the magnet 20 and are each separated via a gap 434 from a second protrusion 433 of an outer magnetic flux guiding structure 431 that forms a housing of the device, wherein the magnet 20 is pivotably supported on said housing via a ball bearing 420a.

For tilting the magnet 20 and thus the mirror 10 about the axis A, a coil 60 is arranged below the magnet 20, which coil 60 is wound around a region of a bottom 80 of said housing 431, which bottom 80 thus forms a coil carrier as well as a bottom part of the magnetic flux guiding structure 431. The coil 60 forms a first conductor section (not shown) below the magnet 20 so that the magnet 20 can be tilted by means of a Lorentz force when a current is applied to the first conductor section. The current may be applied and controlled according to the various embodiments described herein.

In order to softly stop the magnet 20 upon tilting of the magnet, a silicon pad 11d is arranged on the coil 60 below the magnet 20.

Figure 53:
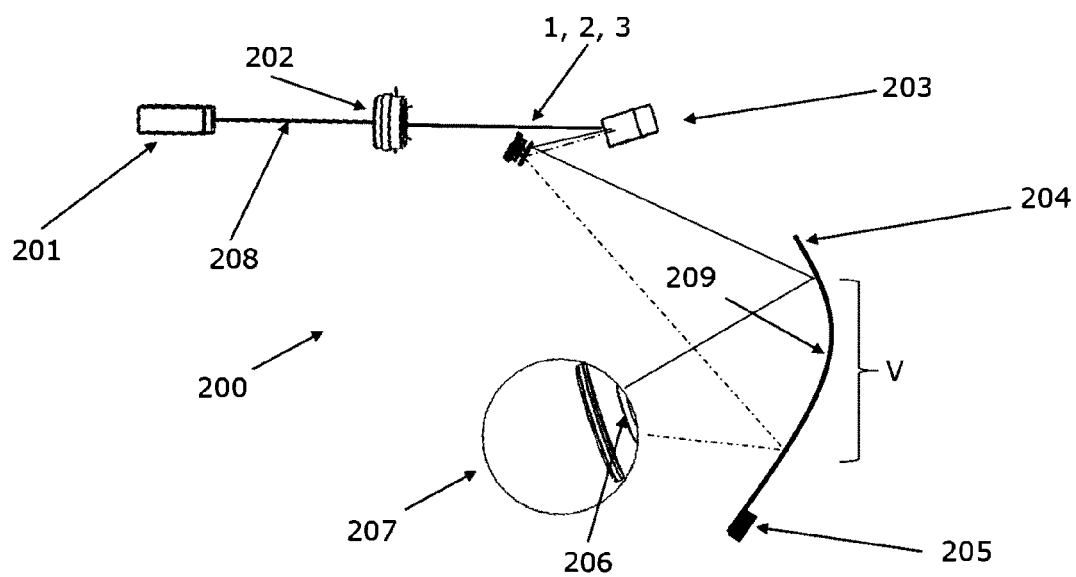
Figure 54:
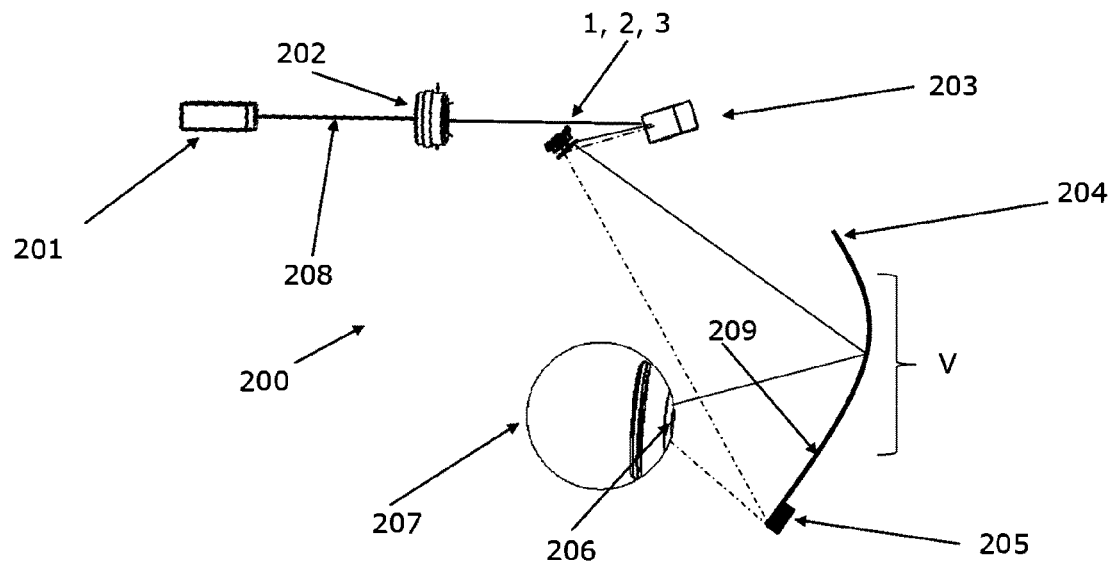
Figure 55:
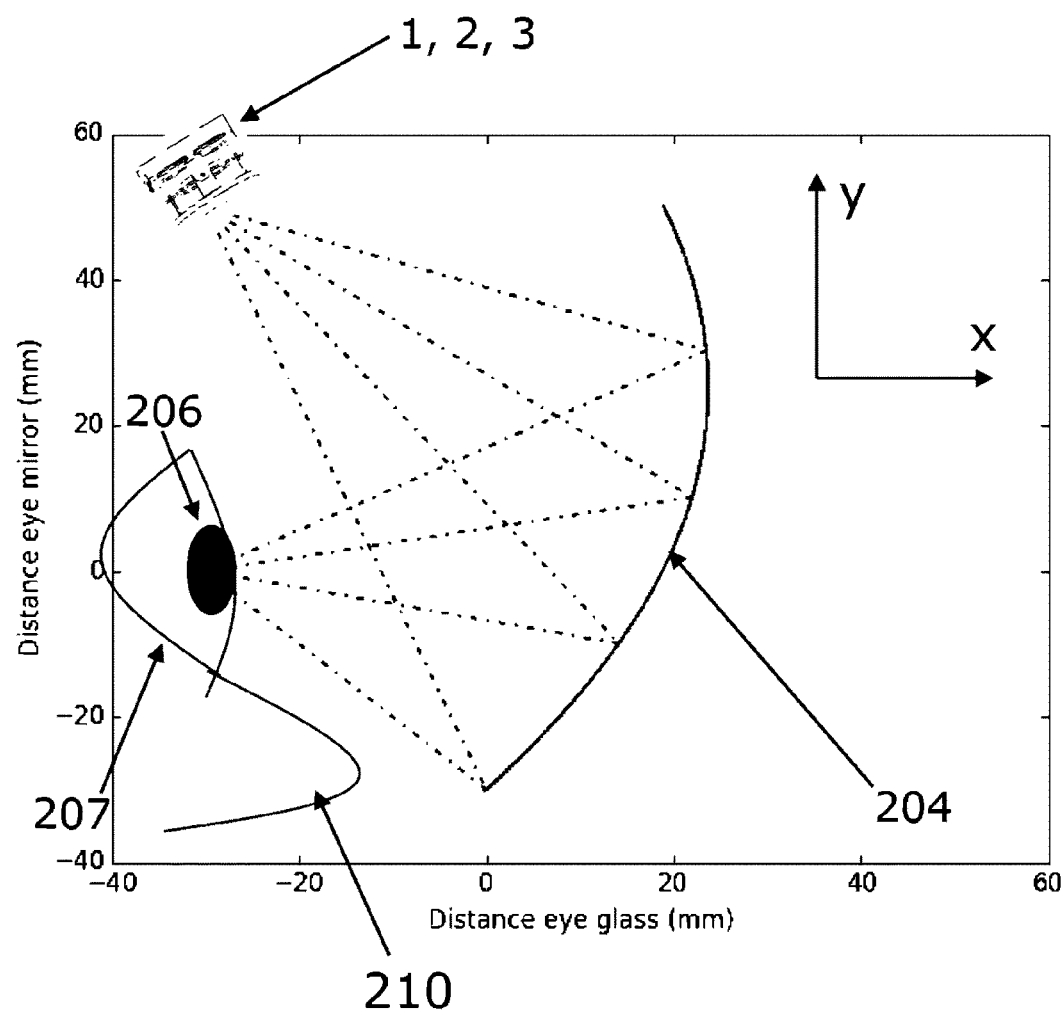
Figure 56:
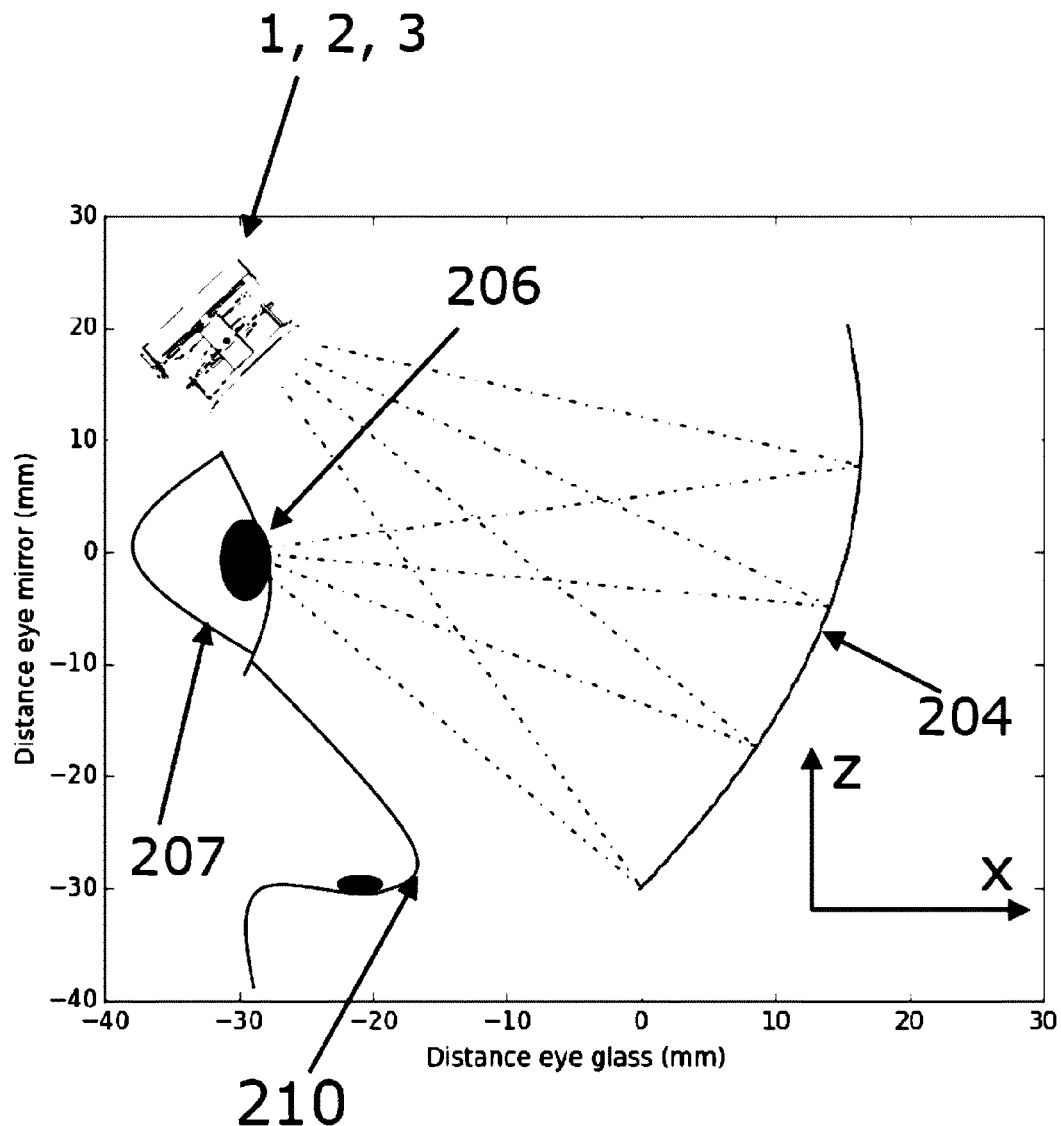

Furthermore, FIG. 53 shows in conjunction with FIGS. 54 to 56 an apparatus 200 for 3D augmented reality according to the present invention, that used a 2D mirror device that allows to pivot a mirror 10 in 2D, wherein the apparatus 200 preferably uses a device 1, 2, 3 according to the invention as described herein.

FIG. 53 shows the apparatus for a first position of a head 211 of a user, while FIG. 54 shows the apparatus for a second position of the head 211 of the user.

According to FIGS. 53 and 54, the apparatus 200 may be formed as a head-mounted (or mountable) device 200 and further comprises, besides said device 1, 2, or 3 according to the invention that allows to pivot the mirror 10 in 2D, a light source 201, e.g. a laser for providing a collimated light beam 208, a focus adjustable lens 202, preferably in the form of a liquid lens, an image projector 203, preferably in the form of a scanning mirror device, a projection screen 204, and an eye tracking device 205 configured to detect the position of a pupil 206 of an eye 207 of the user with respect to the projection screen 204. According to the invention, the light source 201 is configured to generate a light beam 208 that is guided through the lens 202, which lens 202 is configured to focus and defocus said light beam 208, and wherein the image projector 203 is configured to generate an image 209 using said light beam 208, wherein the device 1, 2, 3 is configured to reflect said image 209 onto the projection screen 204 depending on the detected position of the pupil 206.

The projection screen 204 may be part of a head-mounted display wherein said projection screen 204 is preferably formed by a semi transparent or reflective curved glass plate 204. Preferably, the glass plate 204 is partially or fully reflective for the wavelengths (colors) of the image projector 203. Preferably, the image projector 203 is a scanning mirror device that deflects the beam 208 generated by the laser 201 for generating the image 209 that is to be displayed on the projection screen 204.

The area of projection onto the glass plate 204 is restricted at maximum to the current visual field V of the eye 207 and changes upon movement of the pupil 206 using the 2D mirror device 1, 2, 3.

The position of the pupil 206 can be found by any suitable eye tracking or motion tracking device 205, for instance by analyzing light emitted by an LED that was reflected by the eye.

The size of the projected image 209 depends on the tilt angle of the mirror surface of the 2D mirror device 1, 2, or 3.

The resolution of the projected image 209 can thus be increased when illuminating only the visual field V as compared to illuminating the entire glass plate 204.

The area that needs to be illuminated on the glass plate 204 is given by the size of the projected virtual object. If the object is composed out of several subframes such that the total image that the human visual system processes is the superposition of the subframes, the illumination area can be further decreased increasing the pixel resolution per unit area. The subframes can be achieved by slightly moving the 2D mirror device 1, 2, 3.

The energy consumption is decreased when illuminating only a part of the glass plate 204 as the total light intensity of the projected image 209 enters the pupil 206.

Positioning a fast tunable liquid lens 202 between the collimated light source 201 and the 2D mirror device 1, 2 or 3 enables a focusing and defocusing of the light rays 208 such that the human eye 207 can reconstruct an image at a certain distance from the eye depending on the liquid lens focal power.

The liquid lens 202 changes the focal plane of the virtual image by modifying the collimation of the light rays 208 of the individual pixels. The lens 202 can be placed before or after the image projector 203 (e.g. scanning mirror device). The position may be chosen according to the image device 203 and applied control algorithm.

In order to enable a stereoscopic vision such that the human visual system can reconstruct the distance of the object a separate head mounted apparatus 200 may be provided for each eye 207.

Projecting images at different distances at a frame rate faster than the human visual system can process the images, results in an overlay of these images and the brain creates a 3D image with a depth of field depending on the different focal planes. This can be realized by a fast image projector 203 and a fast tunable lens 202.

The eye motion tracking device 205 can be extended by a gesture tracking device that is configured to react on movement of the eyelids of the eyes 207 but also gestures of the hands of the user to project images according to the recorded control commands from the eyelids and/or gestures.

As further illustrated in FIGS. 55 and 56, showing the eye 207, pupil 206 and nose 210 of the user, the curved glass plate 204 (instead of a glass any other suitable material may be used) is designed such that for every direction in which the pupil 206 looks, the 2D mirror device 1, 2, or 3 as e.g. described herein can be adjusted that a light beam 208 enters from the curved glass plate 204 into the eye 207. Preferably, the total glass shape needs is calculated for all three spatial directions x, y, and z.

Further, FIGS. 57 and 58 show an embodiment of the apparatus 200 according to the invention, wherein a global mirror 204 is provided for both eyes 207 of the user (e.g. instead of separate screens 204 for each eye 207), particularly in the form of a reflecting sphere. Here, in addition to the embodiment shown in FIGS. 53 and 54, the light beam 208 generated by the light source (e.g. laser) 201 may be reflected by a mirror 208a before passing the adjustable focus (e.g. liquid) lens 202. Again, the glass plate 204 can be designed according to the principles illustrated in FIGS. 55 and 56.

The invention claimed is:

1. Device for tilting an optical element, comprising:—an optical element, wherein the optical element is movably mounted so that the optical element can be tilted at least about a first axis, a magnet extending in an extension direction, wherein the magnet comprises a magnetization aligned with said extension direction, wherein the magnet comprises a front side, and wherein the optical element faces the magnet in the extension direction a first conductor section facing the front side of the magnet in the extension direction, wherein the first conductor section extends along a first direction, a second conductor section facing the front side of the magnet in the extension direction, wherein the second conductor section extends along a second direction being different from the first direction, wherein the optical element is movably mounted so that the optical element can be tilted also about a second axis being different from the first axis, wherein the first and the second conductor section cross each other, wherein the optical element is coupled to the magnet or to said first conductor section, and—a current source electrically connected to the first conductor section, which current source is designed to apply an electrical current to said first conductor section, so that a Lorentz Force is generated that tilts the optical element about said first axis along a first tilting direction, and wherein the current source is electrically connected to the second conductor section, wherein the current source is designed to apply an electrical current to said second conductor section, so that a Lorentz force is generated that tilts the optical element about the second axis along a second tilting direction, and wherein the device comprises a further first conductor section, wherein the first conductor section and the further first conductor section extend along the first direction, and wherein the device comprises a further second conductor section, wherein the second conductor section (and the further second conductor section extend along each other in the second direction, and wherein each conductor section is formed by a separate coil, and wherein the current source is designed to apply a current to said coils such that the current in said two first conductor sections flows in the same direction, and such that the current in said two second conductor sections flows in the same direction.

2. Device according to claim 1, characterized in that the first and the second conductor section extend along an extension plane.

3. Device according to claim 2, characterized in that the device comprises a first coil extending along said extension plane, wherein the first conductor section forms part of a conductor of the first coil, which conductor of the first coil is at least wound about a first winding axis, wherein in a certain position of the magnet, the first winding axis runs substantially parallel to the extension direction or magnetization of the magnet; and/or wherein the device comprises a second coil extending along said extension plane, wherein the second conductor section forms part of a conductor of the second coil, which conductor of the second coil is at least wound about a second winding axis, wherein in said certain position of the magnet, the second winding axis runs substantially parallel to the extension direction or magnetization of the magnet.

4. Device according to claim 3, characterized in that the first and/or second coil each comprises at least one layer or several layers extending along said extension plane, wherein the at least one layer of the first coil is arranged on top of the at least one layer of the second coil normal to said extension plane, or wherein the layers of the first and second coil are arranged on top of each other in an alternating fashion normal to said extension plane.

5. Device according to claim 3, characterized in that the first coil comprises a first and a second loop, wherein at least a part of the first conductor section forms part of the first loop, and wherein the device comprises a further first conductor section, wherein at least a part of the further first conductor section forms part of the second loop, wherein the first conductor section and the further first conductor section extend along the first direction, and wherein the current source is designed to apply a current to the first and the second loop of the first coil such that the current in said two first conductor sections flows in the same direction.

6. Device according to claim 3, characterized in that the second coil comprises a first and a second loop, wherein at least a part of the second conductor section forms part of the first loop, and wherein the device comprises a further second conductor section, wherein at least a part of the further second conductor section forms part of the second loop, wherein the second conductor section and the further second conductor section extend along each other in the second direction, and wherein the current source is designed to apply a current to the first and the second loop of the second coil such that the current in said two second conductor sections flows in the same direction.

7. Device according to claim 1, characterized in that the device comprises a coil carrier for carrying the first and/or second coil or for carrying said separate coils, wherein the first and/or second coil or said separate coils are arranged on the coil carrier or integrated into the coil carrier, and wherein the coil carrier is a printed circuit board.

8. Device according to claim 1, characterized in that the first and/or second coil or said separate coils are formed as a planar coil, respectively.

9. Device according to one claim 1, characterized in that the device comprises a sensor for measuring the position of the magnet or of said magnets.

10. Device according to claim 1, characterized in that the device comprises a light source, and a photo diode, wherein the light source is configured to emit light, so that said light emitted by the light source is reflected towards the photo diode by the magnet or by a reflection module attached to the magnet such that a signal generated by the photo diode due to said reflected light impinging on the photo diode depends on the position of the magnet.

11. Device according to claim 10, characterized in that the magnet comprises a shading formed on a surface of the magnet or that said reflection module comprises a shading formed on a surface of the reflection device such that said signal is indicative of a rotation angle of the magnet about the extension direction of the magnet as well as of a tilt of the optical element.

12. Device according to claim 1, characterized in that the photo diode is a quadrature diode, wherein said light source is arranged in the center of the quadrature photo diode.

13. Device according to claim 1, characterized in that the device comprises a capacitive sensor that is configured to generate a signal which depends on the position of the magnet.

14. Device according claim 1, characterized in that the device comprises a bearing ball that is arranged in a recess of the device for supporting the optical element.

15. Device according to claim 1, characterized in that the device comprises a ball bearing for supporting the magnet, so that the magnet can be tilted in all directions, which ball bearing is arranged in a circumferential gap formed between a first support member supporting the optical element and a second support member which surrounds the first support member and/or magnet, wherein the second support member is preferably connected to the coil carrier.

16. Device according to claim 1, characterized in that for preventing a snap-in of the magnet and/or for preventing a rotation of the magnet the device comprises an inner magnetic flux guiding structure connected to the optical element and an outer magnet flux guiding structure connected to the coil carrier, which outer magnetic flux guiding structure surrounds said inner magnetic flux guiding structure.

17. Device according to claim 16, characterized in that the inner magnetic flux guiding structure comprises a plurality of first protrusions, wherein each first protrusion protrudes radially outwards towards the outer magnetic flux guiding structure, and wherein the outer magnetic flux guiding structure comprises a corresponding number of second protrusions, wherein each second protrusion protrudes radially inwards towards the inner magnetic flux guiding structure, so that each first protrusion is aligned with an associated second protrusion with which it forms a gap.

18. Device according to claim 1, characterized in that the optical element is supported by a spring.

19. Device according to claim 18, characterized in that the spring comprises a central part connected to the magnets, wherein the central part is integrally connected to a circumferential first part surrounding the central part such that the central part can be tilted about the first axis with respect to the first part, and wherein the first part is integrally connected to a circumferential second part surrounding the first part so that the first part together with the central part can be tilted with respect to the second part about the second axis.

20. Device according to claim 18, characterized in that the spring comprises at least one arm that extends from a first fixation point via which it is fastened to the optical element to a second fixation point via which it is fastened to the coil carrier.

21. Device according to claim 18, characterized in that the spring is formed as a cross-shaped spring member having four arms extending outwards from a center of the spring member, wherein a first arm is aligned with a second arm, wherein the first and the second arm extend along said first axis, and wherein a third arm is aligned with a fourth arm, wherein the third and the fourth arm extend along said second axis, and wherein each arm comprises an end region, and wherein the device comprises a first carrier member to which the optical element is connected, and to which the magnet or the first and/or the second magnet or the first and/or second coil is connected, and a second carrier member to which the first and/or second coil or the magnet or the first and/or the second magnet is connected, wherein the end regions of the first and the second arm are fastened to the first carrier member, and wherein the end regions of the third and the fourth arm are fastened to the second carrier member, so that the first carrier member can be tilted about the first and/or second axis with respect to the second carrier member.

22. Device according to claim 1, characterized in that the device comprises a restoring force element means being designed to provide a restoring force for returning the optical element to an initial position, wherein particularly the restoring force element comprises one of the following: a magnetic field return structure consisting of a magnetically soft material and/or ferromagnetic material, a magnet, a spring.

23. Device for tilting an optical element, comprising: an optical element, wherein the optical element is movably mounted so that the optical element can be tilted at least about a first axis, a first magnet extending in an extension direction, wherein the first magnet comprises a magnetization aligned with said extension direction or comprises a magnetization running perpendicular to the extension direction, and wherein the first magnet comprises a front side, and wherein the optical element faces the first magnet in the extension direction, a first coil facing the front side of the first magnet in the extension direction or perpendicular to the extension direction, wherein the first coil comprises a conductor that is wound about a first winding axis, wherein said first winding axis runs parallel to the extension direction of the first magnet, when the first magnet is arranged in a certain position, wherein the optical element is coupled to the first magnet or to said first coil and a current source electrically connected to the first coil, which current source is designed to apply an electrical current to said first coil so that an electromagnetic force is generated between the first magnet and the first coil mean so that the optical element is tilted about said first axis along a first tilting direction, and wherein the device comprises a second magnet extending in an extension direction of the second magnet, wherein the second magnet comprises a magnetization aligned with said extension direction of the second magnet or wherein the second magnet comprises a magnetization running perpendicular to the extension direction of the second magnet, and wherein the optical element is movably mounted so that the optical element can be tilted also about a second axis being different from the first axis, and wherein the device comprises a second coil facing the second magnet in the extension direction of the second magnet or perpendicular to the extension direction of the second magnet, wherein the second coil comprises a conductor that is wound about a second winding axis, wherein said second winding axis runs parallel to the extension direction of the second magnet, when the second magnet is arranged in a certain position, and wherein the optical element is coupled to the second magnet or to the second coil, wherein the current source is also electrically connected to the second coil and designed to apply an electrical current to said second coil, so that an electromagnetic force is generated between the second magnet and the second coil so that the optical element is tilted about the second axis along a second tilting direction.

24. Device for tilting an optical element, comprising: an optical element, wherein the optical element is movably mounted so that the optical element can be tilted at least about a first axis, a magnet extending in an extension direction, wherein the magnet comprises a magnetization aligned with said extension direction, wherein the magnet comprises a front side, and wherein the optical element faces the magnet in the extension direction-, a first conductor section facing the front side of the magnet in the extension direction, wherein the first conductor section extends along a first direction, wherein the optical element is coupled to the magnet or to said first conductor section, and a current source electrically connected to the first conductor section, which current source is designed to apply an electrical current to said first conductor section, so that a Lorentz Force is generated that tilts the optical element about said first axis along a first tilting direction, wherein the optical element is supported on the coil carrier by a spring, and wherein the spring is formed as a cross shaped spring member having four arms extending outwards from a center of the spring member, wherein a first arm is aligned with a second arm, wherein the first and the second arm extend along said first axis, and wherein a third arm is aligned with a fourth arm, wherein the third and the fourth arm extend along said second axis, and wherein each arm comprises an end region, and wherein the device comprises a first carrier member to which the optical element is connected, and to which the magnet or the first and/or the second magnet or the first and/or second coil is connected, and a second carrier member to which the first and/or second coil or the magnet or the first and/or the second magnet is connected, wherein the end regions of the first and the second arm are fastened to the first carrier member, and wherein the end regions of the third and the fourth arm are fastened to the second carrier member, so that the first carrier member can be tilted about the first and/or second axis with respect to the second carrier member.

* * * * *